United States Patent
Kondo et al.

(10) Patent No.: US 7,068,845 B2
(45) Date of Patent: Jun. 27, 2006

(54) INFORMATION PROCESSING APPARATUS USING CLASS-CLASSIFICATION ADAPTIVE PROCESSING

(75) Inventors: Tetsujiro Kondo, Tokyo (JP); Hideo Nakaya, Kanagawa (JP); Tsutomu Watanabe, Kanagawa (JP); Hideki Ohtsuka, Kanagawa (JP); Yasuaki Takahashi, Kanagawa (JP); Seiji Wada, Kanagawa (JP); Takahiro Nagano, Kanagawa (JP); Koji Ohta, Tokyo (JP); Hisakazu Shiraki, Kanagawa (JP)

(73) Assignee: Sony Corporation, Tokyo (JP)

( * ) Notice: Subject to any disclaimer, the term of this patent is extended or adjusted under 35 U.S.C. 154(b) by 1089 days.

(21) Appl. No.: 09/779,139

(22) Filed: Feb. 8, 2001

(65) Prior Publication Data

US 2002/0015528 A1 Feb. 7, 2002

(30) Foreign Application Priority Data

Feb. 10, 2000 (JP) ....................................... 2000-033313

(51) Int. Cl.
  *G06K 3/62* (2006.01)

(52) U.S. Cl. ....................... 382/224; 382/260; 382/266

(58) Field of Classification Search ................ 382/224, 382/232, 233, 236, 239, 251, 261, 263, 264, 382/260, 269, 266; 348/845.1, 607, 241, 348/606, 614, 620; 714/764, 763, 752, 710
See application file for complete search history.

(56) References Cited

U.S. PATENT DOCUMENTS

| 4,703,351 A | 10/1987 | Kondo ....................... 358/135 |
| 4,890,161 A | 12/1989 | Kondo ....................... 358/135 |
| 5,469,216 A | 11/1995 | Takahashi et al. .......... 348/441 |
| 5,495,298 A | 2/1996 | Uchida et al. .............. 348/615 |
| 5,739,873 A * | 4/1998 | Kondo ....................... 348/720 |
| 5,841,375 A * | 11/1998 | Kondo et al. ................. 341/50 |
| 5,847,766 A | 12/1998 | Peak ........................... 348/420 |
| 5,852,470 A | 12/1998 | Kondo et al. .............. 348/448 |
| 5,946,044 A | 8/1999 | Kondo et al. ............... 348/458 |

FOREIGN PATENT DOCUMENTS

| WO | WO 99/21090 | 4/1999 |
| WO | WO 99 21125 | 4/1999 |
| WO | WO 00/48117 | 8/2000 |
| WO | WO 00/48198 | 8/2000 |

OTHER PUBLICATIONS

Meguro M et al: "An Adaptive Order Statistics Filter Based on Fuzzy Rules for Image Processing" Electronics & Communications in Japan, Part III—Fundamental Electronic Science,US,Scripta Technica. New York, vol. 80, No. 9, Sep. 1 1997, pp. 70–80, XP000755627.

* cited by examiner

*Primary Examiner*—Yon J. Couso
(74) *Attorney, Agent, or Firm*—Frommer Lawrence & Haug LLP; William S. Frommer; Samuel S. Lee

(57) ABSTRACT

A class synthesizing circuit classifies an aimed-at data item into one of a plurality of classes specified in advance, according to a plurality of data items disposed around the aimed-at data item. A coefficient holding and class-code selection circuit stores conversion information for the aimed-at data item, for each class. An estimation-prediction calculation circuit converts the aimed-at data item to a higher-quality data item according to the conversion information. The class synthesizing circuit classifies the aimed-at data item into a different class according to whether the aimed-at data item is missing.

24 Claims, 67 Drawing Sheets

FIG. 14

| ADRC BLOCK 0 | ADRC BLOCK 3 | ADRC BLOCK 0 | ADRC BLOCK 3 | ADRC BLOCK 0 | ADRC BLOCK 3 |
|---|---|---|---|---|---|
| ADRC BLOCK 4 | ADRC BLOCK 1 | ADRC BLOCK 4 | ADRC BLOCK 1 | ADRC BLOCK 4 | ADRC BLOCK 1 |
| ADRC BLOCK 2 | ADRC BLOCK 5 | ADRC BLOCK 2 | ADRC BLOCK 5 | ADRC BLOCK 2 | ADRC BLOCK 5 |
| ADRC BLOCK 0 | ADRC BLOCK 3 | ADRC BLOCK 0 | ADRC BLOCK 3 | ADRC BLOCK 0 | ADRC BLOCK 3 |
| ADRC BLOCK 4 | ADRC BLOCK 1 | ADRC BLOCK 4 | ADRC BLOCK 1 | ADRC BLOCK 4 | ADRC BLOCK 1 |
| ADRC BLOCK 2 | ADRC BLOCK 5 | ADRC BLOCK 2 | ADRC BLOCK 5 | ADRC BLOCK 2 | ADRC BLOCK 5 |

FIG. 15A
ORIGINAL SCREEN
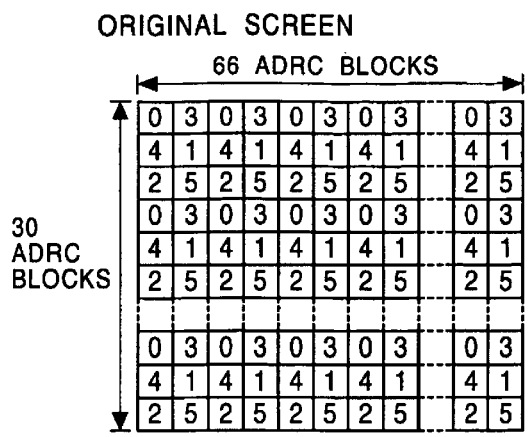
FIG. 15B
SEGMENT
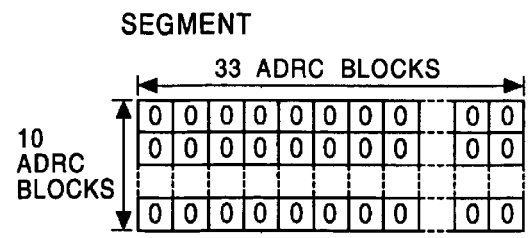
SEGMENT
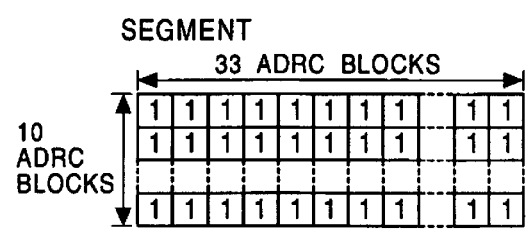
SEGMENT
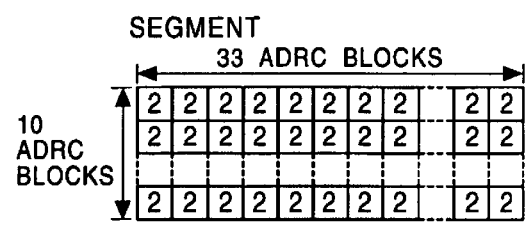
SEGMENT
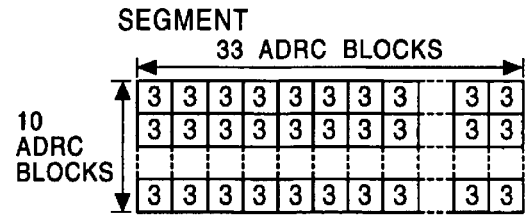
SEGMENT
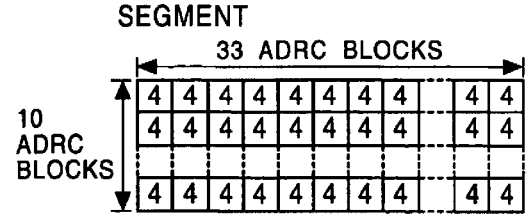
SEGMENT
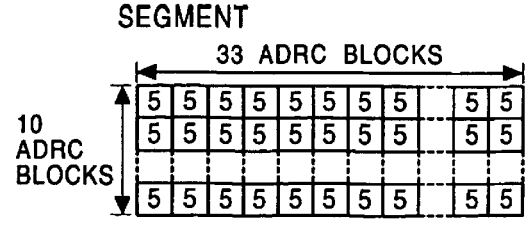

FIG. 16A
ORIGINAL SCREEN
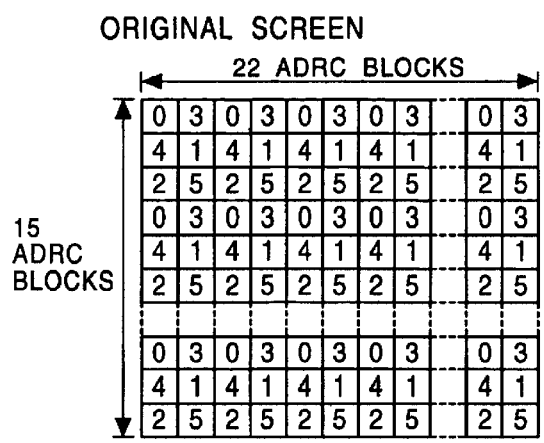
FIG. 16B
SEGMENT
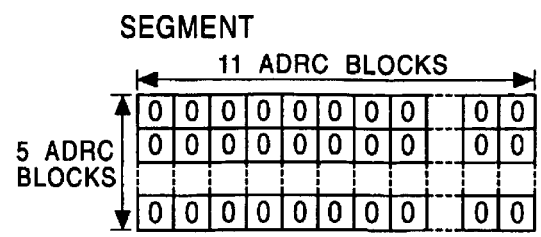
SEGMENT
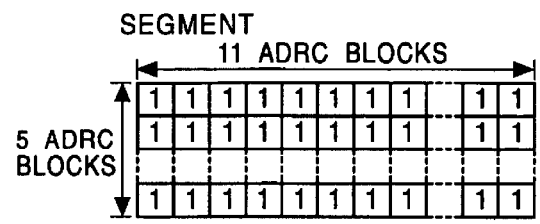
SEGMENT
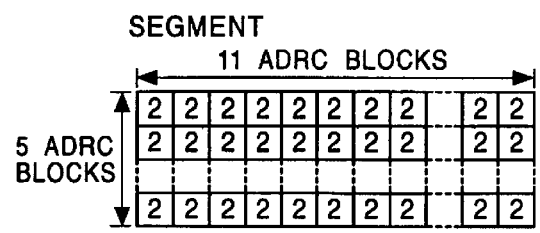
SEGMENT
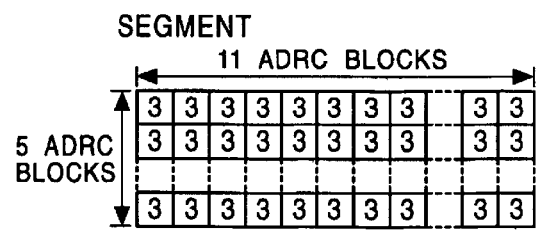
SEGMENT
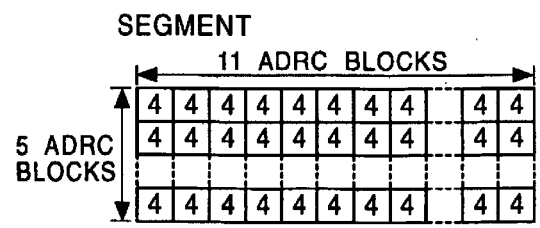
SEGMENT
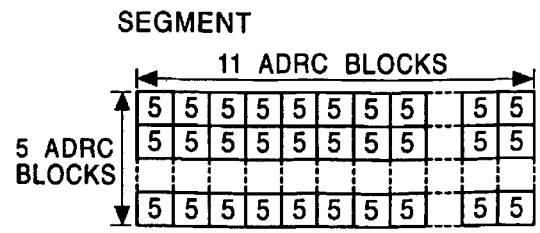

FIG. 17A

| y0 | y1 | y2 | y3 | y4 | y32 |
|---|---|---|---|---|---|
| y33 | y34 | y35 | y36 | y37 | y65 |
| ... | ... | ... | ... | ... | ... |
| y297 | y298 | y299 | y300 | y301 | y329 |

FIG. 17B

| y0 | y221 | y112 | y3 | y224 | y142 |
|---|---|---|---|---|---|
| y33 | y254 | y145 | y36 | y257 | y175 |
| ... | ... | ... | ... | ... | ... |
| y297 | y188 | y79 | y300 | y191 | y109 |

FIG. 17C

| u0 | u1 | u2 | u3 | u4 | u10 |
|---|---|---|---|---|---|
| u11 | u12 | u13 | u14 | u15 | u21 |
| ... | ... | ... | ... | ... | ... |
| u44 | u45 | u46 | u47 | u48 | u54 |

FIG. 17D

| u0 | u53 | u52 | u51 | u50 | u44 |
|---|---|---|---|---|---|
| u11 | u42 | u41 | u40 | u39 | u33 |
| ... | ... | ... | ... | ... | ... |
| u44 | u9 | u8 | u7 | u6 | u0 |

FIG. 17E

| v0 | v1 | v2 | v3 | v4 | v10 |
|---|---|---|---|---|---|
| v11 | v12 | v13 | v14 | v15 | v21 |
| ... | ... | ... | ... | ... | ... |
| v44 | v45 | v46 | v47 | v48 | v54 |

FIG. 17F

| v0 | v53 | v52 | v51 | v50 | v44 |
|---|---|---|---|---|---|
| v11 | v42 | v41 | v40 | v39 | v33 |
| ... | ... | ... | ... | ... | ... |
| v44 | v9 | v8 | v7 | v6 | v0 |

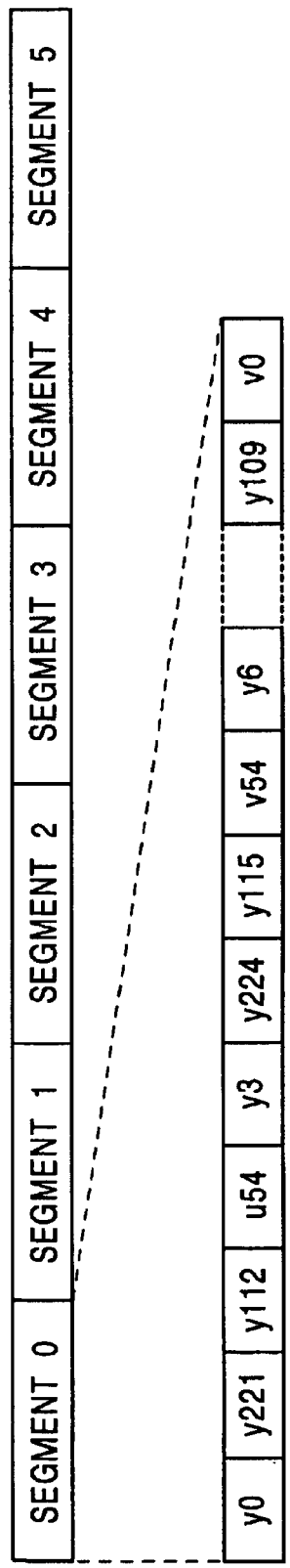

FIG. 52A

|    | H1    | H2    | H3 |
|----|-------|-------|----|
| L1 | ERROR | q2    | q3 |
| L2 | q4    | ERROR | q6 |
| L3 | q7    | ERROR | q9 |

FRAME t

FIG. 52B

|    | H1 | H2 | H3 |
|----|----|----|----|
| L1 | p1 | p2 | p3 |
| L2 | p4 | p5 | p6 |
| L3 | p7 | p8 | p9 |

FRAME t-1

FIG. 53

| q1 | q2    | q3 |
|----|-------|----|
| q4 | ERROR | q6 |
| q7 | q8    | q9 |

FRAME t

FIG. 56
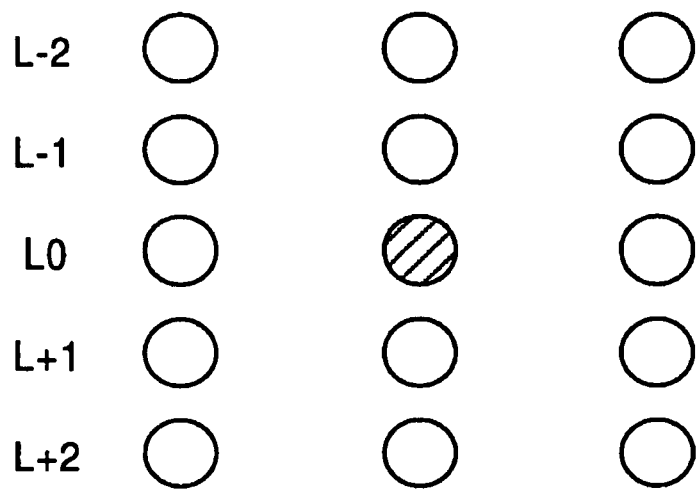
 : PIXEL TO BE PROCESSED

INFORMATION PROCESSING APPARATUS USING CLASS-CLASSIFICATION ADAPTIVE PROCESSING

BACKGROUND OF THE INVENTION

1. Field of the Invention

The present invention relates to information processing apparatuses using class-classification adaptive processing.

2. Description of the Related Art

Variable-length encoding, typical of which is entropy encoding, has been used in many data-transmission compression methods to increase the compression rate. A feature of entropy encoding is that the lengths of code words are changed according to the content of data to be compressed, to implement compression. For example, a short code word is assigned to data which is frequently used, and a long code word is assigned to data which is used not frequently. As a result, the amount of information of the entire data to be transmitted is reduced.

When a receiving side receives erroneous data due to a communication error, since the length of each code word is always changed according to the content of the data, an error in decoding continues to a point which is used as a transmission-data reference. This phenomenon is called "error propagation."

In moving-picture compression methods, typical of which is Moving Picture Experts Group methods (MPEG methods), discrete cosine transform is used to reduce spatial redundancy and only differences between frames are transmitted to reduce redundancy in time in order to reduce the amount of data.

Moving-picture data compressed by such a compression method is decompressed at the receiving side. When transmitted moving-picture data lacks its part due to a communication error or for some reason, the missing part is expanded in space and in time, and its effect is prominent at a higher compression rate.

Since a communication path in a mobile environment is poor compared with that of a fixed station or that in wire environment, burst data missing called "packet loss" occurs relatively frequently. Therefore, an enhanced error-correcting code is employed in image communication which uses compression, to prevent data from being lacked in a communication path in such a mobile environment.

If there is a missing pixel which cannot be restored by the error correcting code, correlation between the missing pixel and its surrounding pixels is analyzed and pixels disposed in a direction in which strong correlation is found are used for linear interpolation. The missing pixel may be simply replaced with a pixel disposed in a direction in which strong correlation is found. Alternatively, the amount of motion or the motion vectors of the surrounding pixels are detected and pixels disposed in a direction in which strong correlation is found are used for linear interpolation. The missing pixel may be concealed by using a median filter.

When the missing pixel is replaced with another pixel or linear interpolation is used for the missing pixel, however, since resolution decreases and continuity with surrounding pixels is lost, a reproduced image gives a different impression. Also in a case in which a median filter is used, an incongruous impression is given.

SUMMARY OF THE INVENTION

The present invention has been made in consideration of the above situations. Accordingly, it is an object of the present invention to generate a higher-quality pixel irrespective of whether a pixel is missing.

The foregoing object is achieved in one aspect of the present invention through the provision of an information processing apparatus including a class classifier for classifying an aimed-at data item into one of a plurality of classes specified in advance, according to a plurality of data items disposed around the aimed-at data item; a memory for storing conversion information for the aimed-at data item for each class; and a converter for converting the aimed-at data item to a data item having a higher quality, according to the conversion information, wherein the class classifier classifies the aimed-at data item into a different class according to whether the aimed-at data item is missing.

The information processing apparatus may be configured such that the conversion information is information used for generating the aimed-at data item according to the plurality of data items disposed around the aimed-at data item, for a missing class in which the aimed-at data item is missing, and the conversion information is information used for converting the aimed-at data item to a data item having a higher quality, for a non-missing class in which the aimed-at data item is not missing.

In the information processing apparatus, the conversion information may be information used for converting the aimed-at data item to a data item having reduced noise, for the non-missing class.

In the information processing apparatus, the conversion information may be information obtained by learning achieved in advance.

In the information processing apparatus, the conversion information may be prediction coefficients used for a linear or non-linear, or a first-order or high-order estimation equation.

In the information processing apparatus, the class classifier may classify the aimed-at data item into one of the plurality of classes specified in advance, according to a class tap which includes the plurality of data items disposed around the aimed-at data item.

In the information processing apparatus, the converter may convert the aimed-at data item to a data item having a higher quality, according to a prediction tap corresponding to the class into which the aimed-at data item has been classified.

In the information processing apparatus, the class classifier may classify the aimed-at data item into one of the plurality of classes specified in advance, according to a plurality of data items disposed spatially around the aimed-at data item.

In the information processing apparatus, the class classifier may classify the aimed-at data item into one of the plurality of classes specified in advance, according to a plurality of data items disposed along the time axis around the aimed-at data item.

In the information processing apparatus, the aimed-at data item may be image data.

The foregoing object is achieved in another aspect of the present invention through the provision of an information processing method including the steps of classifying an aimed-at data item into one of a plurality of classes specified in advance, according to a plurality of data items disposed around the aimed-at data item; selecting conversion information corresponding to the class into which the aimed-at data item has been classified; and converting the aimed-at data item to a data item having a higher quality, according to the conversion information, wherein the aimed-at data item is classified into a different class according to whether the aimed-at data item is missing, in the step of classifying the aimed-at data item.

The information processing method may be configured such that the conversion information is information used for generating the aimed-at data item according to the plurality of data items disposed around the aimed-at data item, for a missing class in which the aimed-at data item is missing, and the conversion information is information used for converting the aimed-at data item to a data item having a higher quality, for a non-missing class in which the aimed-at data item is not missing.

In the information processing method, the conversion information may be information used for converting the aimed-at data item to a data item having reduced noise, for the non-missing class.

In the information processing method, the conversion information may be information obtained by learning achieved in advance.

In the information processing method, the conversion information may be prediction coefficients used for a linear or non-linear, or a first-order or high-order estimation equation.

In the information processing method, the aimed-at data item may be classified into one of the plurality of classes specified in advance, according to a class tap which includes the plurality of data items disposed around the aimed-at data item, in the step of classifying the aimed-at data item.

In the information processing method, the aimed-at data item may be converted to a data item having a higher quality in the step of converting the aimed-at data item, according to a prediction tap corresponding to the class into which the aimed-at data item has been classified.

In the information processing method, the aimed-at data item may be classified into one of the plurality of classes specified in advance in the step of classifying the aimed-at data item, according to a plurality of data items disposed spatially around the aimed-at data item.

In the information processing method, the aimed-at data item may be classified into one of the plurality of classes specified in advance in the step of classifying the aimed-at data item, according to a plurality of data items disposed along the time axis around the aimed-at data item.

In the information processing method, the aimed-at data item is image data.

The foregoing object is achieved in still another aspect of the present invention through the provision of a recording medium storing a computer-readable program, the program including the steps of classifying an aimed-at data item into one of a plurality of classes specified in advance, according to a plurality of data items disposed around the aimed-at data item; selecting conversion information corresponding to the class into which the aimed-at data item has been classified; and converting the aimed-at data item to a data item having a higher quality, according to the conversion information, wherein the aimed-at data item is classified into a different class according to whether the aimed-at data item is missing, in the step of classifying the aimed-at data item.

The foregoing object is achieved in yet another aspect of the present invention through the provision of a learning apparatus including a class classifier for classifying an aimed-at data item into one of a plurality of classes specified in advance, according to a plurality of data items disposed around the aimed-at data item; and a conversion-information generator for generating conversion information used for converting the aimed-at data item to a data item having a higher quality, for the class, wherein the class classifier classifies the aimed-at data item into a different class according to whether the aimed-at data item is missing.

The foregoing object is achieved in a further aspect of the present invention through the provision of a learning method including the steps of classifying an aimed-at data item into one of a plurality of classes specified in advance, according to a plurality of data items disposed around the aimed-at data item; and generating conversion information used for converting the aimed-at data item to a data item having a higher quality, for the class, wherein the aimed-at data item is classified into a different class in the step of classifying the aimed-at data item, according to whether the aimed-at data item is missing.

BRIEF DESCRIPTION OF THE DRAWINGS

FIG. 14 is a view showing the relationship between pixels in frames and ADRC blocks.

FIGS. 15A and 15B are views showing ADRC blocks and segments for Y data.

FIGS. 16A and 16B are views showing ADRC blocks and segments for U data or V data.

FIGS. 17A, 17B, 17C, 17D, 17E, and 17F are views showing shuffling achieved in units of ADRC blocks.

FIG. 18 is a view showing segments.

FIGS. 52A and 52B are views showing example pixels used for calculating a time activity.

FIG. 53 is a view showing example pixels used for calculating a space activity.

FIG. 56 is a view showing example pixels used in majority determination for a motion-class code.

DESCRIPTION OF THE PREFERRED EMBODIMENTS

Figure 1:
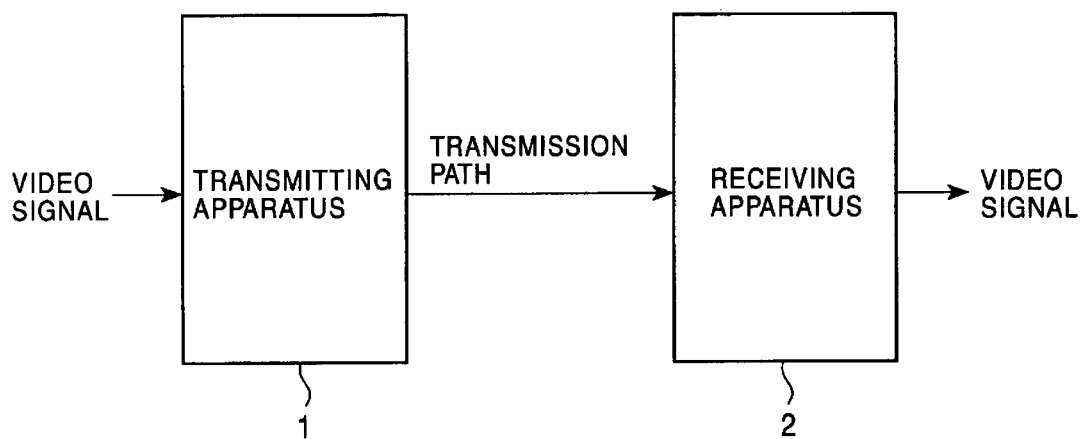
FIG. 1 is a view showing an image transfer system for transmitting images.

FIG. 1 is a view showing an image communication system for image communications according to the present invention. A transmitting apparatus 1 compresses an input video signal by a method according to the present invention, encodes the signal, converts it to a packet format, and sends through a transmission path to a receiving apparatus 2. The receiving apparatus 2 receives packets sent through the transmission path, decodes the data contained in the packets by a method according to the present invention, decompresses the data, and outputs as a video signal. In the transmission path, the data contained in the packets may lack its part due to congestion or for some reason. If the processing capability of an ATM switching machine (not shown) constituting the transmission path is exceeded, a packet itself may be lost.

Figure 2:
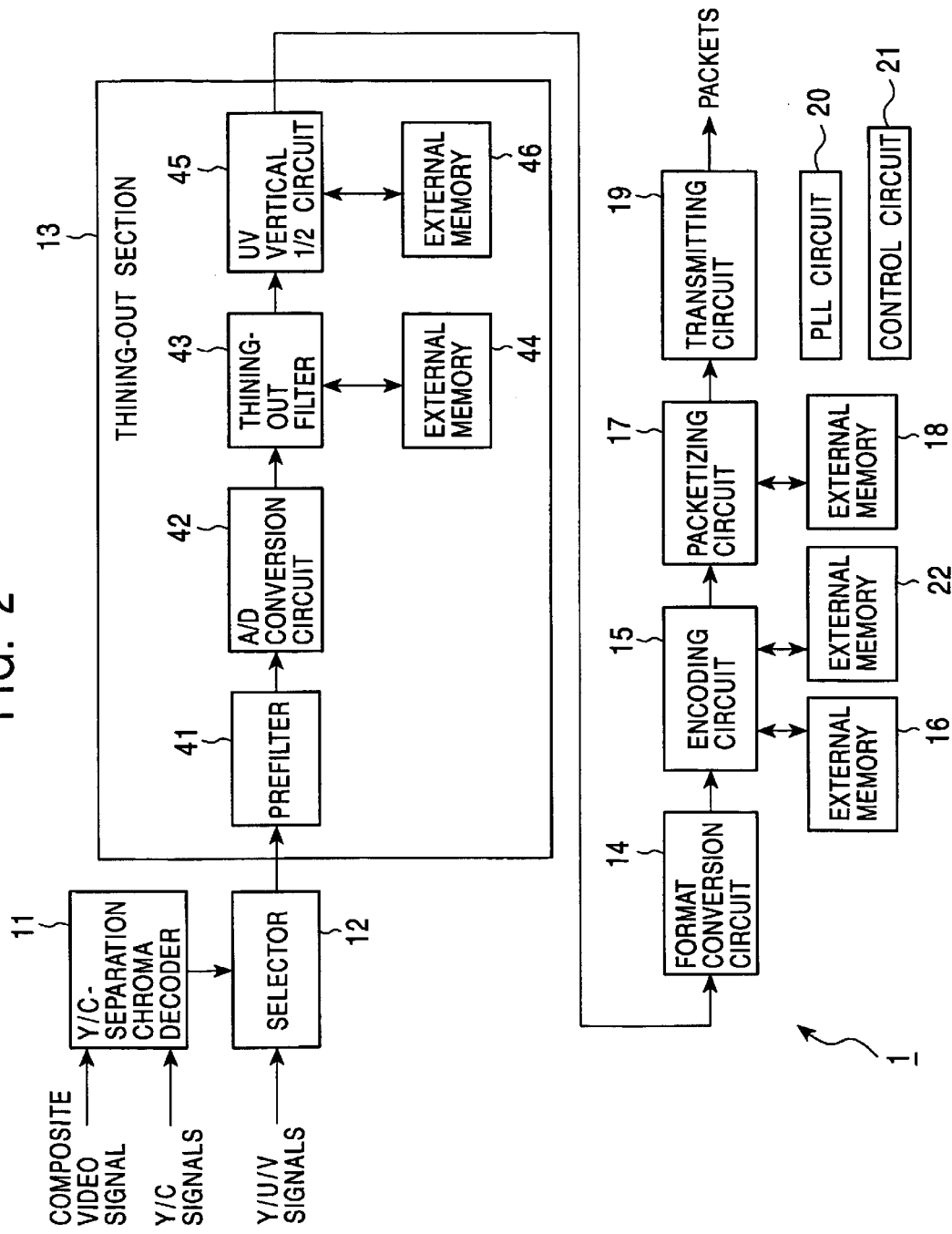
FIG. 2 is a block diagram showing the structure of a transmitting apparatus according to an embodiment of the present invention.

FIG. 2 is a block diagram showing the structure of the transmitting apparatus 1 according to an embodiment of the present invention. When a Y/C-separation chroma decoder 11 receives either an analog composite video signal or analog component signals (Y/C signals) such as a luminance signal Y and a chroma signal C, the Y/C-separation chroma decoder 11 converts the signal(s) into component signals (Y/U/V signals), such as a luminance signal Y and color signals U and V, and sends them to a selector 12. The selector 12 selects either the Y/U/V signals sent from the Y/C separation chroma decoder 11 or signals input in the Y/U/V-signal format, and sends to a thinning-out section 13. The Y/U/V signals have, for example, a standard density (SD), a format of 4:2:2, a field frequency of 60 Hz, and an interlace format.

The thinning-out section 13 thins out the Y signal, the U signal, and the V signal sent from the selector 12 by methods described later, and sends them to a format conversion circuit 14. The thinning-out section 13 is formed of a prefilter 41, an A/D conversion circuit 42, a thinning-out filter 43, an external memory 44, a UV vertical ½ circuit 45, and an external memory 46.

The prefilter 41 is a low-pass filter for outputting portions having a predetermined frequency band of the input Y, U, and V signals. The prefilter 41 sends its output to the A/D conversion circuit 42.

The A/D conversion circuit 42 samples the input Y, U, and V signals to change each signal into, for example, eight-bit data. The analog Y signal input to the A/D conversion circuit 42 is sampled and changed to Y data having 528 pixels in the horizontal direction and 480 pixels in the vertical direction, and sent to the thinning-out filter 43.

The analog U signal input to the A/D conversion circuit 42 is sampled and changed to U data having 176 pixels in the horizontal direction and 480 pixels in the vertical direction, and sent to the thinning-out filter 43. The analog V signal input to the A/D conversion circuit 42 is sampled and changed to V data having 176 pixels in the horizontal direction and 480 pixels in the vertical direction, and sent to the thinning-out filter 43.

Therefore, the output signals of the A/D conversion circuit 42 have a 3:1:1 format.

The thinning-out filter 43 temporarily stores the input Y, U, and V data in the external memory 44, thins out the temporarily stored Y, U, and V data by half in the horizontal and vertical directions, and sends to the UV vertical ½ circuit 45.

The UV vertical ½ circuit 45 temporarily stores the Y, U, and V data sent from the thinning-out filter 43 in the external memory 46, thins out the temporarily stored U and V data by half in the vertical direction, and sends the Y, U, and V data to the format conversion circuit 14.

Therefore, the output signals of the thinning-out section 13 have a format of 3.0:0.5:0.5.

The format conversion circuit 14 rearranges the Y, U, and V data sent from the thinning-out section 13 by a method described later to have a block structure, and sends to an encoding circuit 15.

The encoding circuit 15 temporarily stores the Y, U, and V data sent from the format conversion circuit 14 in an external memory 16; shuffles the Y, U, and V data temporarily stored in the external memory 16 by changing writing and reading addresses; encodes the data by the adaptive dynamic range coding (ADRC) method; further shuffles the data; and sends the data to a packetizing circuit 17.

The ADRC method is a variable-length encoding method which outputs variable-length codes adapted to the dynamic range (DR) of input image data. The image data is divided into blocks (ADRC blocks, described later) having a plurality of pixels, and the dynamic range of each block, which is the difference between the maximum pixel value and the minimum pixel value in the block, is detected. Each pixel value is again quantized according to the dynamic range of the block by the number of bits smaller than that (for example, eight bits) used in the original quantization. The smaller the dynamic range is, the smaller number of bits is used in re-quantization. The amount of data can be further reduced by removing only the redundancy of the pixel values of pixels with an increase of quantization distortion being suppressed.

The ADRC method selects the number of quantization bits corresponding to the magnitude of the dynamic range, which is the difference between the maximum value and the minimum value among the pixel values of pixels included in a block. To determine the magnitude of the dynamic range, a threshold corresponding to a motion is used. When two bits, three bits, or four bits are used for re-quantization, thresholds T1 and T2 (T1<T2) for each motion or for each dynamic range, stored in a quantization table are used. The receiving side uses the same quantization table.

Two bits are assigned to a pixel-value code in a block having a dynamic range equal to or less than (T1−1). Three bits are assigned to a pixel-value code in a block having a dynamic range from T1 to (T2−1) both inclusive. Four bits are assigned to a pixel-value code in a block having a dynamic range equal to or more than T2. The number of bits assigned to pixel-value codes is hereinafter called "q."

Encoding is applied to 88 ADRC blocks (called a buffer) as a unit, which is generated by dividing two frames by 30. One quantization table which stores thresholds T1 and T2 is selected for each buffer such that the code generated for the buffer has 16,104 bits or less. The selected quantization table is specified by a table index indicated by TI. Since the code generated for one buffer has 16,104 bits or less, the information of encoded image data corresponds to a bit rate of 8 Mbps.

When the dynamic range is larger than the q-th power of 2, a pixel-value code Q is calculated as follows:

$$[(L-MIN+0.5) \times 2q/DR]$$

where [ ] indicates rounding down at the decimal point, L represents a pixel value, MIN indicates the minimum value of the pixel values of the pixels in the block, and DR indicates the dynamic range of the block. When the dynamic range is equal to the q-th power of 2 or less, a pixel-value code Q is L−MIN.

The encoding circuit 15 outputs the table index TI specifying the quantization table, the dynamic range DR, the minimum MIN of the pixel values of the pixels in a block, a motion flag MF indicating a motion, and the codes Q corresponding to pixel values, as encoded data. The table index TI, the dynamic range DR, the minimum value MIN of the pixel values of the pixels in a block, and the length (number of bits) of the motion flag MF indicating a motion are fixed to be eight bits long. In contrast, the lengths of the codes Q corresponding to pixel values are changed.

The packetizing circuit 17 temporarily stores the encoded data sent from the encoding circuit 15 in an external memory 18; divides the encoded data temporarily stored, in units of 1.6 Kbits; packetizes them with headers and other elements added; and sends to a transmitting circuit 19. The transmitting circuit 19 modulates the packets sent from the packetizing circuit 17 by a predetermined transfer method, and transmits them through the transmission path.

A PLL circuit 20 generates a reference signal synchronized with the image, and sends the reference signal to a control circuit 21. The control circuit 21 sends a control signal based on the reference signal sent from the PLL circuit 20 to the thinning-out section 13, the format conversion circuit 14, the encoding circuit 15, the external memory 16, the packetizing circuit 17, the external memory 18, and the transmitting circuit 19 to control the operation of the entire transmitting apparatus 1.

Figure 3:
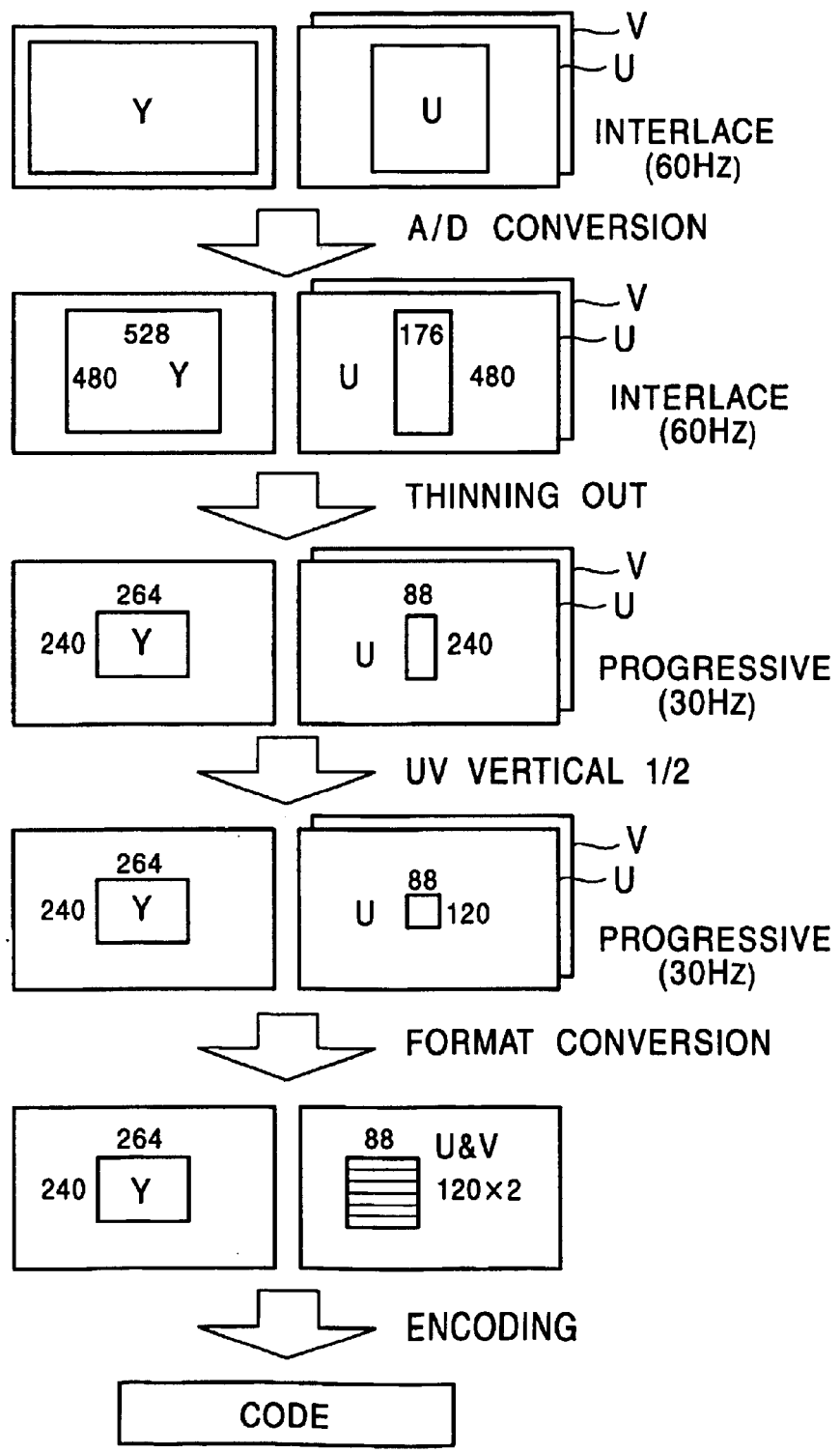
FIG. 3 is a view showing a process in which an image signal input to a transmitting apparatus 1 is compressed.

A process for compressing an image signal input to the transmitting apparatus 1 will be described below by referring to FIG. 3. An interlaced Y signal having a field frequency of 60 Hz is converted to Y data having 528 pixels in the horizontal direction and 480 pixels in the vertical direction per field, by the A/D conversion circuit 42. Interlaced U and V signals having a field frequency of 60 Hz are converted to U and V data having 176 pixels in the horizontal direction and 480 pixels in the vertical direction, respectively. The information of the image signal input to the A/D conversion circuit 42 corresponds to a bit rate of 166 Mbps, and that of the image data output from the A/D conversion circuit 42 corresponds to a bit rate of 104 Mbps. The amount of information is compressed.

The interlaced Y data having a field frequency of 60 Hz and having 528 pixels in the horizontal direction and 480 pixels in the vertical direction per frame is compressed to progressive-type data having a field frequency of 30 Hz and having 264 pixels in the horizontal direction and 240 pixels in the vertical direction per frame, by the thinning-out filter 43. The interlaced U and V data each having a field frequency of 60 Hz and having 176 pixels in the horizontal direction and 480 pixels in the vertical direction per frame is compressed to progressive-type data having a field frequency of 30 Hz and having 88 pixels in the horizontal direction and 240 pixels in the vertical direction per frame, by the thinning-out filter 43.

The U and V data having 88 pixels in the horizontal direction and 240 pixels in the vertical direction per frame is compressed to data having 88 pixels in the horizontal direction and 120 pixels in the vertical direction, by the UV vertical ½ circuit 45. The information of the image data output from the UV vertical ½ circuit 45 corresponds to a bit rate of 21 Mbps. The amount of information is compressed as compared with that of the information of the signal input to the transmitting apparatus 1.

As described above, since the thinning-out section 13 achieves thinning-out processing, the structure of each circuit in the subsequent stages is simplified, and the bit rate in the transmission path can be set to a practical, sufficiently small value.

The progressive-type U and V data having a field frequency of 30 Hz and having 88 pixels in the horizontal direction and 120 pixels in the vertical direction per frame is converted to data formed by combining two sets of data each having 88 pixels by 120 pixels, by the format conversion circuit 14.

The Y data having 264 pixels in the horizontal direction and 240 pixels in the vertical direction per frame and the U and V data collectively having two sets of 88 pixels by 120 pixels are encoded by the encoding circuit 15. The information of the encoded image data corresponds to a bit rate of 8 Mbps. The amount of the information of the resultant data is made smaller than that of the information of the analog signal input to the transmitting apparatus 1.

As described above, the transmitting apparatus 1 compresses and encodes the image signal.

Figure 4:
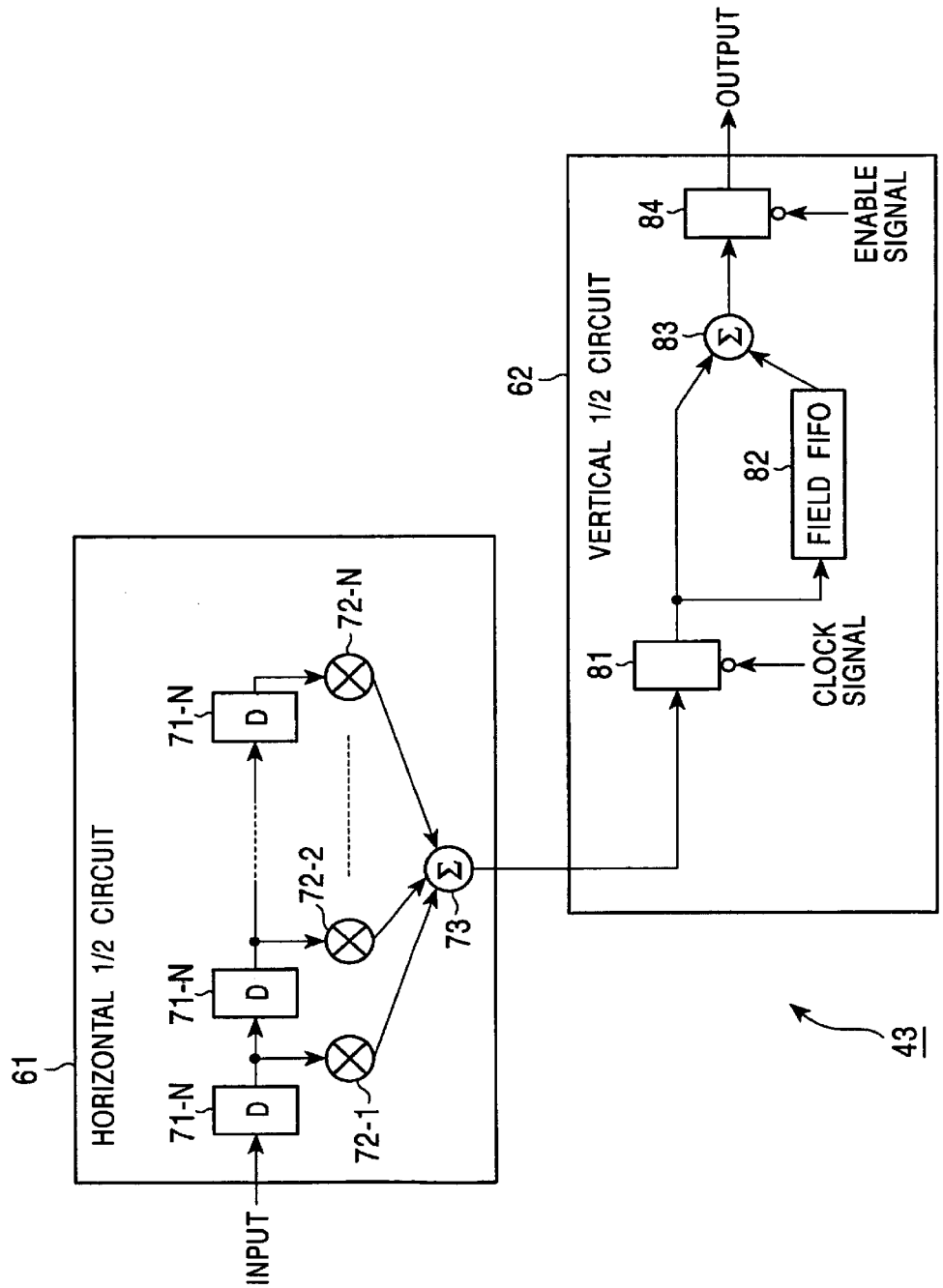
FIG. 4 is a block diagram showing the structure of a thinning-out filter 43.

FIG. 4 is a block diagram showing the structure of the thinning-out filter 43. The interlaced Y data is sent to a horizontal ½ circuit 61 along the horizontal-direction line. The horizontal ½ circuit 61 is formed of delay circuits (registers) 71-1 to 71-N, multiplication circuits 72-1 to 72-N, and an adder 73.

The Y data input sequentially to the horizontal ½ circuit 61, which is a half-band filter, is delayed by one pixel in the horizontal direction by each of the delay circuits 71-1 to 71-N, and sequentially output to the subsequent stages. The multiplication circuits 72-1 to 72-N multiply the input Y data (pixel) by 1/N, and output to the adder 73. The adder 73 adds the data sent from the multiplication circuits 72-1 to 72-N, and outputs the sum to a vertical ½ circuit 62.

The vertical ½ circuit 62, which is a half-band filter, is formed of a latch circuit 81, a field fast-in-fast-out (FIFO) 82, an adder 83, and a latch circuit 84. The data output from the horizontal ½ circuit 61 is sent to the latch circuit 81. The latch circuit 81 latches the input data when a clock signal is input, and outputs the latched data.

Figure 5:
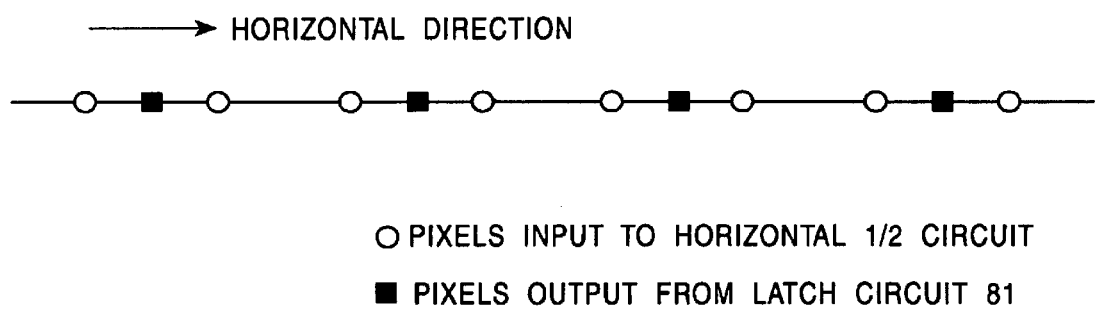
FIG. 5 is a view showing the output of a latch circuit 81.

The operation of the horizontal ½ circuit 61 will be described below by referring to FIG. 5. The Y data (pixels indicated by white circles in FIG. 5) sequentially input in the horizontal direction of a frame is held by the delay circuits 71-1 to 71-N, and multiplied by coefficients by the multiplication circuits 72-1 to 72-N. The outputs of the multiplication circuits 72-1 to 72-N are added by the adder 73, and output to the latch circuit 81. The latch circuit 81 receives clock signals instructing latch operations at timing corresponding to black squares shown in FIG. 5. In the case shown in FIG. 5, since one clock is input to the latch circuit 81 every time when two pixel data items are transferred, when N=2 and the value of each coefficient is ½, for example, the average of the pixel values of adjacent two pixels is latched by the latch circuit 81 at timing indicated by a black square in FIG. 5. As described above, the number of pixels latched by the latch circuit 81 is half the number of pixels of the data input to the thinning-out filter 43.

The value latched by the latch circuit 81 is sent to the field FIFO 82 and the adder 83. The field FIFO 82 stores the data of pixels in a first field thinned out by half in the horizontal direction, sent from the latch circuit 81, delays it by one field, and outputs to the adder 83. The adder 83 adds the data sent from the latch circuit 81 to that sent from the field FIFO 82, and sends the sum to the latch circuit 84. The latch circuit 84 latches the input data when an enable signal is input.

Figure 6:
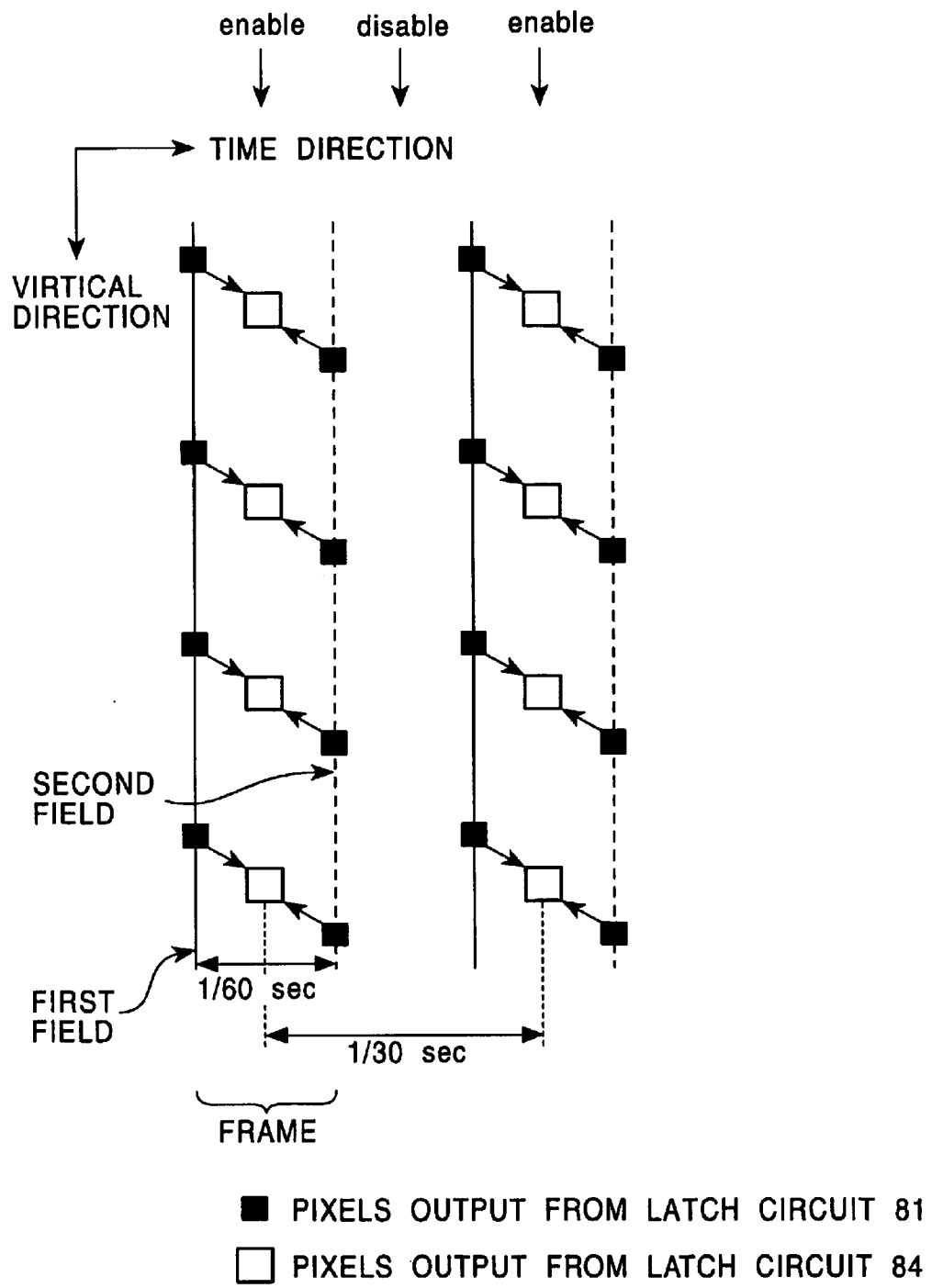
FIG. 6 is a view showing the output of a latch circuit 84.

The operation of the vertical ½ circuit 62 will be described below by referring to FIG. 6. The Y data of a pixel (indicated by a black square on the first field shown in FIG. 6) in the first field and the data of a pixel (indicated by a black square on a second field, located in the right-bottom direction of the black square in the first field, shown in FIG. 6) disposed at the same position in the horizontal direction of a screen as the pixel in the first field and located on a second field one line below the first field are added by the adder 83, and output to the latch circuit 84. Therefore, the latch circuit 84 latches the average (corresponding to the pixel indicated by a white square shown in FIG. 6) of the pixels in the first field and the second field.

As described above, the output of the latch circuit 84 is progressive-type Y data having a frame frequency of 30 Hz generated by thinning out the pixel data output from the latch circuit 81 by half between the first and second fields, and further by half between third and fourth fields.

The U data and the V data are also progressive-type data having a frame frequency of 30 Hz, thinned out by half in the horizontal direction and in the vertical direction in the same way.

As described above, the Y data, the U data, and the V data of the image output from the thinning-out filter 43 are progressive-type, thinned-out data having a frame frequency of 30 Hz.

Figure 7:
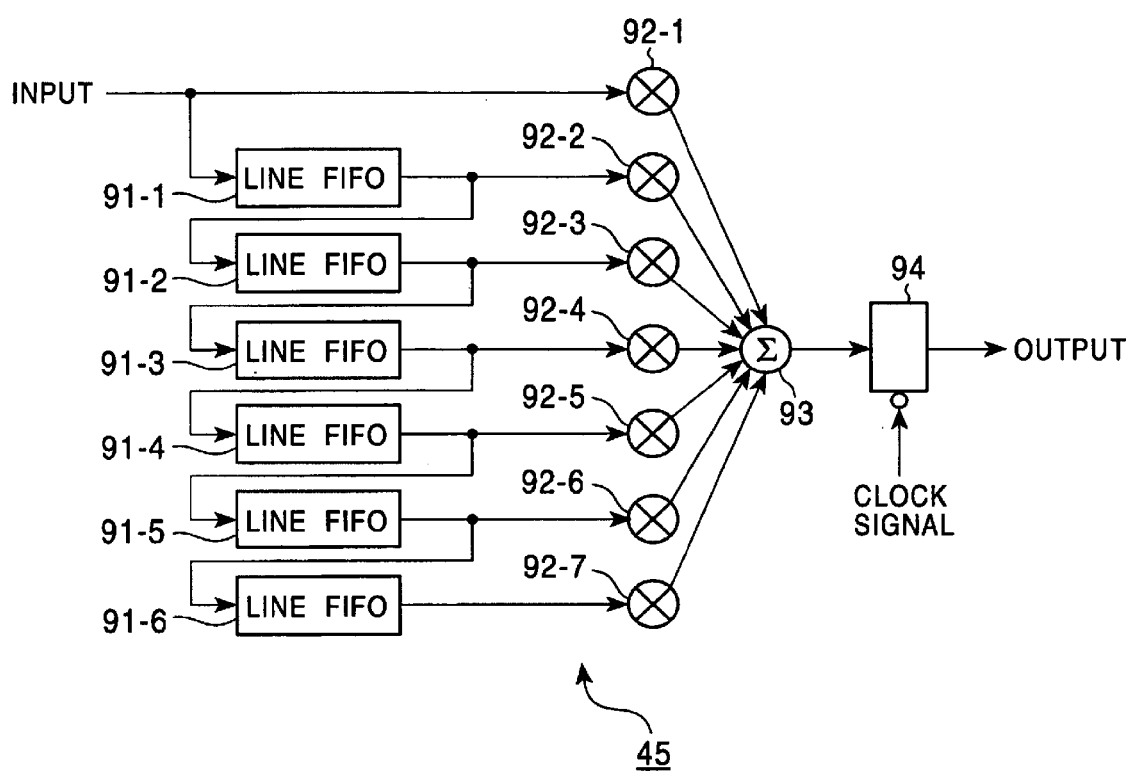
FIG. 7 is a block diagram showing the structure of a UV vertical ½ circuit 45.

The UV vertical ½ circuit 45 will be described next. FIG. 7 is a block diagram showing the structure of the UV vertical ½ circuit 45. The UV vertical ½ circuit 45 receives the progressive-type, thinned-out U data and V data having a frame frequency of 30 Hz, from the thinning-out filter 43. The input data is sequentially delayed by one line by each of line FIFOs 91-1 to 91-6, and sent to a subsequent stage. A multiplication circuit 92-1 multiplies the input data by a coefficient, and outputs the product to an adder 93. Multiplication circuits 92-2 to 92-7 multiply the data input from the line FIFOs 91-1 to 91-6 by coefficients and output the products to the adder 93.

The adder 93 adds the data sent from the multiplication circuits 92-1 to 92-7 and sends the sum to a latch circuit 94. The latch circuit 94 latches the input data when a clock signal is input.

Figure 8:
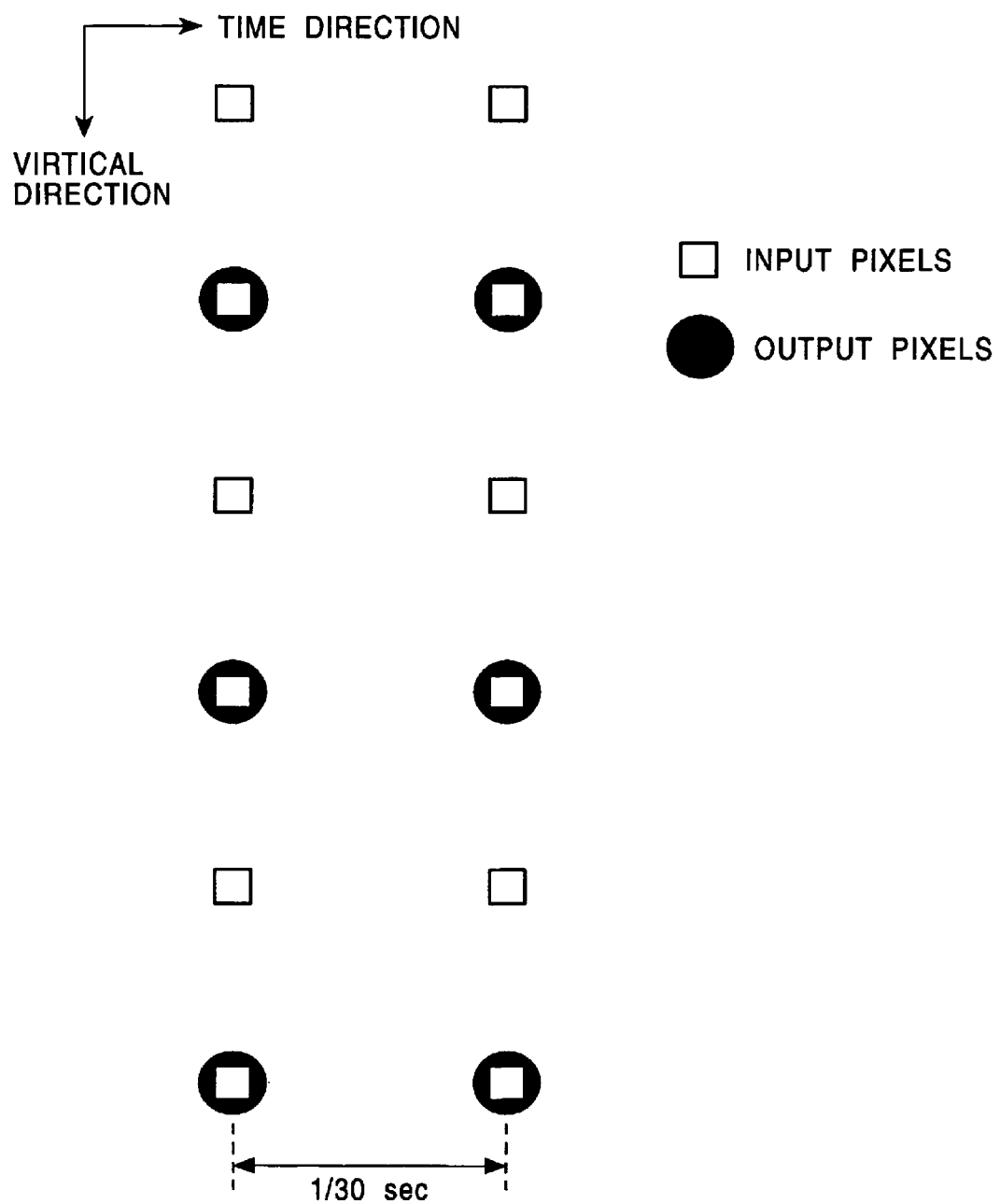
FIG. 8 is a view showing the output of a latch circuit 94.

The operation of the UV vertical ½ circuit 45 will be described by referring to FIG. 8. The data of pixels (indicated by white squares in FIG. 8) disposed on seven consecutive lines at the same position in the horizontal direction on the screen is input to the multiplication circuits 92-1 to 92-7. The multiplication circuits 92-1 to 92-7 multiply the input data by coefficients. The adder 93 adds the outputs of the multiplication circuits 92-1 to 92-7 and outputs the sum. The latch circuit 94 receives a latch signal at timing (indicated by black squares in FIG. 8) once in two lines. As described above, the UV vertical ½ circuit 45 thins out the number of lines of the U data and the V data by half and outputs the results.

The Y data passes through the UV vertical ½ circuit 45.

Figure 9:
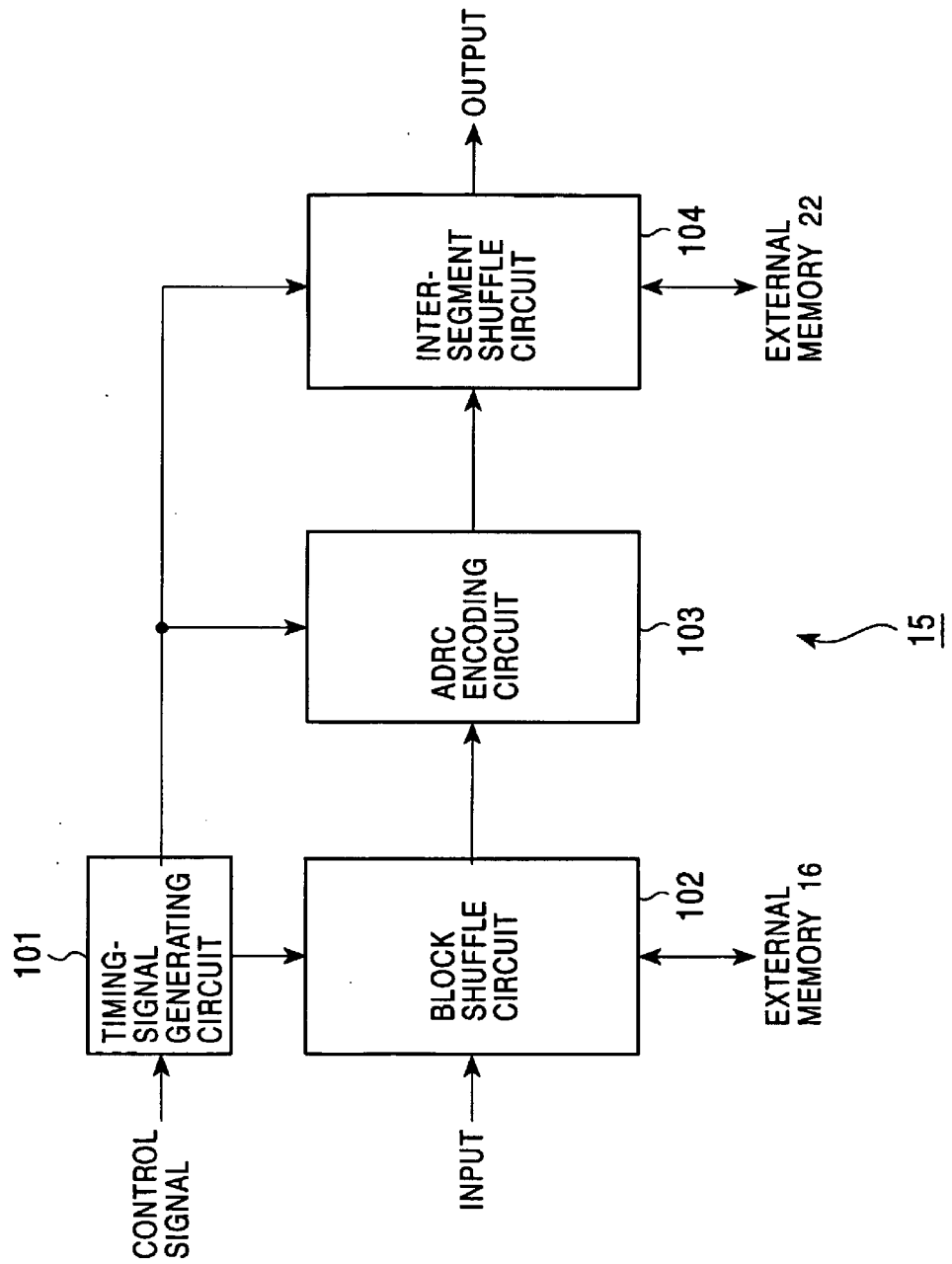
FIG. 9 is a block diagram showing the structure of an encoding circuit 15.

The encoding circuit 15 will be described next. FIG. 9 is a block diagram showing the structure of the encoding circuit 15. The control signal sent from the control circuit 21 is input to a timing-signal generating circuit 101. The timing-signal generating circuit 101 generates a timing signal according to the input control signal, and sends it to a block shuffle circuit 102, to an ADRC encoding circuit 103, and to an inter-segment shuffle circuit 104.

The converted Y data, U data, and V data are input from the format conversion circuit 14 to the block shuffle circuit 102. The block shuffle circuit 102 temporarily stores the sent Y data, U data, and V data in the external memory 16. The block shuffle circuit 102 re-arranges the Y data, U data, and V data stored in the external memory 16 in an ADRC-block format, described later, shuffles them in the ranges of segments, described later, in units of ADRC blocks, and sends them to the ADRC encoding circuit 103.

The ADRC encoding circuit 103 encodes the Y data, U data, and V data sent from the block shuffle circuit 102 according to the ADRC method, and sends them to the inter-segment shuffle circuit 104. The inter-segment shuffle circuit 104 temporarily stores the sent data encoded by ADRC in an external memory 22.

The inter-segment shuffle circuit 104 shuffles the ADRC data stored in the external memory 22 by changing writing and reading addresses. This shuffling is achieved in the inter-segment shuffle circuit 104 in order to increase the possibility of receiving any of the dynamic range DR, the minimum value MIN, and the motion flag MF at the receiving apparatus 2 even if data is missing in the transmission path, and in order that the receiving apparatus 2 easily extracts each code Q separately even if data is missing in the transmission path.

Figure 10:
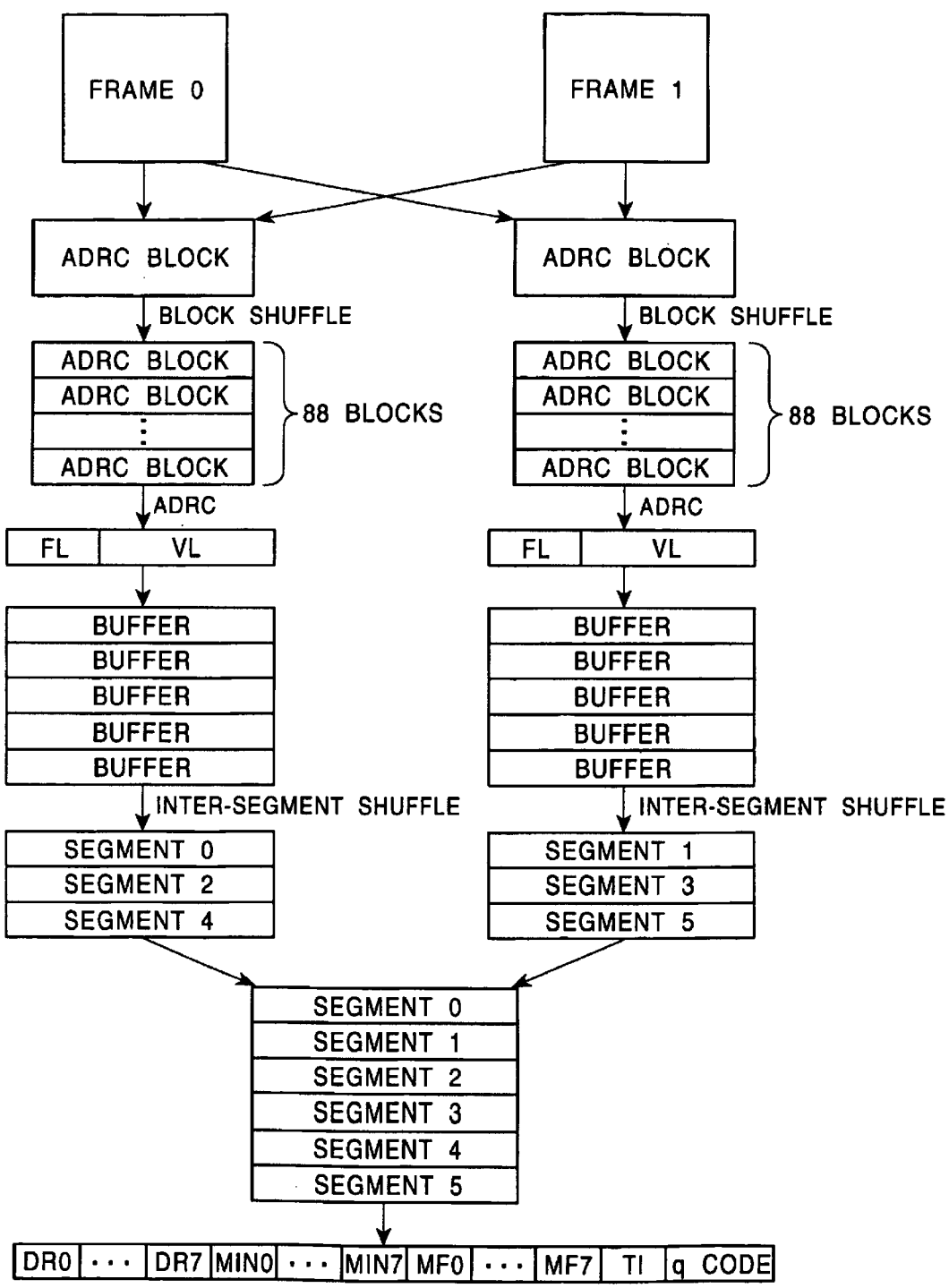
FIG. 10 is a view showing the unit of processing.

The unit of processing achieved in the encoding circuit 15 and the packetizing circuit 17 will be described below by referring to FIG. 10. From a frame 0 and the next frame 1, pixels are selected to generate 1320 even-numbered-segment ADRC blocks (each having four by 16 pixels) and 1320 odd-numbered-segment ADRC blocks (each having four by 16 pixels) by a method described later. The block shuffle circuit 102 selects 88 ADRC blocks from the generated even-numbered-segment and odd-numbered-segment ADRC blocks. The ADRC encoding circuit 103 encodes each set of the selected 88 ADRC blocks into a dynamic range DR, the minimum value MIN, a motion flag MF, and a table index TI, which are all fixed-length data (FL), and into a code Q, which is variable-length data (VL).

The inter-segment shuffle circuit 104 collects five sets (hereinafter called a segment) of the encoded data (each set hereinafter called a buffer) corresponding to 88 ADRC blocks output from the ADRC encoding circuit 103. The inter-segment shuffle circuit 104 shuffles three even-numbered segments (indicated by segment 0, segment 2, and segment 4 in FIG. 10) among the segments. The inter-segment shuffle circuit 104 shuffles three odd-numbered segments (indicated by segment 1, segment 3, and segment 5 in FIG. 10) among the segments.

The inter-segment-shuffled segments are arranged in the order of segment 0, segment 1, segment 2, segment 3, segment 4, and segment 5.

The packetizing circuit 17 places the encoded data put in the segments, arranged in the order of segment 0, segment 1, segment 2, segment 3, segment 4, and segment 5, into packets in units of data groups (dynamic ranges DR, the minimum values MIN, motion flags MF, table indexes TI, and codes Q) corresponding to eight ADRC blocks.

Figure 11:
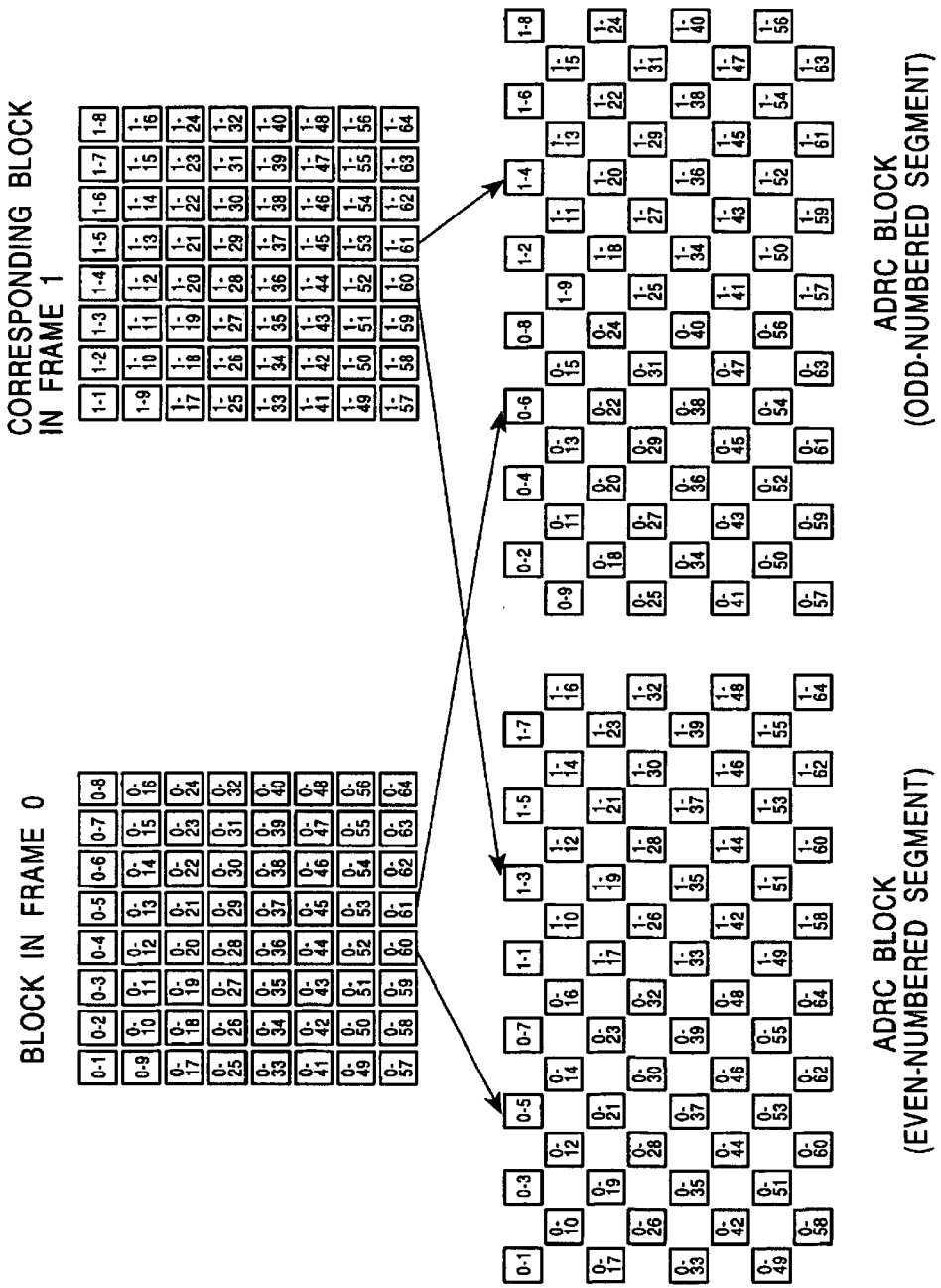
FIG. 11 is a view showing ADRC blocks.

The operation of the block shuffle circuit 102 will be described below by referring to FIG. 11 to FIG. 18. FIG. 11 is a view of ADRC blocks. A block having 64 pixels formed of eight horizontal pixels by eight vertical pixels adjacent to each other is selected from each frame. The pixel (indicated by 0-1 or 1-1 in the figure) disposed at the upper left corner of the block, which is used as a reference pixel, the pixel (indicated by 0-3 or 1-3 in the figure) horizontally shifted from the reference pixel by two pixels, the pixel (indicated by 0-17 or 1-17 in the figure) vertically shifted from the reference pixel by two pixels, and the pixel (indicated by 0-10 or 1-10 in the figure) shifted from the reference pixel by one pixel horizontally and by one pixel vertically are called even-numbered pixels. Pixels disposed in the same positional relationship as those described above are further selected repeatedly with selected pixels being used as reference pixels, and are set to even-numbered pixels.

The remaining pixels in each frame are called odd-numbered pixels.

As shown in FIG. 11, even-numbered pixels (four by eight pixels) included in a block "i" formed of eight by eight pixels in an even-numbered frame (frame 0) and even-numbered pixels (four by eight pixels) included in a block formed of eight by eight pixels in an odd-numbered frame (frame 1) are collected to form an even-numbered-segment ADRC block. In the same way, odd-numbered pixels (four by eight pixels) included in a block formed of eight by eight pixels in an even-numbered frame (frame 0) and odd-numbered pixels (four by eight pixels) included in a block formed of eight by eight pixels in an odd-numbered frame (frame 1) are collected to form an odd-numbered-segment ADRC block. An ADRC block is formed of pixels alternately disposed in each of two frames. The pixels disposed in the original frames adjacently to pixels constituting an even-numbered-segment ADRC block form the corresponding odd-numbered-segment ADRC block.

Figure 12:
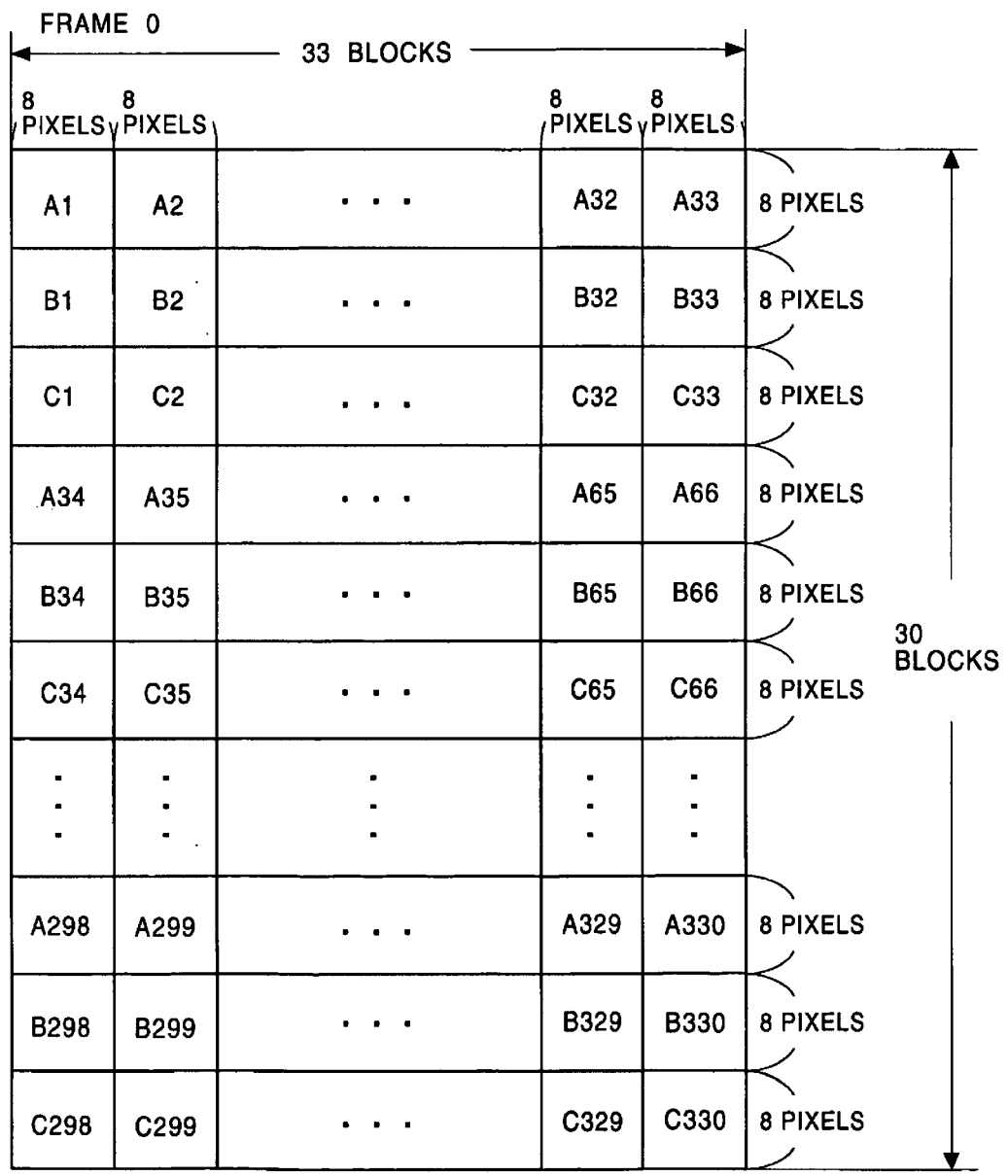
FIG. 12 is a view showing the relationship between pixels in a frame and ADRC blocks.
Figure 13:
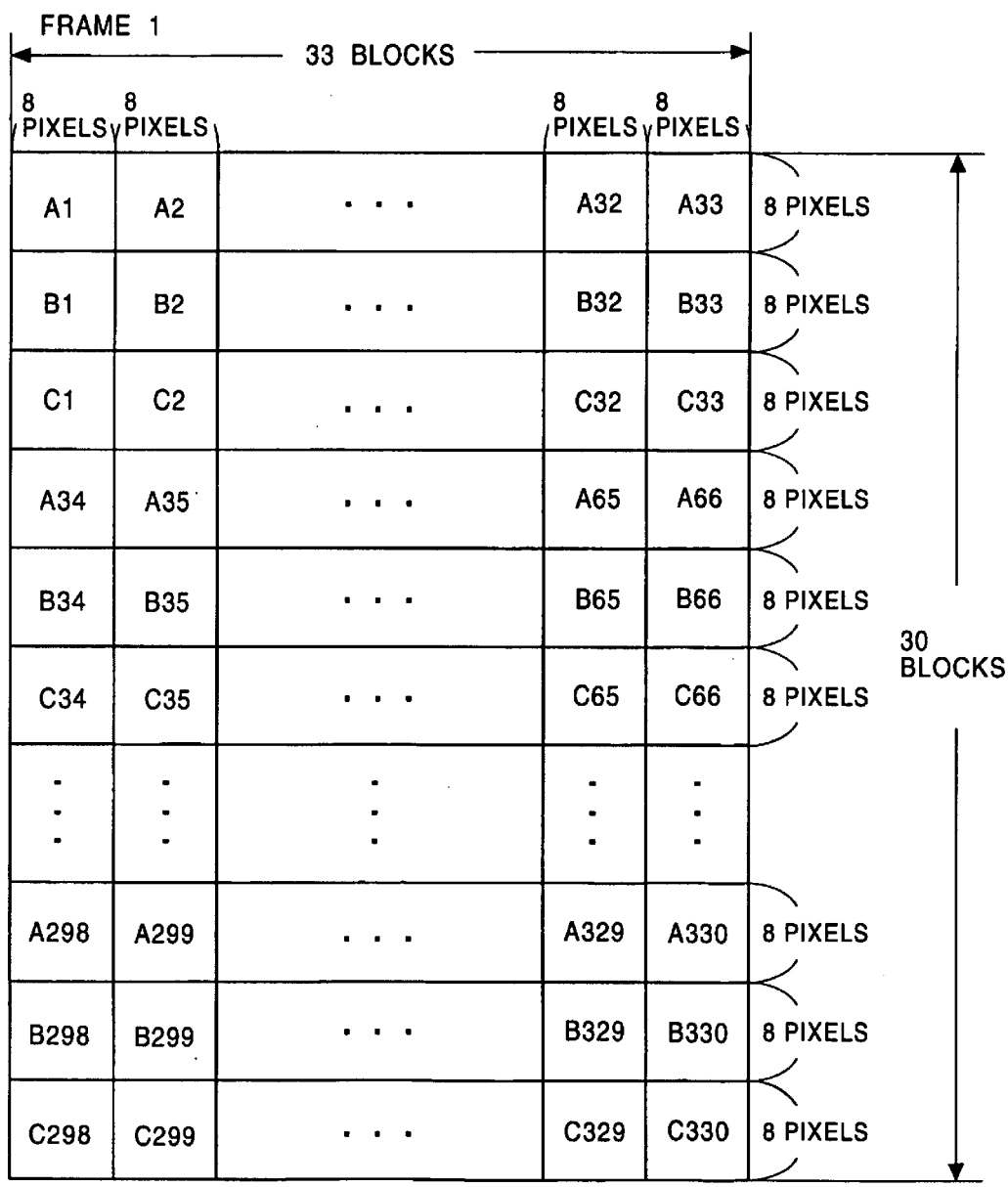
FIG. 13 is a view showing the relationship between pixels in a frame and ADRC blocks.

FIG. 12 to FIG. 14 show the relationships between pixels in frames and ADRC blocks. As shown in FIG. 12, the pixels in frame 0 are divided into blocks each having 64 pixels formed of eight horizontal pixels and eight vertical pixels. In the same way, the pixels in frame 1 (the next frame of frame 0) are divided into blocks each having 64 pixels formed of eight horizontal pixels and eight vertical pixels, as shown in FIG. 13. The even-numbered-segment ADRC block formed of the even-numbered pixels in the 64-pixel block (64-pixel block indicated by A1 in FIG. 12) disposed at the upper left corner of the blocks of frame 0 and the even-numbered pixels in the 64-pixel block (64-pixel block indicated by A1 in FIG. 13) disposed at the upper left corner of the blocks of frame 1 is positioned at the upper left corner as segment 0, as shown in FIG. 14.

The odd-numbered-segment ADRC block formed of the odd-numbered pixels in the 64-pixel block indicated by A1 in FIG. 12 and the odd-numbered pixels in the 64-pixel block indicated by A1 in FIG. 13 is positioned next to the segment-0 even-numbered-segment ADRC block at the right as segment 3, as shown in FIG. 14.

The even-numbered-segment ADRC block formed of the even-numbered pixels in the 64-pixel block indicated by A2 in FIG. 12 and the even-numbered pixels in the 64-pixel block indicated by A2 in FIG. 13 is positioned as segment 0 next to the segment-3 ADRC block formed of the odd-numbered pixels in the 64-pixel block indicated by A1 in FIG. 12 and the odd-numbered pixels in the 64-pixel block indicated by A1 in FIG. 13, at the right, as shown in FIG. 14. The odd-numbered-segment ADRC block formed of the odd-numbered pixels in the 64-pixel block indicated by A2 in FIG. 12 and the odd-numbered pixels in the 64-pixel block indicated by A2 in FIG. 13 is positioned as segment 3 next to the segment-0 ADRC block formed of the even-numbered pixels in the 64-pixel block indicated by A2 in FIG. 12 and the even-numbered pixels in the 64-pixel block indicated by A2 in FIG. 13, at the right, as shown in FIG. 14.

The even-numbered-segment ADRC block formed of the even-numbered pixels in the 64-pixel block indicated by B1 in FIG. 12 and the even-numbered pixels in the 64-pixel block indicated by B1 in FIG. 13 is positioned as segment 4 next to the segment-0 ADRC block formed of the even-numbered pixels in the 64-pixel block indicated by A1 in FIG. 12 and the even-numbered pixels in the 64-pixel block indicated by A1 in FIG. 13, at the lower side, as shown in FIG. 14. The odd-numbered-segment ADRC block formed of the odd-numbered pixels in the 64-pixel block indicated by B1 in FIG. 12 and the odd-numbered pixels in the 64-pixel block indicated by B1 in FIG. 13 is positioned as segment 1 next to the segment-3 ADRC block formed of the odd-numbered pixels in the 64-pixel block indicated by A1 in FIG. 12 and the odd-numbered pixels in the 64-pixel block indicated by A1 in FIG. 13, at the lower side (next to the segment-4 ADRC block at the right), as shown in FIG. 14.

The even-numbered-segment ADRC block formed of the even-numbered pixels in the 64-pixel block indicated by B2 in FIG. 12 and the even-numbered pixels in the 64-pixel block indicated by B2 in FIG. 13 is positioned as segment 4 next to the segment-1 ADRC block formed of the odd-numbered pixels in the 64-pixel block indicated by B1 in FIG. 12 and the odd-numbered pixels in the 64-pixel block indicated by B1 in FIG. 13, at the right, as shown in FIG. 14. The odd-numbered-segment ADRC block formed of the odd-numbered pixels in the 64-pixel block indicated by B2 in FIG. 12 and the odd-numbered pixels in the 64-pixel block indicated by B2 in FIG. 13 is positioned as segment 1 next to the even-numbered-segment ADRC block formed of the even-numbered pixels in the 64-pixel block indicated by B2 in FIG. 12 and the even-numbered pixels in the 64-pixel block indicated by B2 in FIG. 13, at the right, as shown in FIG. 14.

The even-numbered-segment ADRC block formed of the even-numbered pixels in the 64-pixel block indicated by C1 in FIG. 12 and the even-numbered pixels in the 64-pixel block indicated by C1 in FIG. 13 is positioned as segment 2 next to the segment-4 ADRC block formed of the even-numbered pixels in the 64-pixel block indicated by B1 in FIG. 12 and the even-numbered pixels in the 64-pixel block indicated by B1 in FIG. 13, at the lower side, as shown in FIG. 14. The odd-numbered-segment ADRC block formed of the odd-numbered pixels in the 64-pixel block indicated by C1 in FIG. 12 and the odd-numbered pixels in the 64-pixel block indicated by C1 in FIG. 13 is positioned as segment 5 next to the segment-1 ADRC block formed of the odd-numbered pixels in the 64-pixel block indicated by B1 in FIG. 12 and the odd-numbered pixels in the 64-pixel block indicated by B1 in FIG. 13, at the lower side (next to the segment-2 ADRC block at the right), as shown in FIG. 14.

The even-numbered-segment ADRC block formed of the even-numbered pixels in the 64-pixel block indicated by C2 in FIG. 12 and the even-numbered pixels in the 64-pixel block indicated by C2 in FIG. 13 is positioned as segment 2 next to the segment-5 ADRC block formed of the odd-numbered pixels in the 64-pixel block indicated by C1 in FIG. 12 and the odd-numbered pixels in the 64-pixel block indicated by C1 in FIG. 13, at the right, as shown in FIG. 14. The odd-numbered-segment ADRC block formed of the odd-numbered pixels in the 64-pixel block indicated by C2 in FIG. 12 and the odd-numbered pixels in the 64-pixel block indicated by C2 in FIG. 13 is positioned as segment 5 next to the even-numbered-segment ADRC block formed of the even-numbered pixels in the 64-pixel block indicated by C2 in FIG. 12 and the even-numbered pixels in the 64-pixel block indicated by C2 in FIG. 13, at the right, as shown in FIG. 14.

The foregoing operation is repeated for 33 by 30 blocks (264 by 240 pixels) in each frame to generate a set of 66 by 30 ADRC blocks in the horizontal and vertical directions from the Y data of the two frames, as shown in FIG. 15A. The ADRC blocks generated from the Y data are shuffled to form segments, as shown in FIG. 15B.

The same process is applied to the U data and the V data each having 88 by 120 pixels. A set of 22 by 15 ADRC blocks in the horizontal and vertical directions is formed as shown in FIG. 16A. In the same way as for the Y data, the ADRC blocks generated from the U data and the V data are block-shuffled to form segments, as shown in FIG. 16B.

In each ADRC block, the absolute values of the differences between the pixel values of pixels (such as those indicated by 0-1 and 1-1 in FIG. 11) disposed at the same position on a screen in an even-numbered frame and an odd-numbered frame are obtained. When the maximum value among the absolute values of the differences is smaller than a threshold Th1, the ADRC block is regarded as a still-picture block.

When the maximum value among the absolute values of the differences exceeds a threshold Th2 (Th1<Th2), the ADRC block is regarded as a motion-picture block.

In a still-picture ADRC block, the averages of the pixel values of pixels disposed at the same positions on the screen in an even-numbered frame and an odd-numbered frame are obtained, the 32 averages are used as the values of the ADRC block, and a motion flag MF attached to the ADRC block is set to 0.

In a motion-picture ADRC block, 64 pixels collected from an even-numbered frame and an odd-numbered frame are used as they are in the ADRC block, and a motion flag MF attached to the ADRC block is set to 1.

Shuffling achieved in units of ADRC blocks in each segment will be described next. In the segment formed of Y-data ADRC blocks to which number 0 is assigned, number y0 to y329 are sequentially assigned to the ADRC blocks, as shown in FIG. 17A. The ADRC blocks are shuffled to arrange them as shown in FIG. 17B.

In the same way, in the segment formed of U-data ADRC blocks to which number 0 is assigned, number u0 to u54 are sequentially assigned to the ADRC blocks, as shown in FIG. 17C. The ADRC blocks are re-arranged in the reverse order as shown in FIG. 17D.

In the segment formed of V-data ADRC blocks to which number 0 is assigned, number v0 to v54 are sequentially assigned to the ADRC blocks, as shown in FIG. 17E. The ADRC blocks are re-arranged in the reverse order as shown in FIG. 17F.

Next, as shown in FIG. 18, Y-data ADRC blocks, U-data ADRC blocks, and V-data ADRC blocks are shuffled. Three Y-data ADRC blocks are disposed first, then, one U-data ADRC block is placed, three Y-data ADRC blocks follow, and then, one V-data ADRC block is disposed. This arrangement is repeated. In segment 0, for example, the ADRC blocks are arranged in the order of the ADRC block having a sequential number of y0, the ADRC block having a sequential number of y221, the ADRC block having a sequential number of y112, the ADRC block having a sequential number of u54, the ADRC block having a sequential number of y3, the ADRC block having a sequential number of y224, the ADRC block having a sequential number of y115, the ADRC block having a sequential number of v54, the ADRC block having a sequential number of y6, and so on.

In segment 1 to segment 5, ADRC blocks are shuffled in the same way.

As described above, the block shuffle circuit 102 shuffles pixel data in units of ADRC blocks, and the ADRC encoding circuit 103 encodes the shuffled ADRC block. When ADRC blocks are appropriately shuffled, pixels lost due to communication errors are dispersed, and missing pixels become difficult to recognize in a reproduced image. In addition, pixels can be created for the missing pixels from their surrounding pixels.

The structure of the ADRC encoding circuit 103 will be described next by referring to FIG. 19. An image shuffled by the block shuffle circuit 102 is input as ADRC blocks into a delay circuit 161, a motion-characteristic-amount calculation circuit 162, a DR calculation circuit 163, and a delay circuit 166.

The delay circuit 161 delays a two-frame block (ADRC block formed of four by 16 pixels) by the time period corresponding to the processing period of the motion-characteristic-amount calculation circuit 162, and outputs to an information-amount control circuit 164. The motion-characteristic-amount calculation circuit 162 calculates a motion-characteristic amount, the maximum value of the absolute values of the differences between frames, for each ADRC block, and sends it to the information-amount control circuit 164. The DR calculation circuit 163 calculates a dynamic range DR obtained when the image is determined to be a still-picture image, and a dynamic range DR obtained when the image is determined to be a motion-picture image, and sends them to the information-amount control circuit 164.

The information-amount control circuit 164 selects MF selection thresholds formed of thresholds Th1 and Th2 according to the two-frame block sent from the delay circuit 161, the motion-characteristic amount sent from the motion-characteristic-amount calculation circuit 162, the dynamic range DR obtained when the image is determined to be a still-picture image and the dynamic range DR obtained when the image is determined to be a motion-picture image, sent from the DR calculation circuit 163, and the sets of thresholds Th1 and Th2 and thresholds T1 and T2 sent from a threshold table 165, and outputs them to a still/motion determination circuit 169.

The information-amount control circuit 164 also selects a Q-bit selection threshold according to the two-frame block, the motion-characteristic amount, the dynamic range DR obtained when the image is determined to be a still-picture image and the dynamic range DR obtained when the image is determined to be a motion-picture image, and the sets of thresholds Th1 and Th2 and thresholds T1 and T2 sent from the threshold table 165, and outputs it to an ADRC encoder 171.

It is assumed, for example, that the motion-characteristic amount is four, the dynamic range DR obtained when the image is determined to be a still-picture image is 14, the dynamic range DR obtained when the image is determined to be a motion-picture image is 15; the threshold T1 is six, the threshold T2 is 12, the threshold Th1 is three, and the threshold Th2 is three when the table index is 0; and the threshold T1 is 13, the threshold T2 is 40, the threshold Th1 is five, and the threshold Th2 is five when the table index is 1.

Since the motion-characteristic amount, which is 4, is larger than the threshold Th2, which is 3, of the sets of thresholds obtained when the table index is 0, the information-amount control circuit 164 determines that the image is a motion picture. The dynamic range DR, which is 15, obtained when the image is determined to be a motion picture is larger than the threshold T2, which is 3. Therefore, the ADRC block has a "q" of 4. The information-amount control circuit 164 determines that the code Q has (16*4) *4=256 bits.

In the same way, since the motion-characteristic amount is smaller than the threshold Th1 of the sets of thresholds obtained when the table index is 1, the information-amount control circuit 164 determines that the image is a still picture. The dynamic range DR obtained when the image is determined to be a still picture is larger than the threshold T1 and smaller than the threshold T2. Therefore, the ADRC block has a "q" of 3. The information-amount control circuit 164 determines that the code Q has (8*4)*3=96 bits.

As described above, the thresholds are specified such that the amount of information decreases as the table index increases. The information-amount control circuit 164 selects the table index corresponding to the largest amount of information obtained when the code Q generated for one buffer is 16,104 bits or less, as the table index TI, and sends it to a delay circuit 173.

The information-amount control circuit 164 may calculate in parallel the numbers of bits for the codes Q corresponding to table indexes, or may calculate the number of bits for the code Q corresponding to each table index one by one from the largest (or smaller) table index.

Figure 20:
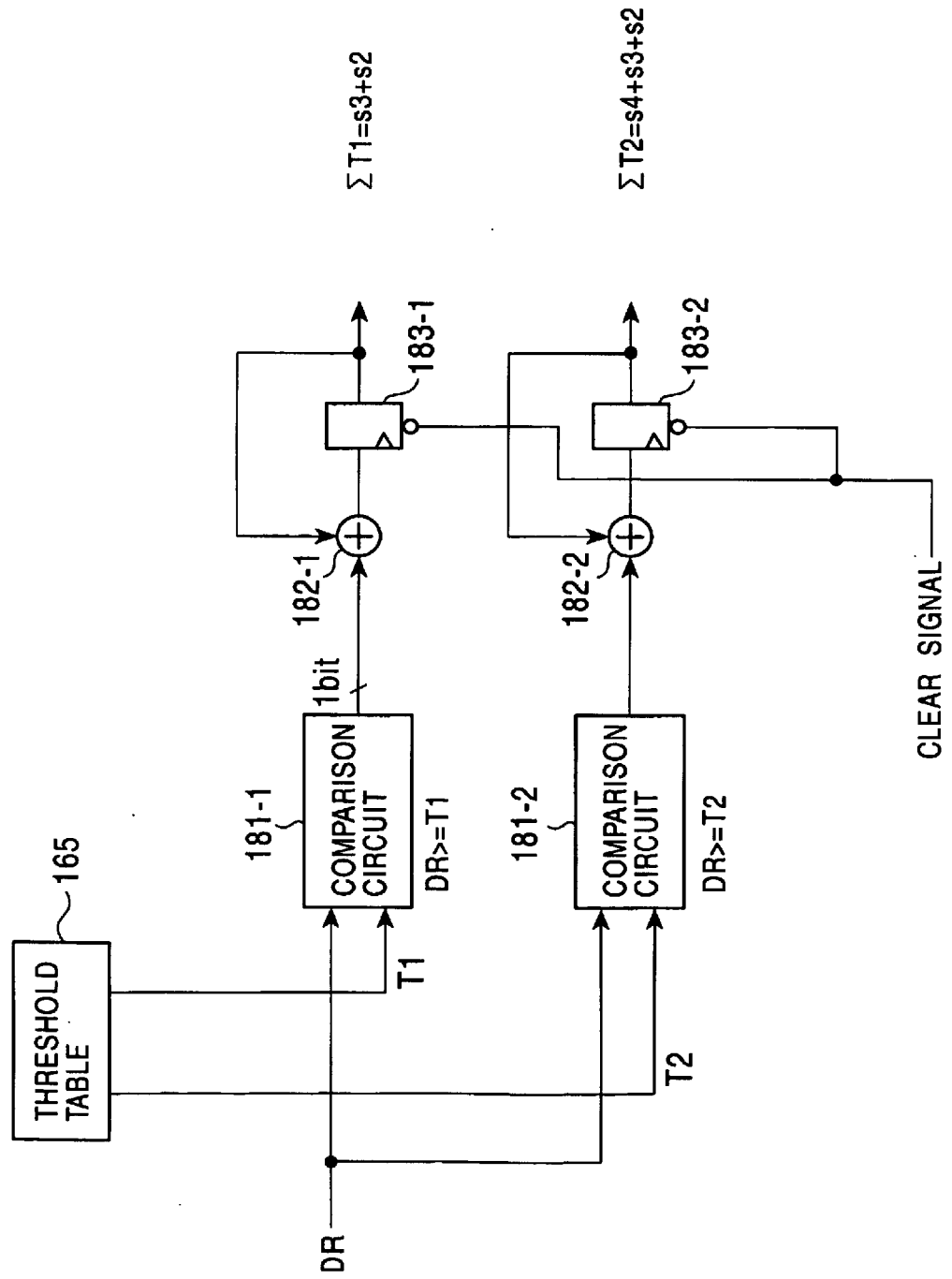
FIG. 20 is a view showing the structure of an information-amount control circuit 164.
Figure 21:
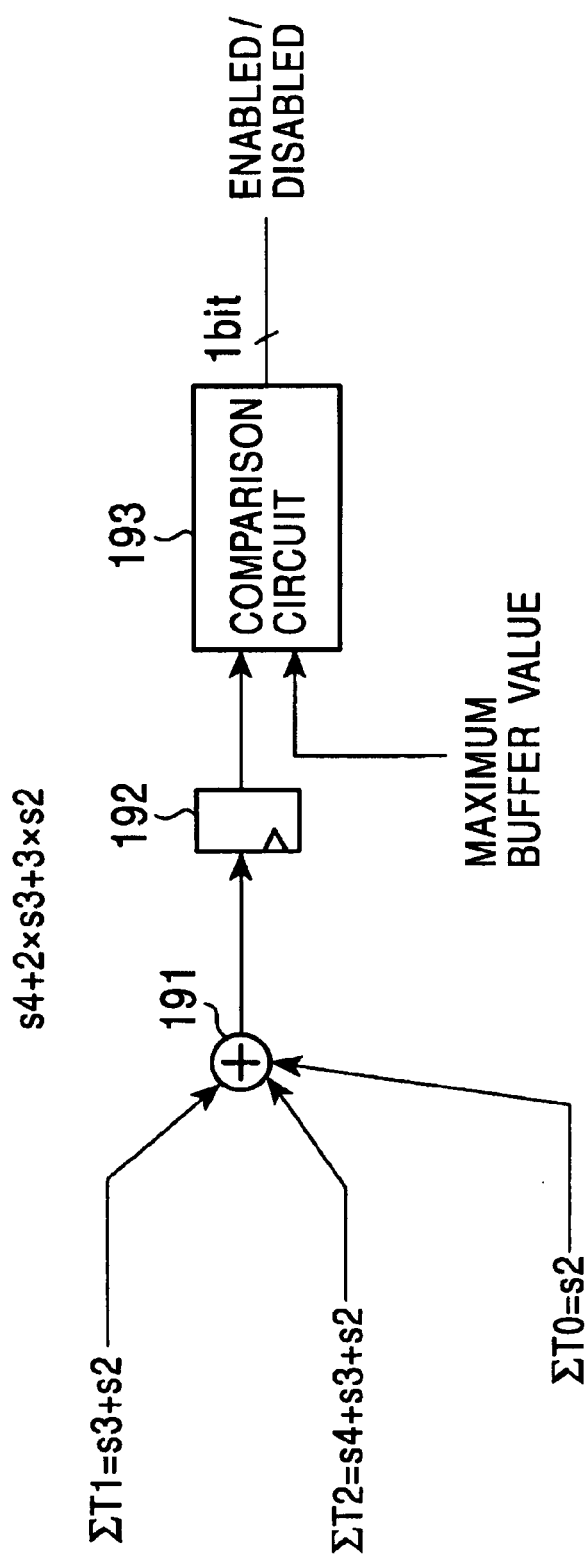
FIG. 21 is a view showing the structure of the information-amount control circuit 164.

An example structure of the information-amount control circuit 164 will be described below by referring to FIG. 20 and FIG. 21. FIG. 20 is a view showing the structure of the front-stage section of the information-amount control circuit 164, and FIG. 21 is a view showing the back-stage section of the information-amount control circuit 164.

As shown in FIG. 20, the front-stage section of the information-amount control circuit 164 is provided with comparison circuits 181-1 and 181-2, adders 182-1 and 182-2, and registers 183-1 and 183-2, the number of each type of circuits corresponding to that of the thresholds in the dynamic range DR. The dynamic range DR, which can be a value from 0 to 255, is input to one of input terminals of each of the comparison circuits 181-1 and 181-2.

Also in FIG. 20, the threshold T1 and the threshold T2, for example, are read from the threshold table 165, and are input to the other input terminals of the comparison circuits 181-1 and 181-2. Specifically, the threshold T1 is sent to the other input terminal of the comparison circuit 181-1, and the threshold T2 is sent to the other input terminal of the comparison circuit 181-2.

When the dynamic range DR sent from the input terminal 5 is equal to or larger than each threshold, the comparison circuits 181-1 and 181-2 output "1." The comparison outputs of the comparison circuits 181-1 and 181-2 are sent to input terminals of the adders 182-1 and 182-2 connected thereto. The addition outputs of the adders 182-1 and 182-2 are sent to the other input terminals of the adders 182-1 and 182-2 through the registers 183-1 and 183-2.

Therefore, the adder 182-1 calculates the accumulated number of times DR falls in the range from T1 to 255, both inclusive, and the register 183-1 holds the obtained data. The adder 182-2 calculates the accumulated number of times DR falls in the range from T2 to 255, both inclusive, and the register 183-2 holds the obtained data.

The accumulated-number-of-times data held by the registers 183-1 and 183-2 is read and sent to an adder 191, as shown in FIG. 21. The number-of-times data stored in advance in the information-amount control circuit 164 is also sent to the adder 191. The adder 191 adds the accumulated number of times DR falls in the range of T1 to 255, both inclusive, the accumulated number of times DR falls in the range from T2 to 255, both inclusive, and the number-of-times data stored in advance to calculate the sum.

The number of times DR falls in the range from T1 to T2 −1, both inclusive, is called S3, and the number of times DR falls in the range from T2 to 255, both inclusive, is called S4. Then, the number of times DR falls in the range from T2 to 255, both inclusive, equals S4+S3+S2 (corresponding to the code Q having a "q" of four bits), and the number of times DR falls in the range from T1 to 255, both inclusive, equals S3+S2 (corresponding to the code Q having a "q" of three bits). Since S2 (corresponding to the code Q having a "q" of two bits) occurs in all ADRC blocks, it can be stored in advance in the information-amount control circuit 164. When these values are added by the adder 191, the output of S4+2*S3+3*S2 is obtained. This output is the same total amount as that obtained when assigned bits are multiplied and added.

The total amount calculated by the adder 191 is sent to one of input terminals of a comparison circuit 193 through a register 192. The maximum buffer value is sent to the other input terminal 12 of the comparison circuit 193. The total amount is compared with the maximum buffer value. According to the comparison result of the comparison circuit 193, thresholds are determined such that the total amount becomes equal to or less than the maximum buffer value. In other words, a plurality of sets of thresholds are stored in advance in the threshold table 165, which cause monotonic increase or monotonic decrease, and thresholds are specified so that the total amount falls within the target.

The information-amount control circuit 164 selects MF selection thresholds, Q-bit selection thresholds, and a table index TI according to the comparison result of the comparison circuit 193, and outputs them.

Figure 19:
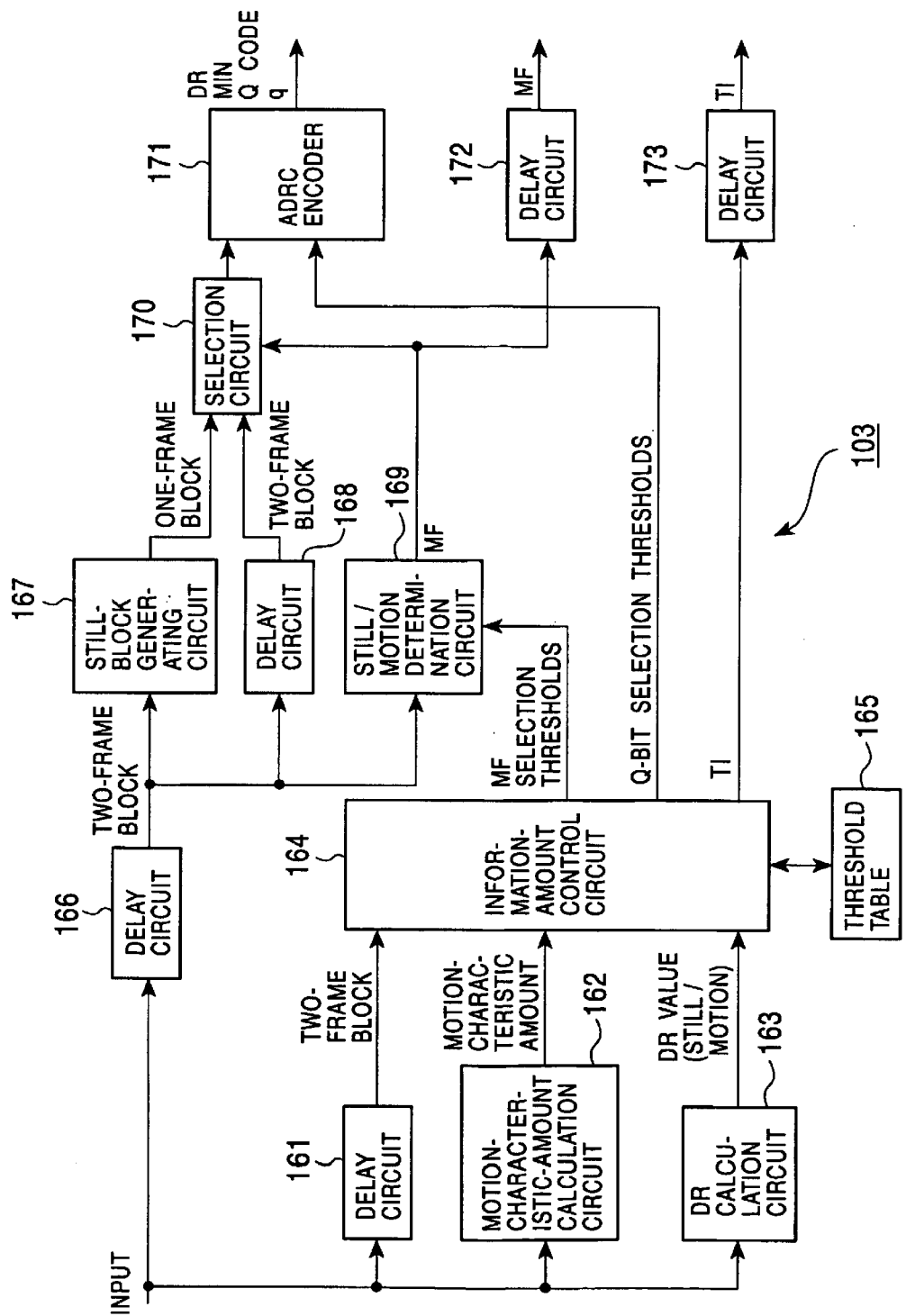
FIG. 19 is a view showing the structure of an ADRC encoding circuit 103.

Back to FIG. 19, the delay circuit 166 delays a two-frame block (ADRC block formed of four by 16 pixels) by the time period corresponding to the processing time periods of the delay circuit 161 and the information-amount control circuit 164, and outputs to a still-block generating circuit 167, a delay circuit 168, and the still/motion determination circuit 169. From the two-frame block (ADRC block formed of four by 16 pixels), the still-block generating circuit 167 obtains the averages of the pixel values of pixels disposed at the same position on the screen in the even-numbered frame and the odd-numbered frame, uses the 32 obtained averages as a new ADRC block, and sends it as a one-frame block (ADRC block having four by eight pixels) to a selection circuit 170.

The delay circuit 168 delays the two-frame block (ADRC block formed of four by 16 pixels) by the time period corresponding to the processing time of the still-block generating circuit 167, and sends it to the selection circuit 170.

From the two-frame block (ADRC block formed of four by 16 pixels) and the MF selection thresholds formed of the thresholds Th1 and Th2, the still/motion determination circuit 169 generates a motion flag MF attached to the ADRC block, and sends it to the selection circuit 170 and to a delay circuit 172.

The selection circuit 170 sends the two-frame block input from the delay circuit 168 to the ADRC encoder 171 when the motion flag MF is 1, namely, when the ADRC block corresponds to a motion picture, and sends the one-frame block input from the still-block generating circuit 167 to the ADRC encoder 171 when the motion flag MF is 0, namely, when the ADRC block corresponds to a still picture.

The ADRC encoder 171 encodes the two-frame block or the one-frame block sent from the selection circuit 170 according to the Q-bit selection thresholds, and outputs a dynamic range DR, the minimum value MIN, "q," and a code Q.

The delay circuit 172 delays the motion flag MF sent from the still/motion determination circuit 169 according to the processing time of the selection circuit 170 and the processing time of the ADRC encoder 171.

The delay circuit 173 delays the table index TI sent from the information-amount control circuit 164 according to the processing time of the delay circuit 168, the processing time of the selection circuit 170, and the processing time of the ADRC encoder 171, and outputs it.

As described above, the ADRC encoding circuit 103 generates a dynamic range DR, the minimum value MIN of pixel values, a motion flag MF, and a code Q for each ADRC block, and sends them together with an index TI for a quantization table to the inter-segment shuffle circuit 104.

Figure 22:
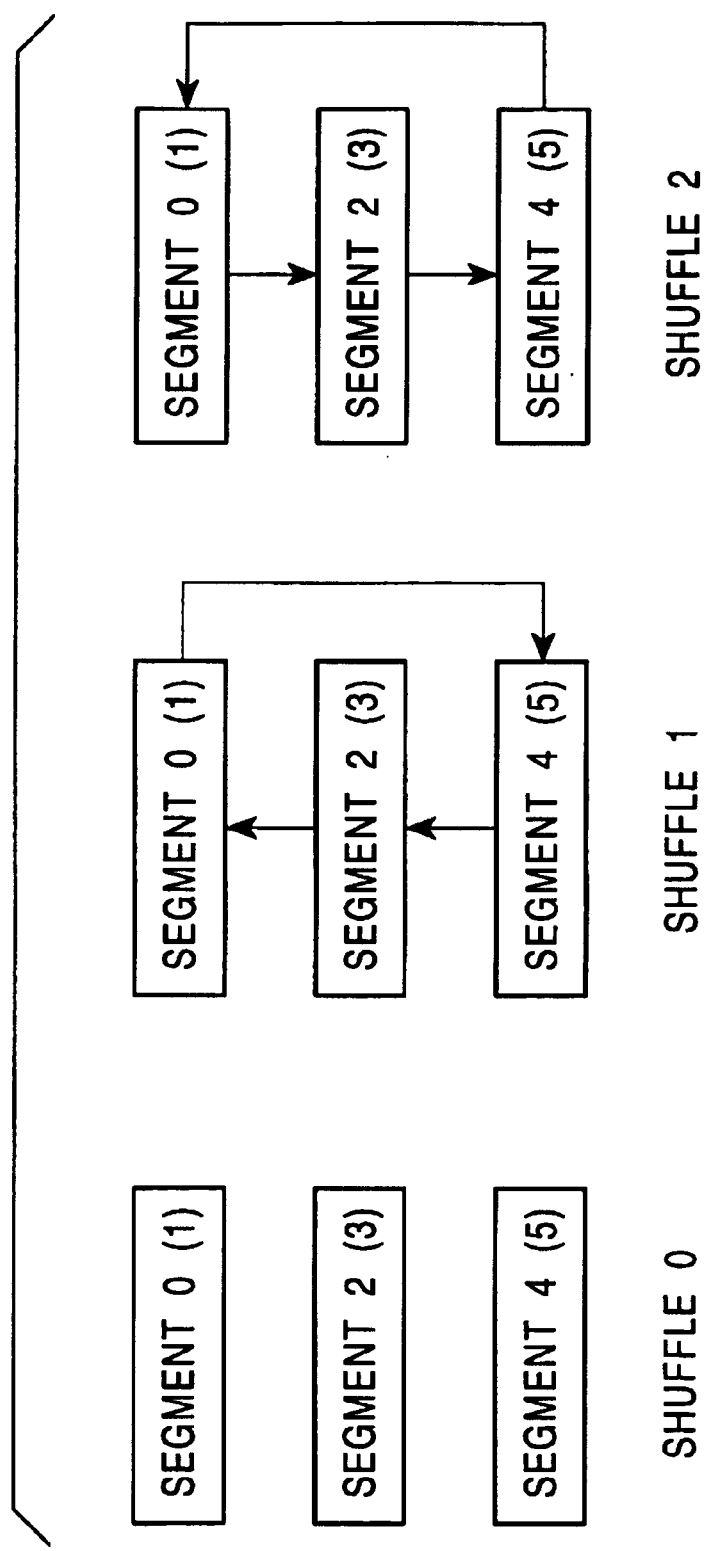
FIG. 22 is a view showing shuffling achieved in an inter-segment shuffle circuit 104.

FIG. 22 is a view showing the way of shuffling achieved in the inter-segment shuffle circuit 104. As shown in FIG. 22, there are three ways of shuffling, shuffle 0, shuffle 1, and shuffle 2. In shuffle 0, no shuffling is achieved. In shuffle 1, the segment-0 (segment-1) data is substituted for the segment-4 (segment-5) data, the segment-2 (segment-3) data is substituted for the segment-0 (segment-1) data, and the segment-4 (segment-5) data is substituted for the segment-2 (segment-3) data.

In shuffle 2, the segment-0 (segment-1) data is substituted for the segment-2 (segment-3) data, the segment-2

(segment-3) data is substituted for the segment-4 (segment-5) data, and the segment-4 (segment-5) data is substituted for the segment-0 (segment-1) data.

Figure 23:
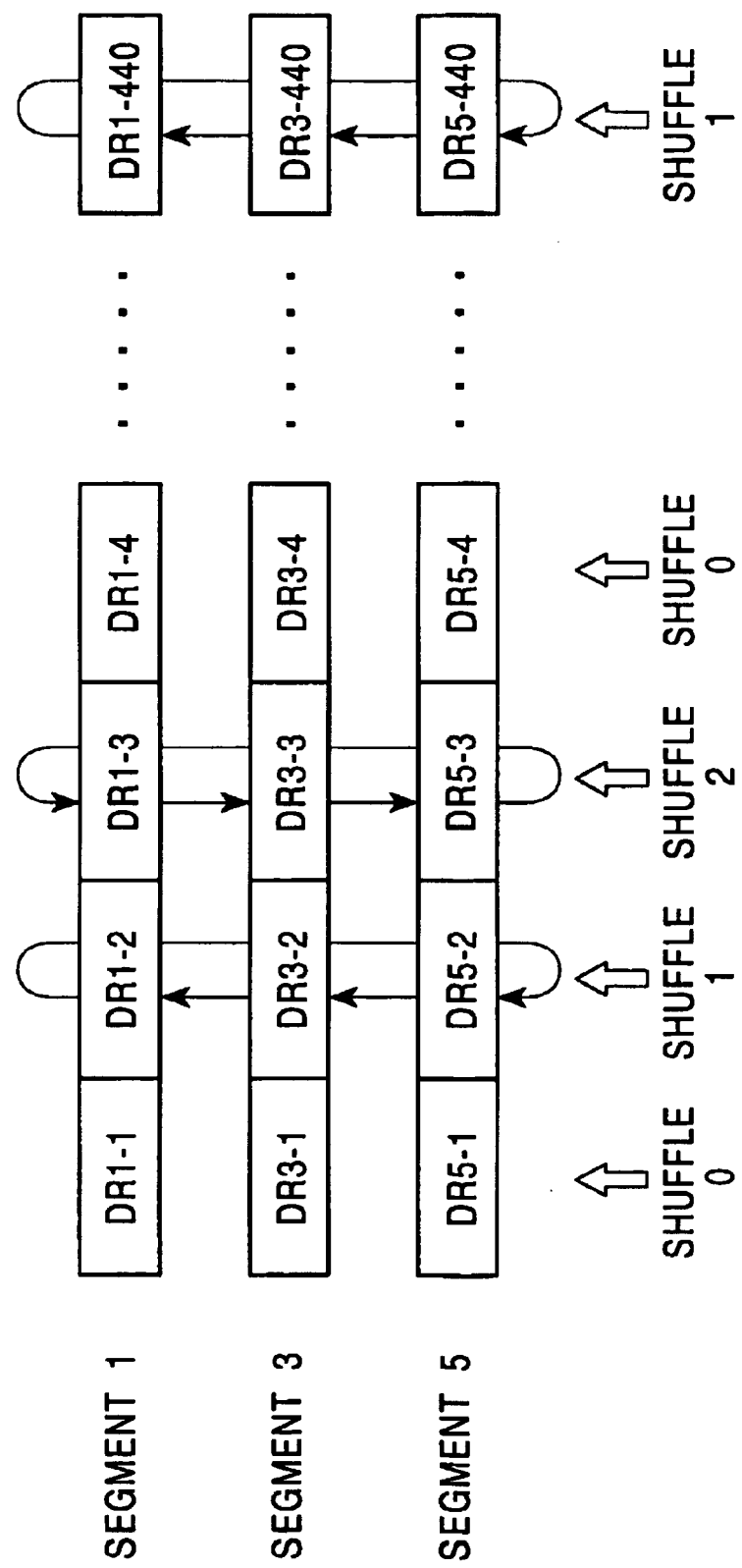
FIG. 23 is a view showing shuffling achieved in the inter-segment shuffle circuit 104.

FIG. 23 is a view of dynamic-range DR shuffling achieved for segment 1, segment 3, and segment 5. One segment is formed of five buffers, and one buffer includes 88 ADRC blocks. Therefore, one segment has 440 DRs. Numbers 1 to 440 are sequentially assigned to DRs included in each segment. In FIG. 23, the DR having number 1 in segment 1 is, for example, indicated by DR1-1.

Shuffling is applied to the DRs in the order of shuffle 0, shuffle 1, and shuffle 2 such that shuffle 0 (no substitution) is applied to the DRs having number 1 in each segment, shuffle 1 is applied to the DRs having number 2, shuffle 2 is applied to the DRs having number 3, shuffle 0 is applied to the DRs having number 4, and so on.

Figure 24:
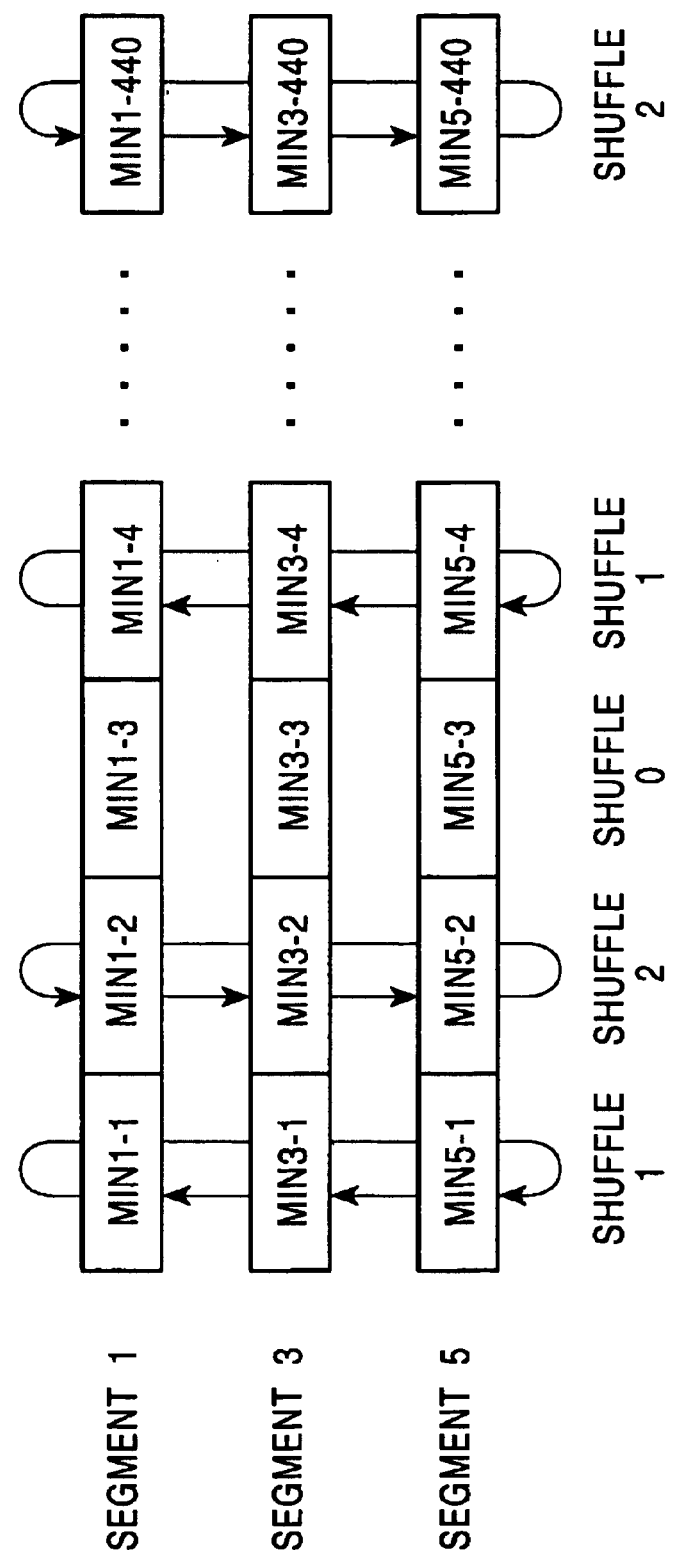
FIG. 24 is a view showing shuffling achieved in the inter-segment shuffle circuit 104.
Figure 25:
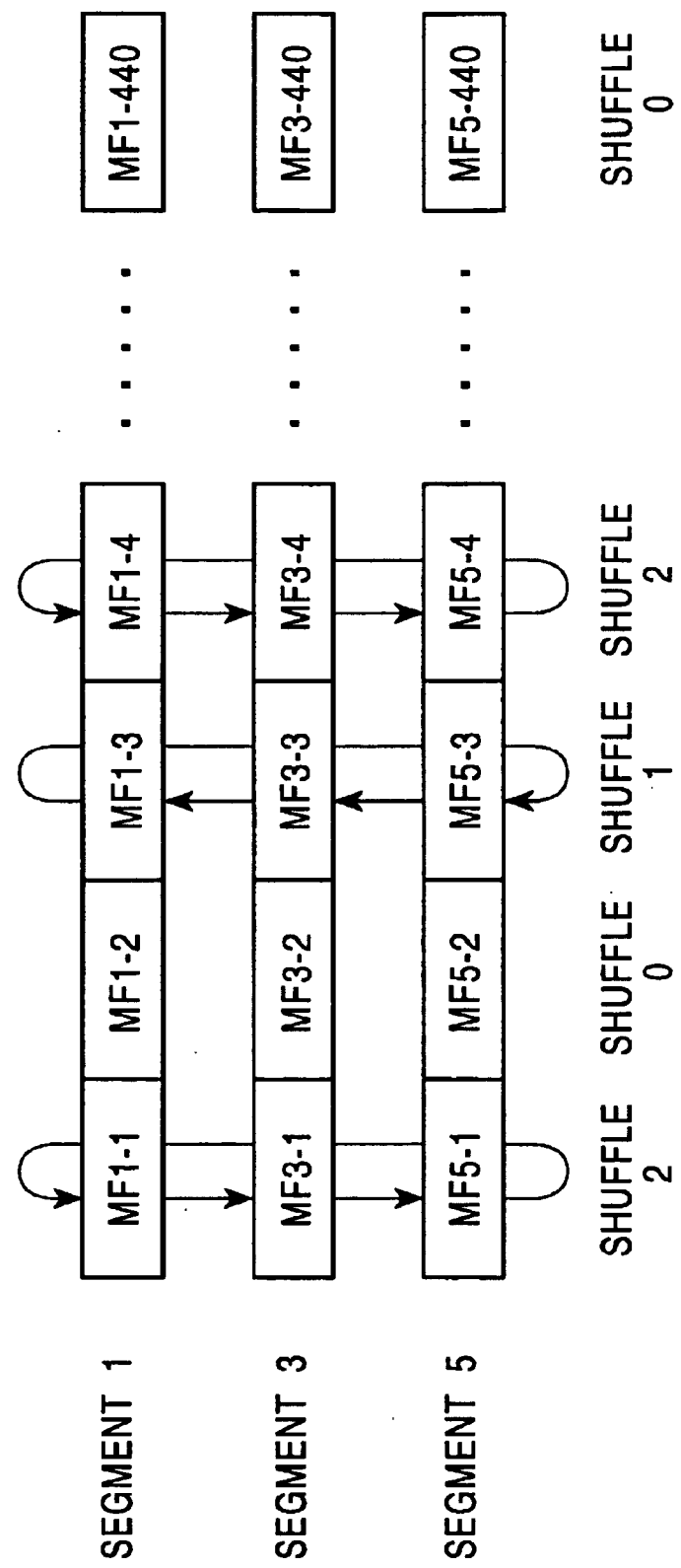
FIG. 25 is a view showing shuffling achieved in the inter-segment shuffle circuit 104.

Shuffling is also applied to codes Q in the same way. Shuffling is applied to the minimum values MIN of pixel values in the order of shuffle 1, shuffle 2, and shuffle 0, as shown in FIG. 24. Shuffling is also applied to motion flags MF in the order of shuffle 2, shuffle 0, and shuffle 1, as shown in FIG. 25.

Shuffling applied to quantization-table indexes TI will be described next. The TI stored in segment 0 is also stored in segment 3, and the TI stored in segment 3 is also stored in segment 0. In other words, each of segment 0 and segment 3 stores both of its own TI and the TI of the other segment. In the same way, each of segment 1 and segment 4 stores both of its own TI and the TI of the other segment, and each of segment 2 and segment 5 stores both of its own TI and the TI of the other segment.

Since the dynamic ranges DRs, the minimum values MINs of pixel values, and the motion flags MFs are shuffled as described above, even if a communication error occurs and a packet including any data is lost, the receiving apparatus 2 can recover the lost data according to the other data which can be received when a predetermined ADRC block is decoded. In addition, since the codes Qs are shuffled, even if a communication error occurs and a packet including a code Q is lost, the pixel corresponding to the lost code Q is dispersed, and the receiving apparatus 2 easily extracts the code Q. When a predetermined ADRC block is decoded, the pixel value of a missing pixel is easily created according to decoded pixel values.

Since data is shuffled among segments as described above, the receiving apparatus 2 easily recovers data and easily creates a missing pixel. Even if a packet is lost in a transmission path, the receiving apparatus 2 maintains the image quality in reproduction.

Figure 26:
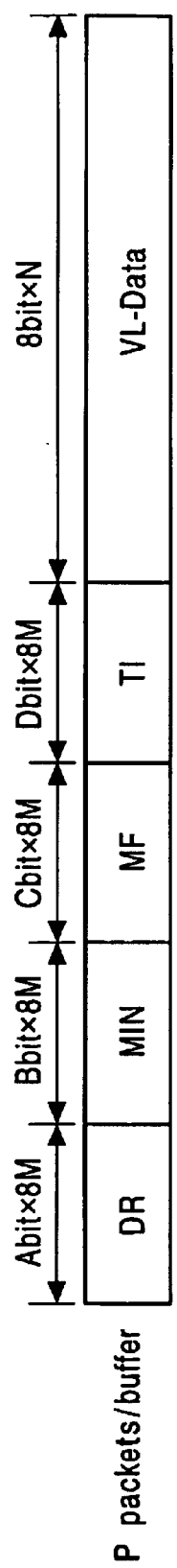
FIG. 26 is a view showing the structure of a packet.

The data output from the inter-segment shuffle circuit 104 of the encoding circuit 15 is input to the packetizing circuit 17 and is packetized. FIG. 26 shows the structure of a packet. The packet shown in FIG. 26 is formed of 201 bytes, and more specifically, formed of a DR having A by 8M bits, a MIN having B by 8M bits, an MF having C by 8M bits, a TI having D by (8M/D) bits, and a code Q (VL-Data) having 8 by N bits. The data is stored in a plurality of packets each having this size.

Since the dynamic range DR, the minimum value MIN of pixel values, the motion flag MF, the table index TI, and the code Q have multiples of eight bits as described above, the above-described shuffling is easily achieved in units of bytes by the identical architecture irrespective of the number of bits included in each data. The above-described descriptions and those described later apply when the packet structure shown in FIG. 26 is used.

Figure 27:
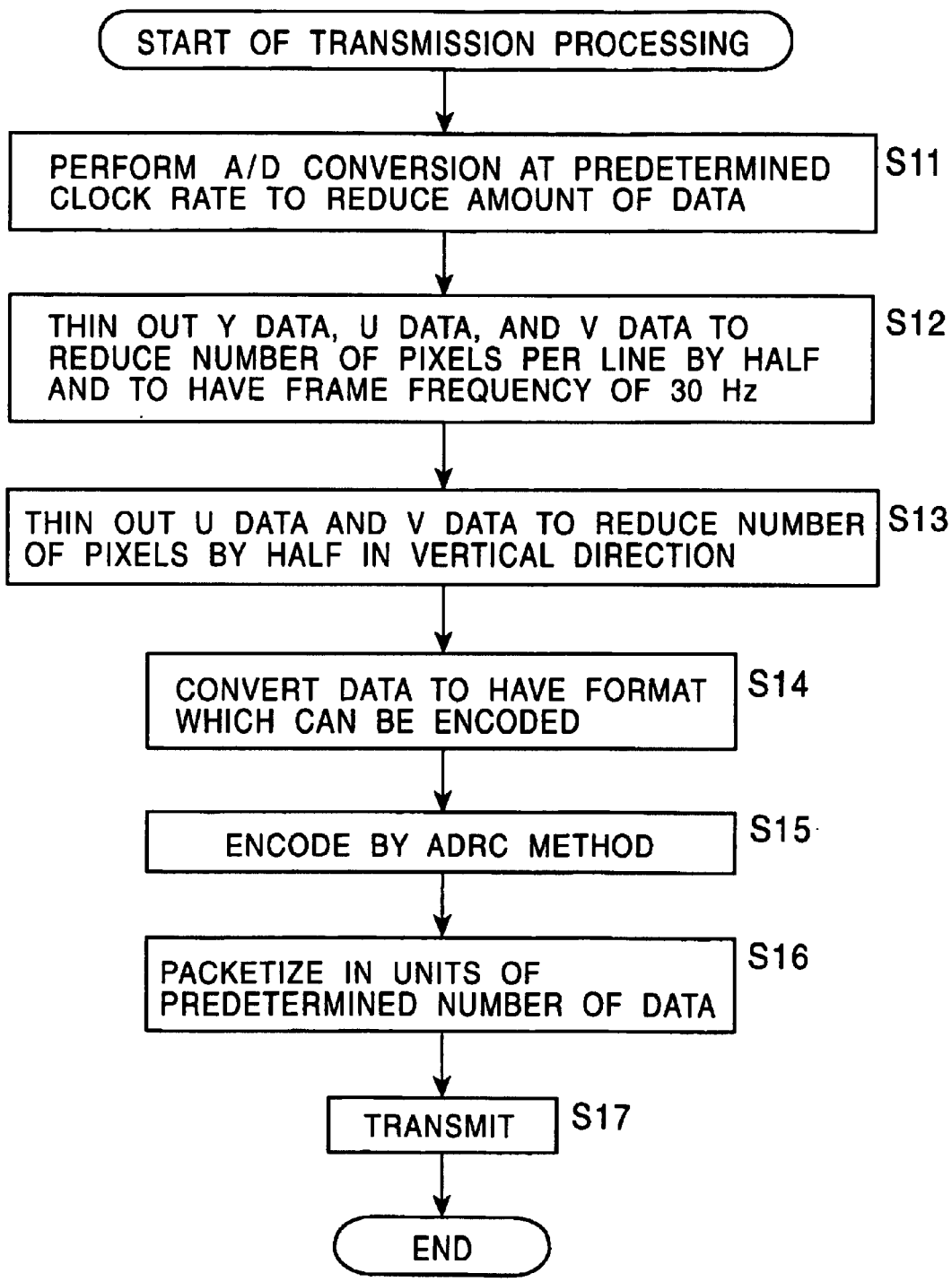
FIG. 27 is a view showing image-transmission processing achieved in the transmitting apparatus 1.

The image transmission processing of the transmitting apparatus 1 will be described next by referring to a flowchart shown in FIG. 27. In step S11, the A/D conversion circuit 42 of the thinning-out section 13 samples an input interlaced image signal having a field frequency of 60 Hz at a predetermined sampling rate, and outputs Y data, U data, and V data each having a predetermined data rate. In step S12, the thinning-out filter 43 thins out the Y data, the U data, and the V data by half in the horizontal and vertical directions to form progressive-type data having a frame frequency of 30 Hz.

In step S13, the UV vertical ½ circuit 45 thins out the U data and the V data by half in the vertical direction. In step S14, the format conversion circuit 14 converts the Y data, the U data, and the V data to have a format suited to the encoding circuit 15.

In step S15, the encoding circuit 15 shuffles the Y data, the U data, and the V data sent from the format conversion circuit 14, encodes them, further shuffles them, and outputs to the packetizing circuit 17. In step S16, the packetizing circuit 17 packetizes the data sent from the encoding circuit 15, and outputs to the transmitting circuit 19. In step S17, the transmitting circuit 19 transmits the packets sent from the packetizing circuit 17 by a predetermined method, and the processing is terminated.

As described above, the transmitting apparatus 1 compresses an input image signal and outputs packets.

Figure 28:
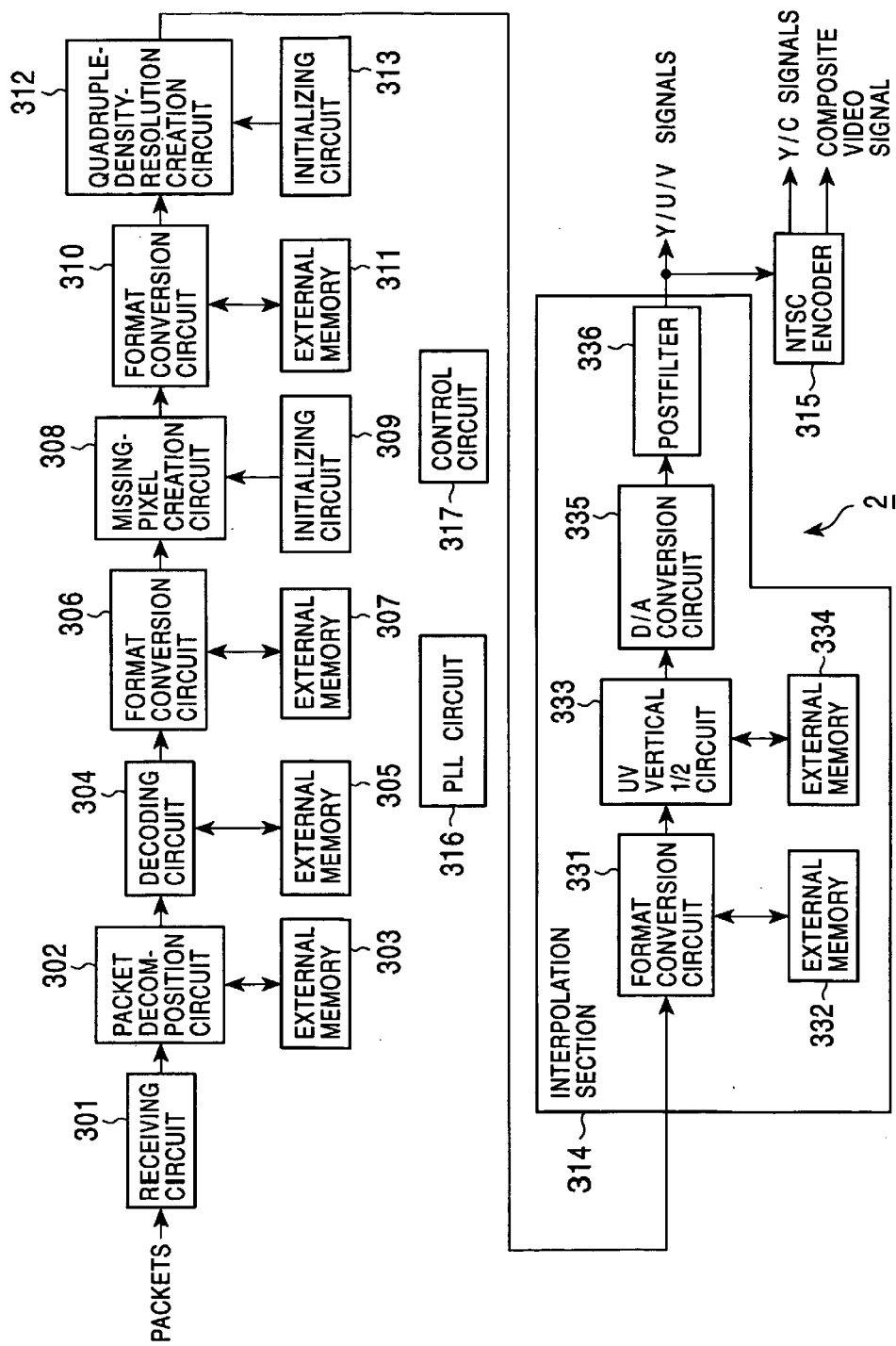
FIG. 28 is a block diagram showing the structure of a receiving apparatus 2.

The receiving apparatus 2 will be described next. FIG. 28 is a block diagram showing the structure of the receiving apparatus 2. Packets received by a receiving circuit 301 are sent to a packet decomposition circuit 302. When data is missing in a received packet, the receiving circuit 301 sets a missing flag in units of bits of data in the packet. The packet decomposition circuit 302 temporarily stores the sent packets in an external memory 303, decomposes the packets temporarily stored in the external memory 303 to take out data included in the packets, and sends it to a decoding circuit 304 together with the missing flag. A missing flag may be added such that it is attached to a code Q in units of eight bits and it is attached to each of a dynamic range DR, the minimum value MIN of pixel values, and a motion flag MF.

The decoding circuit 304 temporarily stores the data sent from the packet decomposition circuit 302 in an external memory 305, decodes the data encoded by the ADRC method and temporarily stored in the external memory 305, and sends to a format conversion circuit 306. If data required for decoding, such as a dynamic range DR and the minimum value MIN, is missing, the decoding circuit 304 recovers the missing data and achieves decoding. When decoding is successfully performed, the decoding circuit 304 resets the corresponding missing flag.

The format conversion circuit 306 temporarily stores the data sent from the decoding circuit 304 in an external memory 307, applies the processing reverse to that achieved in the format conversion circuit 14 to the data temporarily stored in the external memory 307, and sends the data to a missing-pixel creation circuit 308.

The missing-pixel creation circuit 308 generates the data of a pixel which was lost during transmission, by class-classification adaptation processing from the pixel values of pixels disposed surrounding (namely, spatially or along the time axis in the vicinity of) the missing pixel according to the data sent from the format conversion circuit 306, and sends the data of the missing pixel to a format conversion circuit 310. An initializing circuit 309 sends a coefficient set and others to the missing-pixel creation circuit 308 when the receiving apparatus 2 is activated.

The format conversion circuit 310 temporarily stores the data sent from the missing-pixel creation circuit 308 in an external memory 311, converts the data temporarily stored in the external memory 311 to progressive-type, 3:0.5:0.5 image data having a frame frequency of 30 Hz, which can be processed by a quadruple-density-resolution creation circuit 312, and sends the converted data to the quadruple-density-resolution creation circuit 312.

The quadruple-density-resolution creation circuit 312 creates image data four times as dense as the sent image from the image data sent from the format conversion circuit 310, and sends it to an interpolation section 314. An initializing circuit 313 sends a coefficient set and others to the quadruple-density-resolution creation circuit 312.

The interpolation section 314 is formed of a format conversion circuit 331, an external memory 332, a UV vertical doubling circuit 333, an external memory 334, a D/A conversion circuit 335, and a postfilter 336.

The format conversion circuit 331 receives the data sent from the quadruple-density-resolution creation circuit 312, temporarily stores it in the external memory 332, converts the data temporarily stored in the external memory 332 to progressive-type, 3:0.5:0.5 image data having a frame frequency of 30 Hz, which can be processed by the UV vertical doubling circuit 333, and sends the converted data to the UV vertical doubling circuit 333.

The UV vertical doubling circuit 333 temporarily stores the data sent from the format conversion circuit 331 in the external memory 334, interpolates data in the U data and the V data of the data temporarily stored in the external memory 334 in the vertical direction so as to have the doubled number of data, and sends the Y data, the U data, and the V data to the D/A conversion circuit 335.

The D/A conversion circuit 335 converts the Y data, the U data, and the V data sent from the UV vertical doubling circuit 333 to an analog Y signal, an analog U signal, and an analog V signal, and outputs them to the postfilter 336. The postfilter 336 serves as a filter (so-called sinX/X filter) for passing only effective components of the analog Y signal, the analog U signal, and the analog V signal output from the D/A conversion circuit 335. The Y signal, the U signal, and the V signal passing through the postfilter 336 are sent to an NTSC encoder 315, or are output as is as the output of the receiving apparatus 2.

The NTSC encoder 315 generates component signals (Y/C signals) and a composite video signal according to the input Y, U, and V signals, and outputs them.

A PLL circuit 316 generates a reference signal serving as a reference for the processing of each circuit, and sends it to a control circuit 317. The control circuit 317 sends generated control signals to the packet decomposition circuit 302, the decoding circuit 304, the format conversion circuit 306, the missing-pixel creation circuit 308, the format conversion circuit 310, the quadruple-density-resolution creation circuit 312, the interpolation circuit 314, and the NTSC encoder 315 to control the operation of the entire receiving apparatus 2.

Figure 29:
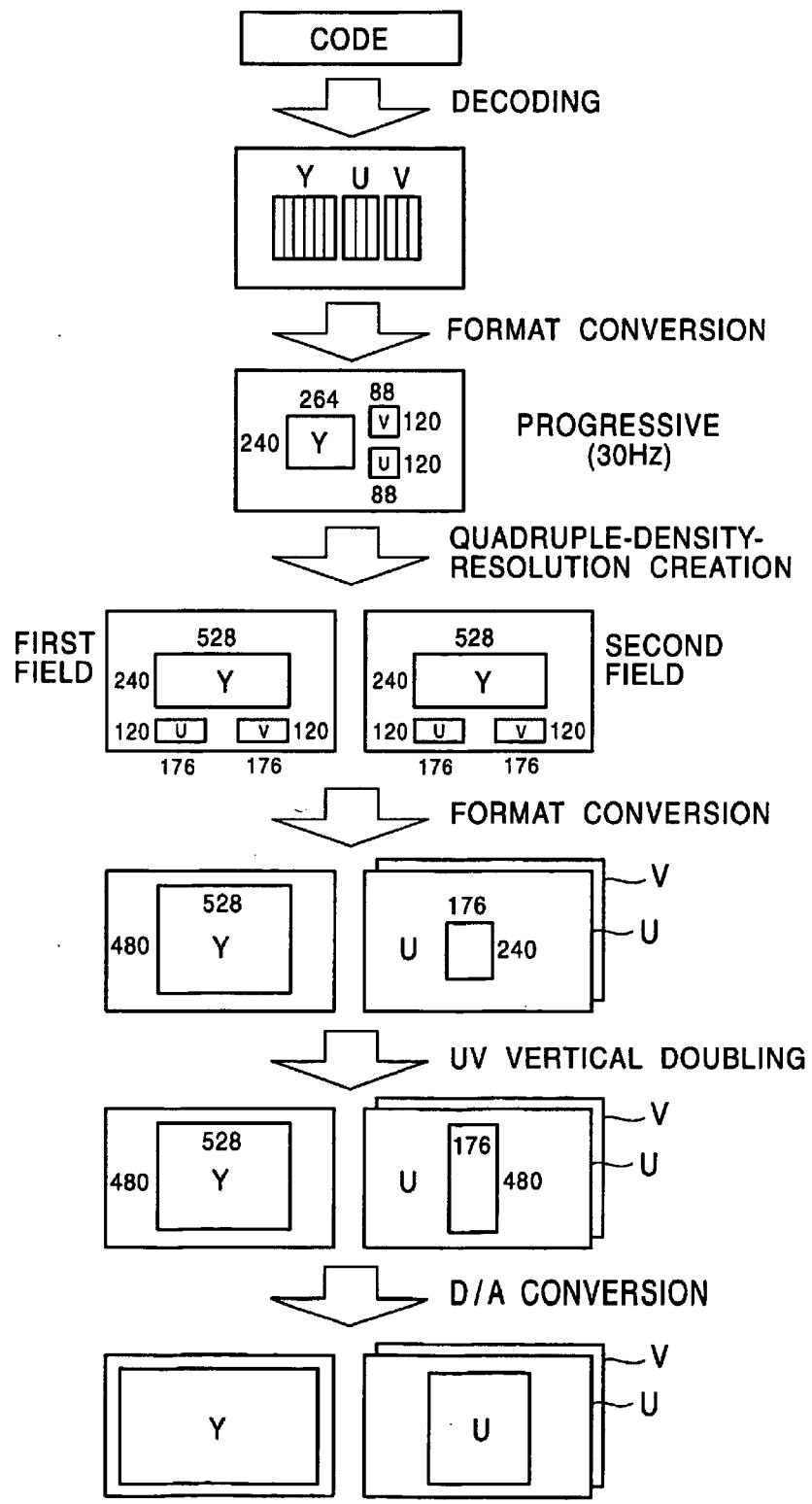
FIG. 29 is a view showing a process in which an image is expanded.

A process for expanding image data received by the receiving apparatus 2 in a case in which an interlaced signal is output will be described below by referring to FIG. 29. Image data decoded by the decoding circuit 304 is converted to progressive-type Y data having 264 pixels in the horizontal direction and 240 pixels in the vertical direction per frame and to progressive-type U data and V data each having 88 pixels by 120 pixels per frame, all of which have a frame frequency of 30 Hz.

A missing pixel is created by the missing-pixel creation circuit 308 for the Y data, the U data, and the V data constituting one frame, output from the format conversion circuit 306. Then, the Y data, the U data, and the V data are converted to a first interlaced field and a second interlaced field having a field frequency of 60 Hz by the quadruple-density-resolution creation circuit 312. The Y data has 528 pixels in the horizontal direction and 240 pixels in the vertical direction per field. The U data and the V data each have 176 pixels in the horizontal direction and 120 pixels in the vertical direction per field.

The Y data, the U data, and the V data output from the quadruple-density-resolution creation circuit 312 are converted by the format conversion circuit 331 to Y data having 528 pixels in the horizontal direction and 480 pixels in the vertical direction per frame, and to U data and V data each having 176 pixels in the horizontal direction and 240 pixels in the vertical direction per frame.

The U data and the V data are further converted by the UV vertical doubling circuit 333 to data having 176 pixels in the horizontal direction and 480 pixels in the vertical direction per frame. The D/A conversion circuit 335 achieves digital-to-analog conversion to convert the Y data to an analog Y signal, and the U data and the V data to an analog U signal and to an analog V signal.

As described above, the interpolation section 314 achieves the processing corresponding to that of the thinning-out section 13 to regenerate the original image having sufficient image quality from the data transferred at a bit rate reduced to a practical value.

As described above, the receiving apparatus 2 expands the received image data and outputs the interlaced Y, U, and V signals.

Figure 30:
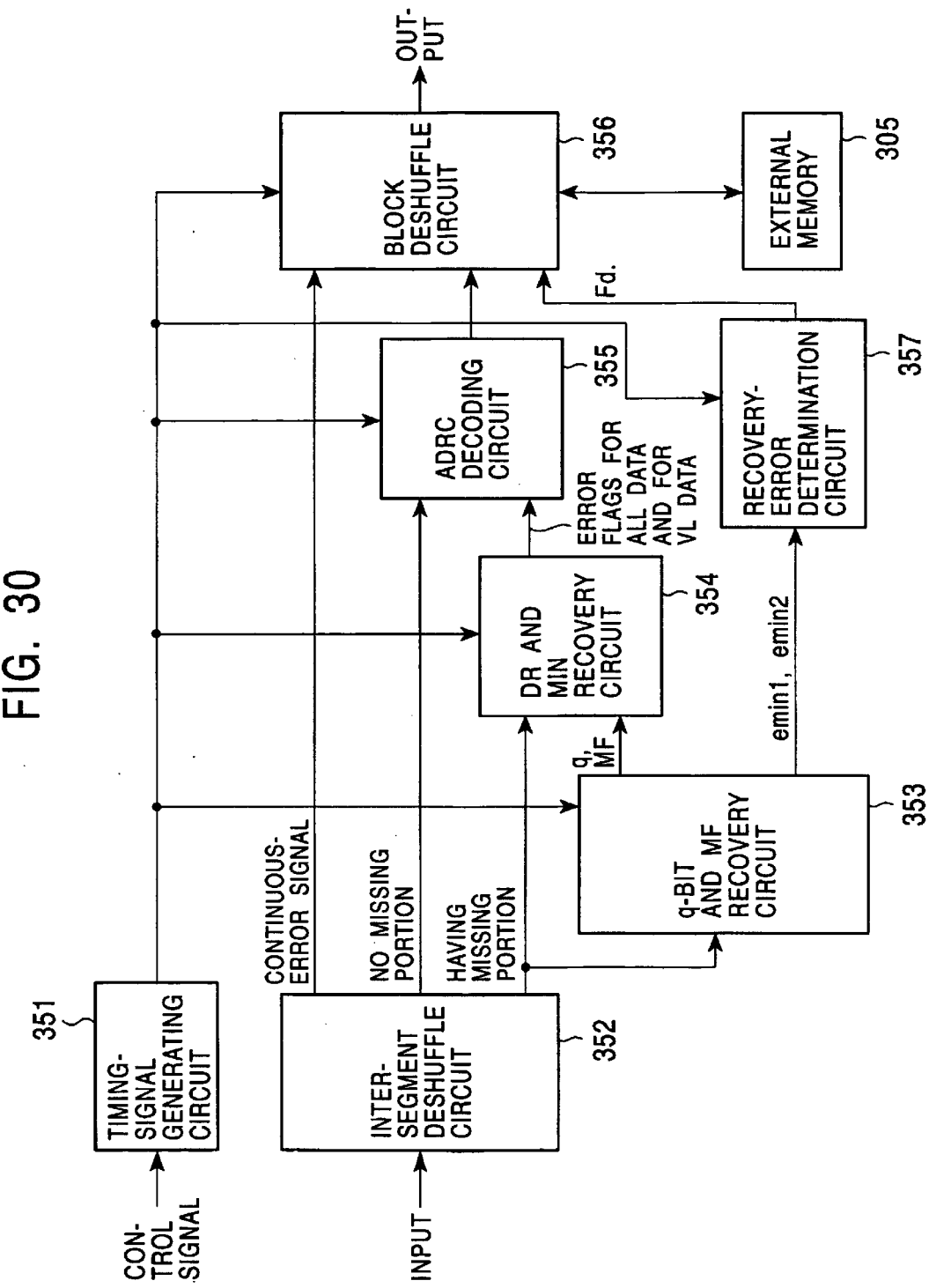
FIG. 30 is a block diagram of a decoding circuit 304.

The decoding circuit 304 will be described next. FIG. 30 is a block diagram showing the structure of the decoding circuit 304. A control signal sent from the control circuit 317 is input to a timing-signal generating circuit 351. The timing-signal generating circuit 351 generates a timing signal and sends it to an inter-segment deshuffle circuit 352, a q-bit and MF recovery circuit 353, a DR and MIN recovery circuit 354, an ADRC decoding circuit 355, a block deshuffle circuit 356, and a recovery-error determination circuit 357.

The data sent from the packet decomposition circuit 302 is input to the inter-segment deshuffle circuit 352. The inter-segment deshuffle circuit 352 performs the process reverse to that of the inter-segment shuffle circuit 104 of the transmitting apparatus 1 shown in FIG. 9 to return the order of the shuffled data to the original order. When the deshuffled data has no missing portion, the inter-segment deshuffle circuit 352 sends the deshuffled data to the ADRC decoding circuit 355. If the deshuffled data has a missing portion, the inter-segment deshuffle circuit 352 sends the deshuffled data to the q-bit and MF recovery circuit 353 and to the DR and MIN recovery circuit 354. If the data of a plurality of blocks extending over segments has an error, the inter-segment deshuffle circuit 352 outputs a continuous-error signal to the block deshuffle circuit 356.

The q-bit and MF recovery circuit 353 uses a compressed code Q, in which correlation between adjacent pixels remains, to obtain the combination of the values of "q" and a motion flag MF which makes the correlation among the pixel values of pixels in three consecutive ADRC blocks maximum, and outputs the values to the DR and MIN recovery circuit 354 as a correct "q" and a correct motion flag MF. The q-bit and MF recovery circuit 353 sends emin1 and emin2 (the minimum value and the next minimum value of the differences between adjacent pixels) used to determine whether the motion flag MF is correct, to the recovery-error determination circuit 357.

Figure 31:
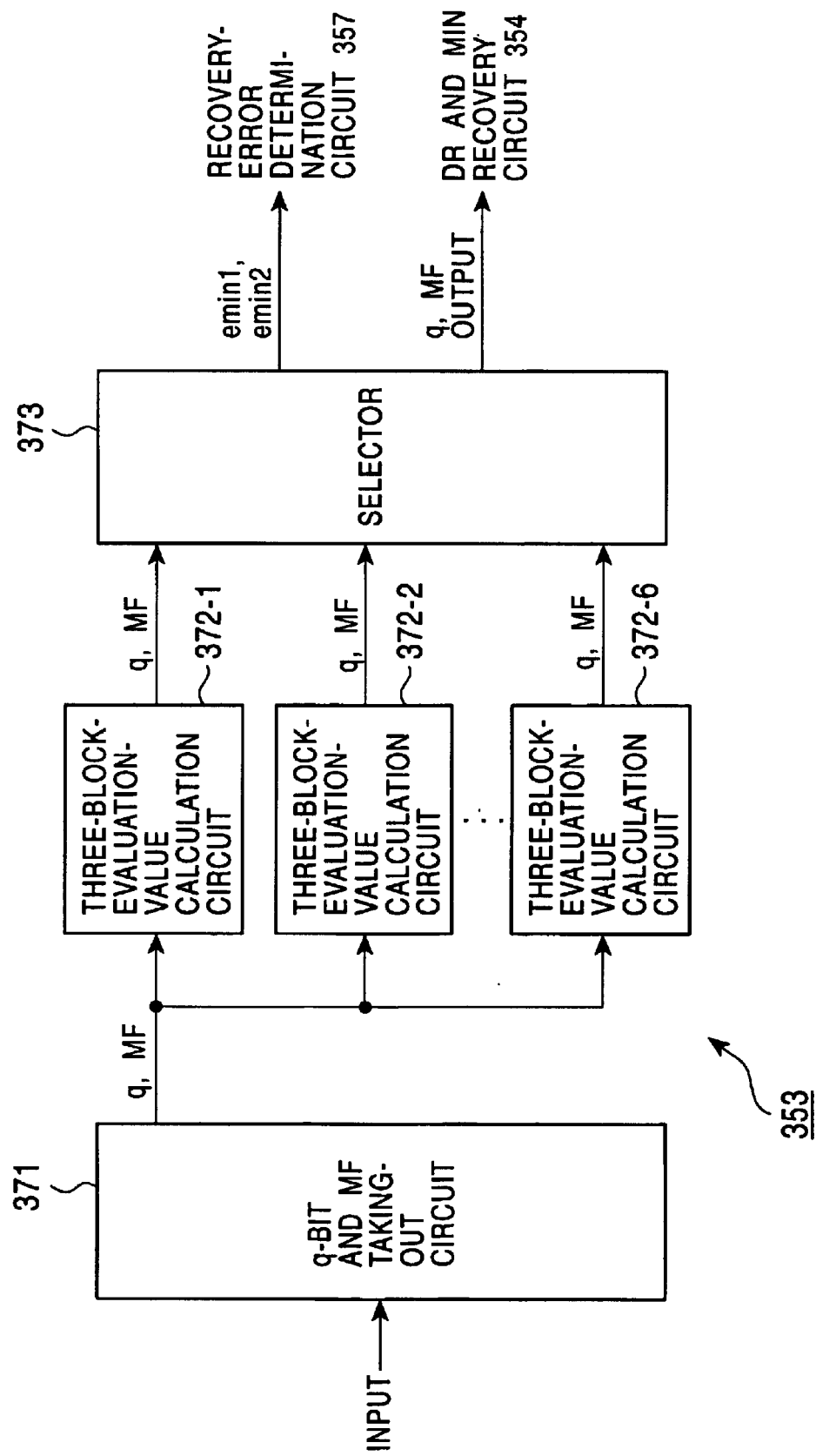
FIG. 31 is a block diagram showing the structure of a q-bit and MF recovery circuit 353.

FIG. 31 is a block diagram showing the structure of the q-bit and MF recovery circuit 353. The deshuffled data sent from the inter-segment deshuffle circuit 352 is sent to a q-bit and MF taking-out circuit 371.

The q-bit and MF taking-out circuit 371 takes out "q's" and the motion flags MF from the sent data, and sends them to three-block-evaluation-value calculation circuits 372-1 to 372-6. If "q's" and the motion flags MF are lost due to an error, the q-bit and MF taking-out circuit 371 sends possible combinations of "q's" and the motion flags MF to the three-block-evaluation-value calculation circuits 372-1 to 372-6.

For example, the three-block-evaluation-value calculation circuit 372-1 receives a "q" of 2 and a motion flag MF of 0, the three-block-evaluation-value calculation circuit 372-2 receives a "q" of 3 and a motion flag MF of 0, and the three-block-evaluation-value calculation circuit 372-3 receives a "q" of 4 and a motion flag MF of 0. The three-block-evaluation-value calculation circuit 372-4 receives a "q" of 2 and a motion flag MF of 1, the three-block-evaluation-value calculation circuit 372-5 receives a "q" of 3 and a motion flag MF of 1, and the three-block-evaluation-value calculation circuit 372-6 receives a "q" of 4 and a motion flag MF of 1.

The three-block-evaluation-value calculation circuits 372-1 to 372-6 calculate evaluation values (LE: linear errors) based on the differences between the pixel values of pixels adjacent to each other by using the pixel values decoded from the taken-out codes Q according to the q's and the motion flags MF, and send the evaluation values to a selector 373 together with q's and the motion flags MF. When it is unnecessary to separately distinguish the three-block-evaluation-value calculation circuits 372-1 to 372-6, they are collectively called a three-block-evaluation-value calculation circuit 372.

Each evaluation value is calculated by the expression (1). The smaller the evaluation value is, the higher the correlation of pixels is.

$$LE = \sum_{j=0}^{2} \sum_{i=1}^{N_j} \left| \text{offset}_j + Q'_{i,j} \times 2^{4-q'_{i,j}} - Q_{i,j} \times 2^{4-q_{i,j}} \right| \quad (1)$$

where, $Q_{i,j}$ indicates not-missing codes Q included in an ADRC block to be recovered, and $Q'_{i,j}$ indicates codes Q included in another ADRC block formed of 64 pixels shown in FIG. 12 and FIG. 13, including pixels constituting the ADRC block in which $Q_{i,j}$ is included. For example, when $Q_{i,j}$ is included in the even-numbered-segment ADRC block having the number 0 shown in FIG. 15, $Q'_{i,j}$ is included in the odd-numbered-segment ADRC block having the number 3. When $Q_{i,j}$ is included in the even-numbered-segment ADRC block having the number 4 shown in FIG. 15, $Q'_{i,j}$ is included in the odd-numbered-segment ADRC block having the number 1. $q_{i,j}$ indicates q used to take out $Q_{i,j}$, and $q'_{i,j}$ indicates q used to take out $Q'_{i,j}$. $N_j$ indicates the number of not-missing codes Q included in the ADRC block. "j" indicates a number used for identifying each of the three ADRC blocks for which evaluation values are calculated.

offset$_j$ is used to eliminate the differences of the dynamic ranges and q's among the three ADRC blocks to calculate more correct evaluation values, and is calculated by the expressions (2), (3), and (4).

$$\text{offset}_j = (X_j \times 2^{4-q_j} - Y_j \times 2^{4-q'_j})/128 \quad (2)$$

$$X_j = \sum_{i=1}^{N_j} Q_{i,j} \quad (3)$$

$$Y_j = \sum_{i=1}^{N_j} Q'_{i,j} \quad (4)$$

The selector 373 selects the minimum evaluation value and the next-minimum evaluation value among the evaluation values sent from the three-block-evaluation-value calculation circuits 372-1 to 372-6, and sends them as emin1 and emin2 to the recovery-error determination circuit 357.

The selector 373 reads "q" and the motion flag MF output from the three-block-evaluation-value calculation circuit which outputs the minimum evaluation value among the three-block-evaluation-value calculation circuits 372-1 to 372-6, and sends them to the DR and MIN recovery circuit 354 as the output of the q-bit and MF recovery circuit 353.

The DR and MIN recovery circuit 354 obtains a correct dynamic range DR for each ADRC block and the minimum value MIN of pixel values for each ADRC block according to the correct q and the correct motion flag MF sent from the q-bit and MF recovery circuit 353 and according to the corresponding ADRC blocks sent from the inter-segment deshuffle circuit 352, shown in FIG. 11, and outputs them to the ADRC decoding circuit 355.

Processing achieved by the DR and MIN recovery circuit 354 for recovering the dynamic range DR or the minimum value MIN of pixel values will be described below by referring to FIG. 32, FIG. 33, FIG. 34A, and FIG. 34B. A pixel value L is obtained by decoding in the process indicated by the expression (5) from the code Q according to the ADRC method.

$$L = DR/(2^Q) * q + \text{MIN} \quad (5)$$

Figure 32:
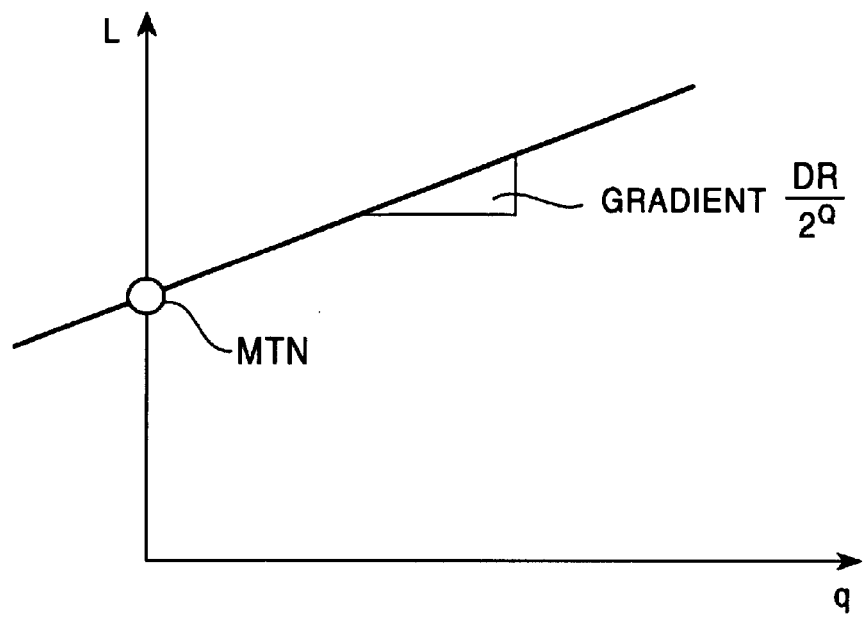
FIG. 32 is a view showing a process for recovering a dynamic range DR or the minimum value MIN of pixel values.

As shown in FIG. 32, the relationship between "q" and the pixel value L is represented by a straight line having a gradient of $DR/(2^Q)$ and an intercept of the minimum value MIN of pixel values.

Figure 33:
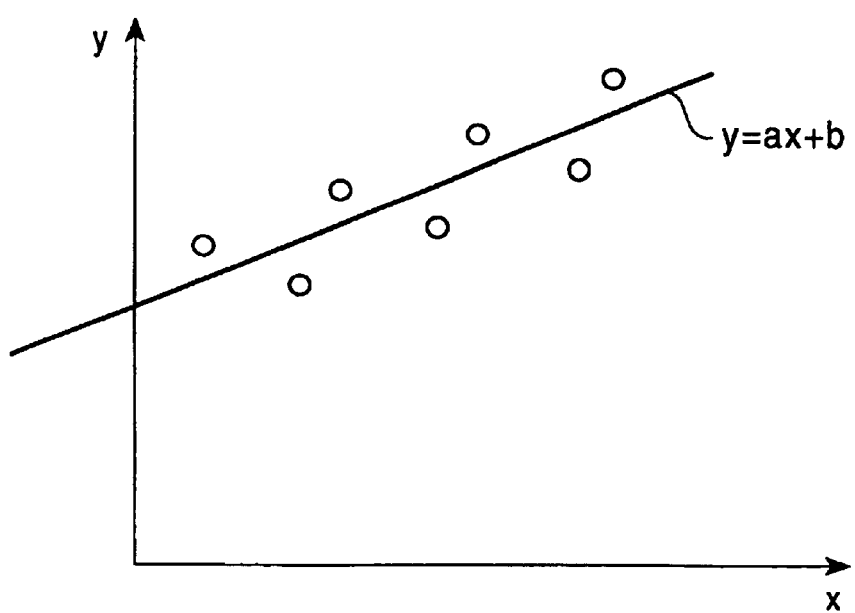
FIG. 33 is a view showing the process for recovering a dynamic range DR or the minimum value MIN of pixel values.

From sets of (q, L) in the ADRC blocks, $DR/(2^Q)$ and the minimum value MIN of pixel values in the expression (5) are statistically obtained. It is assumed that a regression straight line of (q, L) shown in FIG. 33 is identical with the straight line indicated by the expression (5).

If "b" is known, "a" is calculated by the expression (6).

$$a = (B - nb)/A \quad (6)$$

If "a" is known, "b" is calculated by the expression (7).

$$b = (B - Aa)/n \quad (7)$$

Where, n indicates the number of points (q, L), A indicates $\Sigma x$, and B indicates $\Sigma y$.

The dynamic range DR is calculated by the expression (8).

$$DR = (\Sigma L' - N * \text{MIN})/(\Sigma q) * 2^Q$$
$$= (((DR'/2^Q) * Y) + N * \text{MIN}' - N * \text{MIN})/X * 2^Q$$
$$= (N * (\text{MIN}' - \text{MIN}) * 2^Q + DR' * Y) * 2^Q / (X * 2^{Q'})$$

Figure 34A:
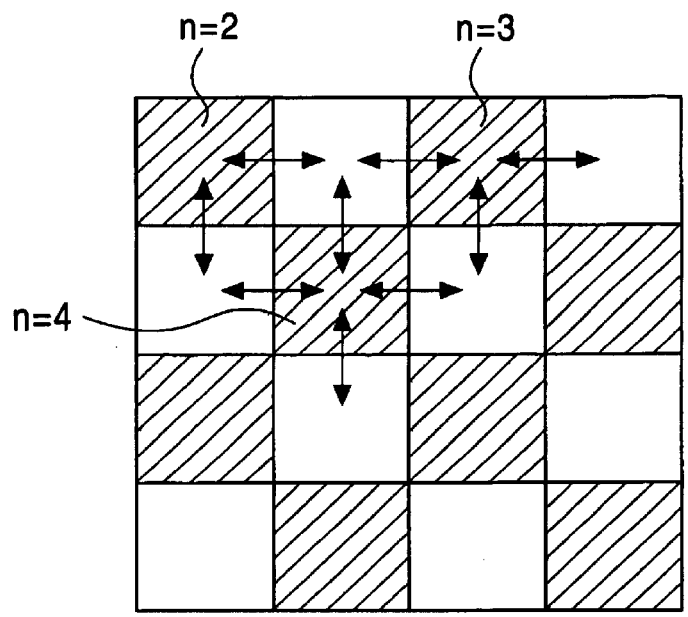
FIGS. 34A and 34B are views showing the process for recovering a dynamic range DR or the minimum value MIN of pixel values.
Figure 34B:
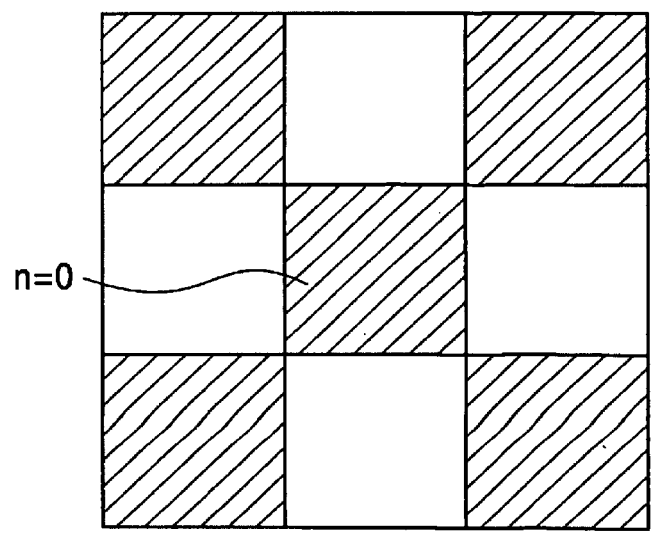

As shown in FIG. 34A, when the number of blocks having no missing pixel and being adjacent to a block for which dynamic range DR or the minimum value MIN of pixel values is to be recovered is called ni, N equals Σni. In FIGS. 34A and 34B, hatched squares indicate blocks for which the dynamic range DR or the minimum value MIN of pixel values is to be recovered. In FIGS. 34A and 34B, not-hatched squares indicate blocks having no missing pixel. When a block for which the dynamic range DR or the minimum value MIN of pixel values is to be recovered lacks "q," ni is 0 as shown in FIG. 34B.

DR' indicates the dynamic range of a block having no missing pixel and being adjacent to a block to be recovered. MIN' indicates the minimum value of pixel values of a block having no missing pixel and being adjacent to a block to be recovered. Q' indicates the code Q of a block having no missing pixel and being adjacent to a block to be recovered.

X is indicated by the expression (9).

$$X = \sum_{}^{N} q_i \qquad (9)$$

Y is indicated by the expression (10).

$$Y = \sum_{}^{N} q'_i \qquad (10)$$

The minimum value MIN of pixel values is calculated by the expression (11).

$$MIN=(\Sigma L'-\Sigma q*(DR/2^Q))=((DR'/2^{Q'})*Y)+N*MIN'-(DR/2^Q)*X)/N=\\(N*MIN'*2^{Q'+Q}+DR'*Y*2^Q-DR*X*2^{Q'})/(N*2^{Q'+Q}) \qquad (11)$$

When the deshuffled data has no missing portion, the ADRC decoding circuit 355 decodes the code Q according to the data sent from the inter-segment deshuffle circuit 352, and sends the Y data, the U data, and the V data obtained as the results of decoding to the block deshuffle circuit 356.

When "q" or the motion flag MF is missing, and the q-bit and MF recovery circuit 353 has obtained a correct "q" and a correct motion flag MF, the ADRC decoding circuit 355 decodes the code Q sent from the DR and MIN recovery circuit 354 according to the correct "q" and the correct motion flag MF sent through the DR and MIN recovery circuit, the dynamic range DR, and the minimum value MIN of pixel values in each block; and sends the Y data, the U data, and the V data obtained as the results of decoding to the block deshuffle circuit 356 together with the error flags corresponding to the Y data, the U data, and the V data, having a value of 0.

When "q" or the motion flag MF is missing, and the q-bit and MF recovery circuit 353 cannot obtain a correct "q" or a correct motion flag MF, the ADRC decoding circuit 355 sets the error flags of the Y data, the U data, and the V data corresponding to the code Q to 1 and sends them to the block deshuffle circuit 356.

When the dynamic range DR or the minimum value MIN of pixel values is missing, and the DR and MIN recovery circuit 354 has obtained a correct dynamic range DR and the correct minimum value MIN of pixel values, the ADRC decoding circuit 355 decodes the code Q sent from the DR and MIN recovery circuit 354 according to "q" and the motion flag MF sent through the DR and MIN recovery circuit, the correct dynamic range DR, and the correct minimum value MIN of pixel values; and sends the Y data, the U data, and the V data obtained as the results of decoding to the block deshuffle circuit 356 together with the error flags corresponding to the Y data, the U data, and the V data, having a value of 0.

When the dynamic range DR or the minimum value MIN of pixel values is missing, and the q-bit and MF recovery circuit 353 cannot obtain a correct dynamic range DR or a correct minimum value of pixel values, the ADRC decoding circuit 355 sets the error flags of the Y data, the U data, and the V data corresponding to the code Q to 1 and sends them to the block deshuffle circuit 356.

The recovery-error determination circuit 357 sets a recovery-error determination flag Fd according to emin1 and emin2 sent from the q-bit and MF recovery circuit 353, outputs it to the block deshuffle circuit 356, and stops updating the Y data, the U data, and the V data of the pixels corresponding to the previous frame, stored in the external memory 305.

When the block deshuffle circuit 356 receives the error flags set to 0, the Y data, the U data, and the V data from the ADRC decoding circuit 355, the block deshuffle circuit 356 stores them. When the block deshuffle circuit 356 receives the error flags set to 1, the Y data, the U data, and the V data from the ADRC decoding circuit 355, the block deshuffle circuit 356 stores only the error flags, and does not store the Y data, the U data, and the V data. When the block deshuffle circuit 356 receives a continuous-error signal from the recovery-error determination circuit 357 or the inter-segment deshuffle circuit 352, the block deshuffle circuit 356 stops updating the Y data, the U data, and the V data of the pixels corresponding to the previous frame, stored in the external memory 305.

The block deshuffle circuit 356 rearranges the Y data, the U data, and the V data such that they have the original order by the process reverse to that achieved by the block shuffle circuit 102 of the transmitting apparatus 1 shown in FIG. 9, and outputs the Y data, the U data, and the V data having the original order.

As described above, even if "q," the motion flag MF, the dynamic range DR, or the minimum value MIN of pixel values, which are required for decoding, is lost, since the q-bit and MR recovery circuit 353 and the DR and MIN recovery circuit 354 recover the lost data, the decoding circuit 304 can execute decoding.

If a recovery error occurs, since the pixel values stored in the external memory 305 are not updated and the pixel values stored four frames before are output, when a motion does not occur, the output pixel values do not give an impression of incongruity.

Figure 35:
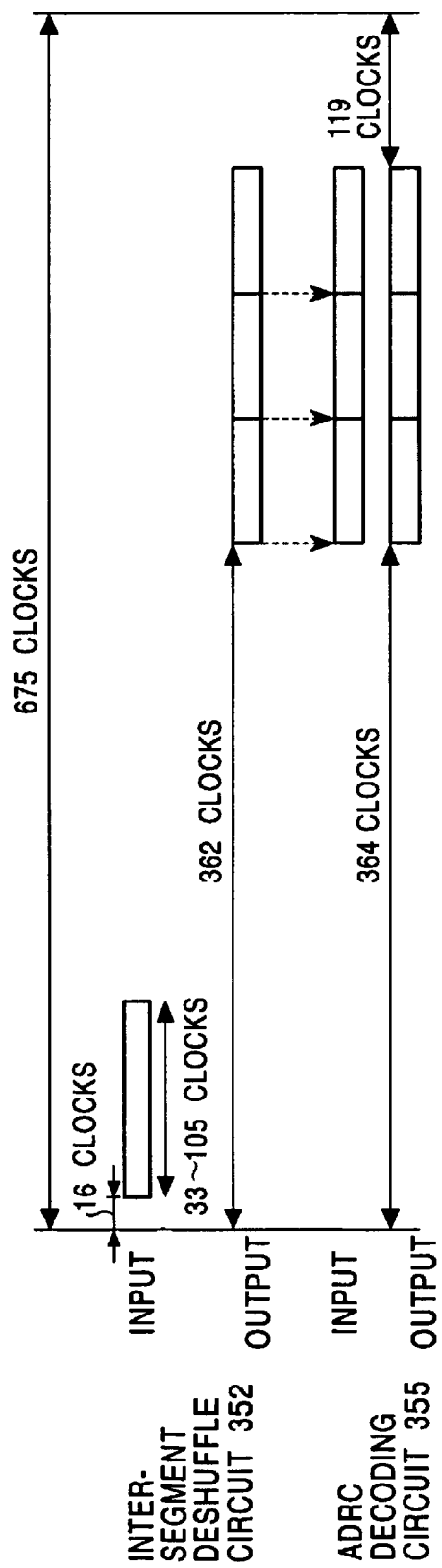
FIG. 35 is a view showing example timing of a process achieved by the decoding circuit 304 when data output from an inter-segment deshuffle circuit 352 has no missing portion.

The processing timing of the decoding circuit 304 will be described next by referring to timing charts shown in FIG. 35 and FIG. 36. FIG. 35 shows example processing timing of the decoding circuit 304 used when data output from the inter-segment deshuffle circuit 352 has no missing portion. The inter-segment deshuffle circuit 352 achieves deshuffle processing, and, after a predetermined period of time (362 clocks from the start of input in FIG. 35) elapses, outputs deshuffled data to the ADRC decoding circuit 355. The ADRC decoding circuit 355 decodes the data sent from the inter-segment deshuffle circuit 352, and outputs it.

Figure 36:
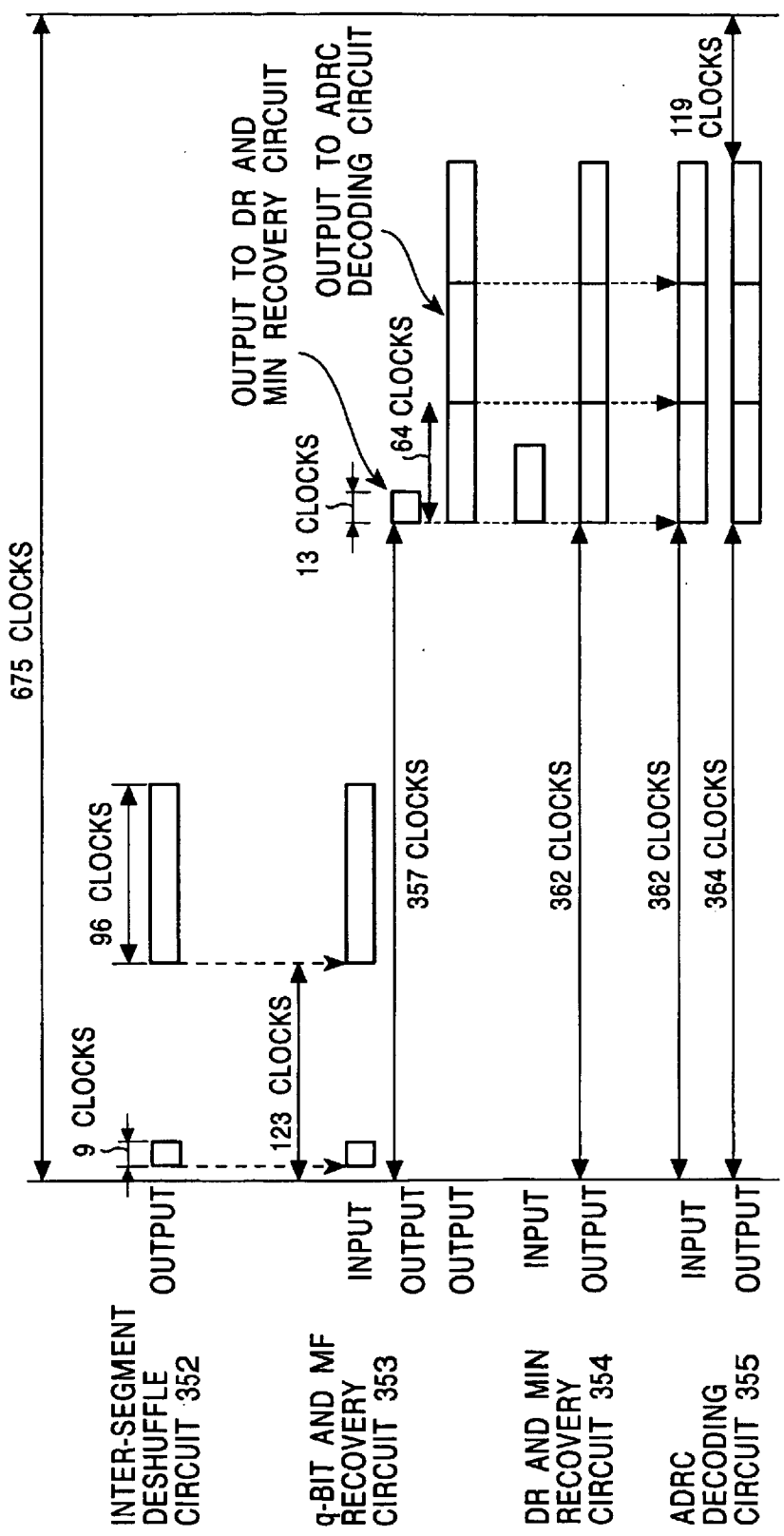
FIG. 36 is a view showing example timing of a process achieved by the decoding circuit 304 when data output from the inter-segment deshuffle circuit 352 has a missing portion.

FIG. 36 shows example processing timing of the decoding circuit 304 used when data output from the inter-segment deshuffle circuit 352 has a missing portion. The inter-segment deshuffle circuit 352 achieves deshuffle processing, and outputs deshuffled data to the q-bit and MF recovery circuit 353 at timing (123 clocks from the start of input in FIG. 36) earlier than when the data is sent to the ADRC decoding circuit 355 if the data has no missing portion. The q-bit and MF recovery circuit 353 sends "q" and the motion flag MF to the DR and MIN recovery circuit 354 at a predetermined timing.

The DR and MIN recovery circuit 354 sends a dynamic range and the minimum value of pixel values to the ADRC decoding circuit 355 at the same timing as that at which the inter-segment deshuffle circuit 352 sends data to the ADRC decoding circuit 355 when the data has no missing portion.

Therefore, even if "q," the motion flag MF, the dynamic range DR, and the minimum value MIN of pixel values are recovered, the decoding circuit 304 can decode and output data at the same timing as when data output from the inter-segment deshuffle circuit 352 has no missing portion.

As described above, even if the predetermined data required for decoding is lost, since the q-bit and MF recovery circuit 353 and the DR and MIN recovery circuit 354 recover the lost data, the decoding circuit 304 can achieve decoding. When a signal for selecting a mode (user-selectable mode) in which error processing is not achieved in the decoding circuit 304 is input, the q-bit and MF recovery circuit 353 or the DR and MIN recovery circuit 354 does not execute data recovery.

The data-output timing of the block deshuffle circuit 356 will be described next by referring to FIG. 37A, FIG. 37B, FIG. 38A, and FIG. 38B.

Figure 37A:
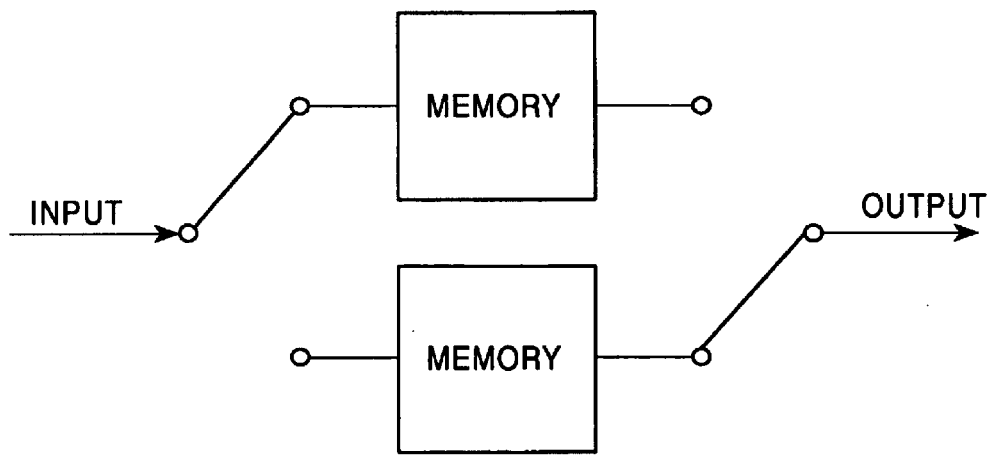
FIGS. 37A and 37B are views showing how data is stored conventionally.
Figure 37B:
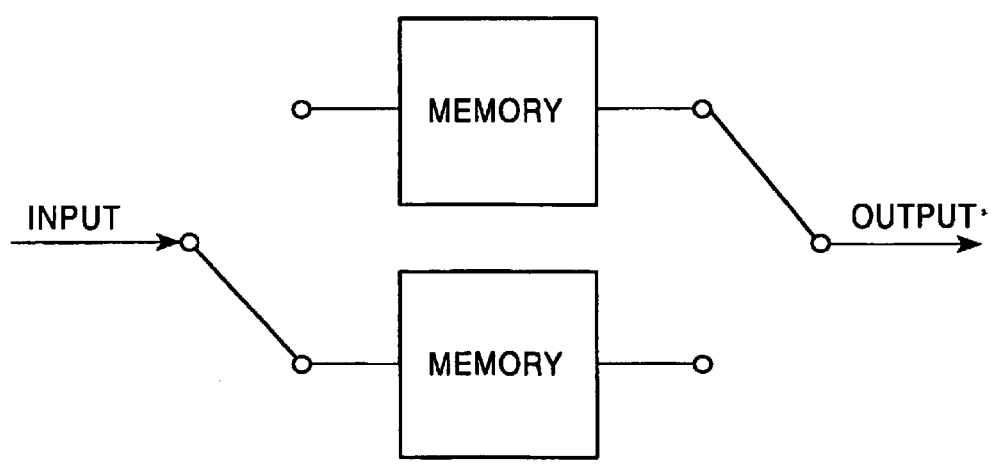

Conventionally, two memory units for storing two-frame images are provided in the methods shown in FIG. 37A and FIG. 37B; when data is written into one memory unit, data is read from the other memory unit as shown in FIG. 37A; and, when processing for two-frame images has been finished, data is written into the other memory unit and data is read from the one memory unit as shown in FIG. 37B.

Figure 38A:
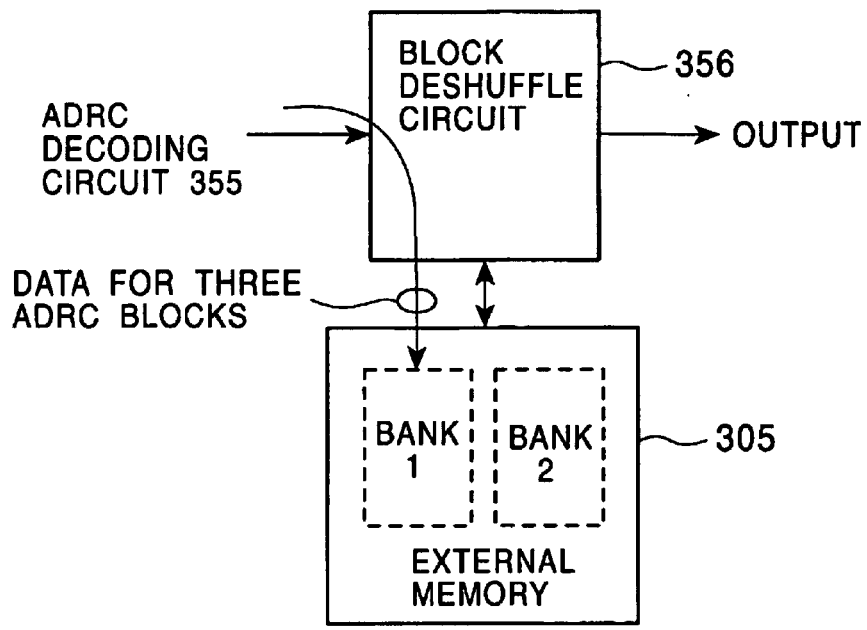
FIGS. 38A and 38B are views showing the output timing of data in a block deshuffle circuit 356.
Figure 38B:
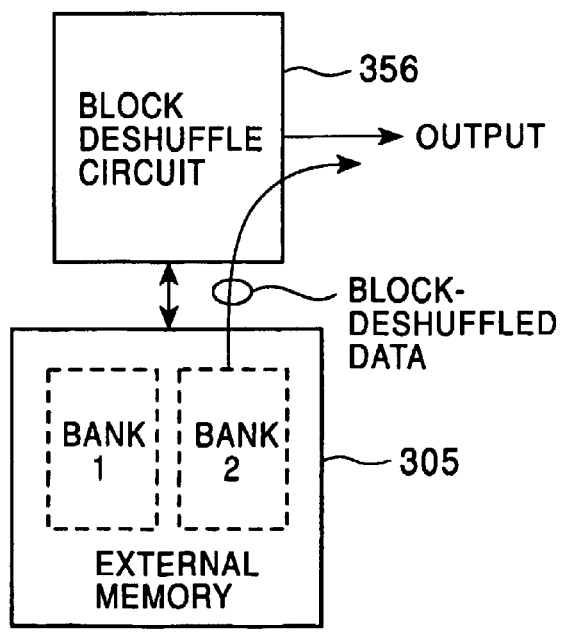

In contrast, in the present invention, the external memory 305 is provided with two banks (bank 1 and bank 2 in the figure) each storing two frames; when the image data corresponding to three ADRC blocks is sent from the ADRC decoding circuit 355, the block deshuffle circuit 356 writes it into the bank 1 as shown in FIG. 38A; and when image data is not sent from the ADRC decoding circuit 355 (such as in the period from the start of input to the 364-th clock in FIG. 36), the block deshuffle circuit 356 specifies addresses to read block-deshuffled data from the bank 2. For the next two frames, when the image data corresponding to three ADRC blocks is sent from the ADRC decoding circuit 355, the block deshuffle circuit 356 writes it into the bank 2; and when image data is not sent from the ADRC decoding circuit 355, the block deshuffle circuit 356 reads block-deshuffled data from the bank 1.

With the above operations, image data is block-deshuffled and output in a structure in which one external memory 305 is provided for the block deshuffled circuit 356.

Figure 39:
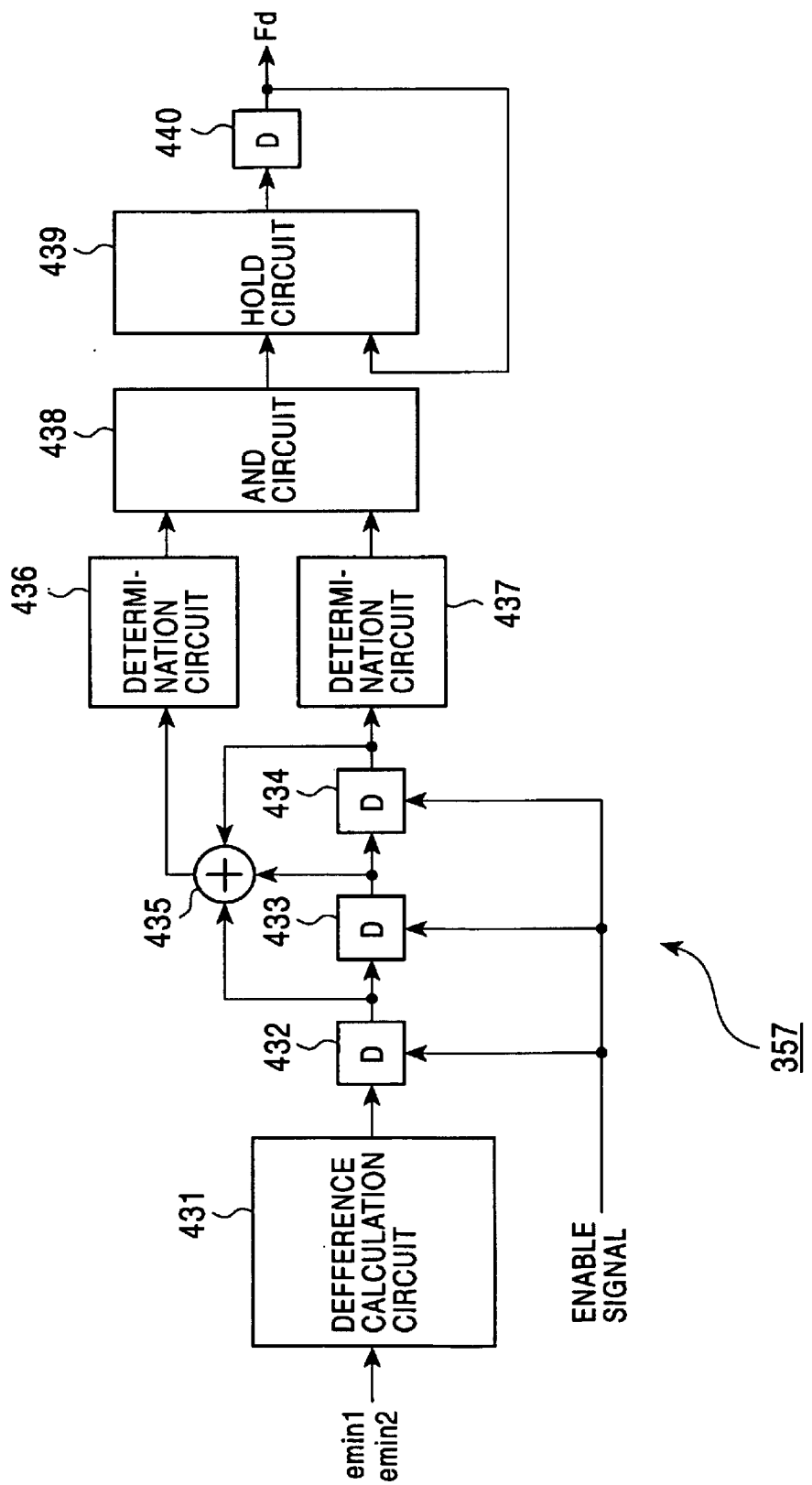
FIG. 39 is a block diagram showing the structure of a recovery-error determination circuit 357.

FIG. 39 is a block diagram showing the structure of the recovery-error determination circuit 357. The minimum evaluation value emin1 and the next-minimum evaluation value emin2 sent from the q-bit and MF recovery circuit 353 are input to a difference calculation circuit 431. The difference calculation circuit 431 calculates the difference between the input emin1 and emin2, and outputs it to a delay circuit 432. The delay circuit 432 delays the data sent from the difference calculation circuit 431 for a predetermined period of time, and outputs it to an adder 435 and to a delay circuit 433.

The delay circuit 433 delays the data sent from the delay circuit 432 for a predetermined period of time, and outputs it to the adder 435 and to a delay circuit 434.

The delay circuit 434 delays the data sent from the delay circuit 433 for a predetermined period of time, and outputs it to the adder 435 and to a determination circuit 437.

The adder 435 adds the data sent from the delay circuit 432, the data sent from the delay circuit 433, and the data sent from the delay circuit 434, and sends the sum to a determination circuit 436.

The determination circuit 436 determines whether the data sent from the adder 435 is equal to or smaller than a threshold Te1 determined in advance. When the determination circuit 436 determines that the data sent from the adder 435 is equal to or smaller than the threshold Te1, the determination circuit 436 outputs a value of 1 to an AND circuit 438. When the determination circuit 436 determines that the data sent from the adder 435 is larger than the threshold Te1, the determination circuit 436 outputs a value of 0 to the AND circuit 438.

The determination circuit 437 determines whether the data sent from the adder 434 is equal to or smaller than a threshold Te2 determined in advance. When the determination circuit 437 determines that the data sent from the adder 434 is equal to or smaller than the threshold Te2, the determination circuit 437 outputs a value of 1 to the AND circuit 438. When the determination circuit 437 determines that the data sent from the adder 434 is larger than the threshold Te2, the determination circuit 437 outputs a value of 0 to the AND circuit 438.

The AND circuit 438 outputs a value of 1 to a hold circuit 439 when the data sent from the determination circuit 436 is 1 and the data sent from the determination circuit 437 is 1. The AND circuit 438 outputs a value of 0 to the hold circuit 439 when the data sent from the determination circuit 436 is 0 or the data sent from the determination circuit 437 is 0.

The hold circuit 439 holds input data until a reset signal is input, and outputs to a delay circuit 440. The delay circuit 440 delays the data output from the hold circuit 439 for a predetermined period of time, sends it to the hold circuit 439, and outputs it to the block deshuffle circuit 356 as a recovery determination flag Fd.

As described above, when the accumulated value of the differences between the evaluation values emin1 and the evaluation values emin2 of three ADRC blocks is equal to or smaller than the threshold Te1 and the difference between the evaluation value emin1 and the evaluation value emin2 of the ADRC block is equal to or smaller than the threshold Te2, in other words, when the differences between the evaluation values emin1 and the evaluation values emin2 are small and it is highly possible that the recovered "q" and the recovered motion flag MF are not correct, the recovery-error determination circuit 357 sets the recovery determination flag Fd to 1.

A process for temporarily storing data decoded by the ADRC decoding circuit 355 in the block deshuffle circuit 356 and for reading the data will be described next. When data sent from the packet decomposition circuit 302 has a missing portion, the inter-segment deshuffle circuit 352 sets an error flag for the data to 1; when data sent from the packet decomposition circuit 302 has no missing portion, the inter-segment deshuffle circuit 352 sets the error flag for the data to 0; and the inter-segment deshuffle circuit 352 outputs the code Q and the error flag to the ADRC decoding circuit 355 in units of ADRC blocks. The ADRC decoding circuit 355 decodes the code Q, and outputs Y data, U data, and V data together with the error flag to the block deshuffle circuit 356.

When the error flag is 0, the block deshuffle circuit 356 stores the Y data, the U data, the V data, and the error flag in the external memory 305. When the error flag is 1, the block deshuffle circuit 256 stores the error flag in the external memory 305 and does not store the Y data, the U data, or the V data.

The external memory 305 has two banks, each storing Y data, U data, V data, and error flags for two frames. A bank of the external memory 305 is switched in every two frames. Therefore, when an error flag is 1, the external memory 305 stores the Y data, the U data, and the V data of the frame four frames before.

Figure 40:
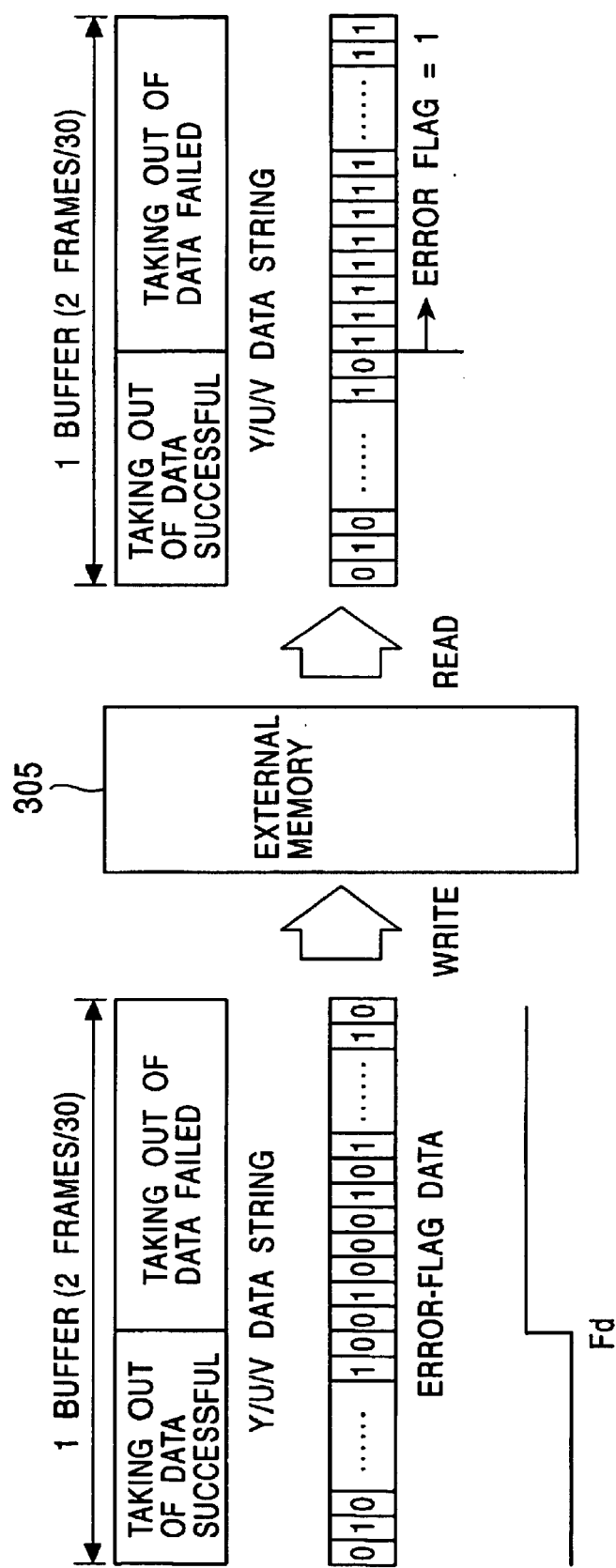
FIG. 40 is a view showing a process achieved by the block deshuffle circuit 356 when the recovery-error determination circuit 357 outputs a recovery determination flag Fd of 1.

FIG. 40 is a view showing a process achieved by the block deshuffle circuit 356 when the recovery-error determination circuit 357 outputs a recovery determination flag Fd of 1. When the difference between the minimum evaluation value emin1 and the next-minimum evaluation value emin2 sent from the q-bit and MF recovery circuit 353 is equal to or smaller than a predetermined value, and the sum of the differences between emin1's and emin2's of three consecutive ADRC blocks, including the ADRC block, is equal to or smaller than a predetermined value, the q-bit and MR recovery circuit 353 determines that "q" recovery was unsuccessful, and therefore, determines that taking out of data was also unsuccessful. In this case, the recovery-error determination circuit 357 outputs a recovery determination flag Fd of 1.

When the recovery-error determination circuit 357 outputs a recovery determination flag Fd of 1, the block deshuffle circuit 356 determines that taking out of data from the subsequent buffers (each having 88 ADRC blocks) was unsuccessful, sets error flags to be sent afterwards to 1, and stores the error flags in the external memory 305. In the escape mode, which the user can select, data is stored in the external memory 305.

Figure 41:
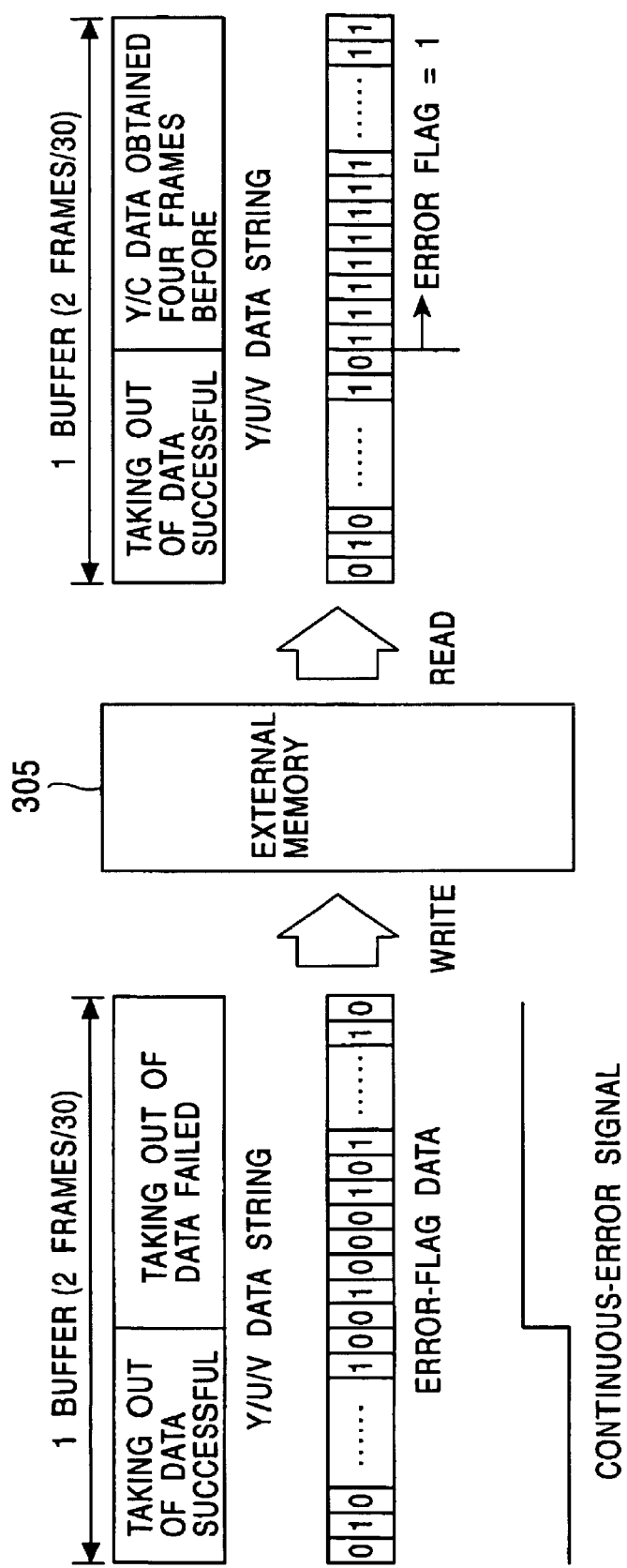
FIG. 41 is a view showing a process achieved by the block deshuffle circuit 356 when the inter-segment deshuffle circuit 353 outputs a continuous-error signal.

FIG. 41 is a view showing a process achieved by the block deshuffle circuit 356 when the inter-segment deshuffle circuit 353 outputs a continuous-error signal. When the inter-segment deshuffle circuit 353 determines that both of an even-numbered ADRC block and the corresponding odd-numbered ADRC block are lost, the inter-segment deshuffle circuit 353 outputs a continuous-error signal. Since the correlation of the pixel values of adjacent pixels is used in the recovery process of "q" and a motion flag MF achieved by the q-bit and MF recovery circuit 353, when both of an even-numbered ADRC block and the corresponding odd-numbered ADRC block are lost, the q-bit and MF recovery circuit 353 cannot execute the recovery process. When a continuous-error signal is sent, the block deshuffle circuit 356 determines that taking out of data from the subsequent buffers (each having 88 ADRC blocks) was unsuccessful, sets error flags to be sent afterwards to 1, stores the error flags in the external memory 305, and does not store decoded data received afterwards in the external memory 305.

Figure 42:
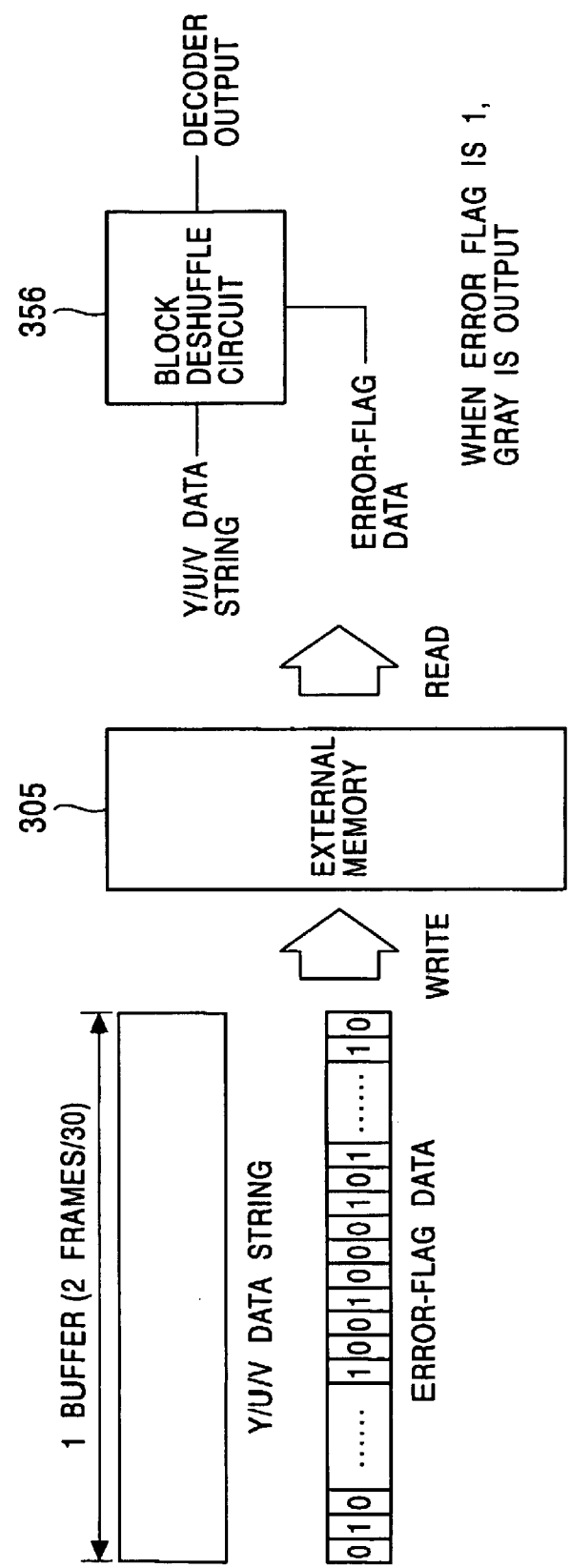
FIG. 42 is a view showing a process achieved by the block deshuffle circuit 356 in a gray mode.

FIG. 42 is a view showing the process of the block deshuffle circuit 356 achieved in a gray mode, which is user selectable. In the gray mode, the block deshuffle circuit 356 sets data which has an error flag of 1 to gray (does not set all of Y, U, and V data to 128 but sets only the corresponding data to 128), and outputs the data.

Figure 43:
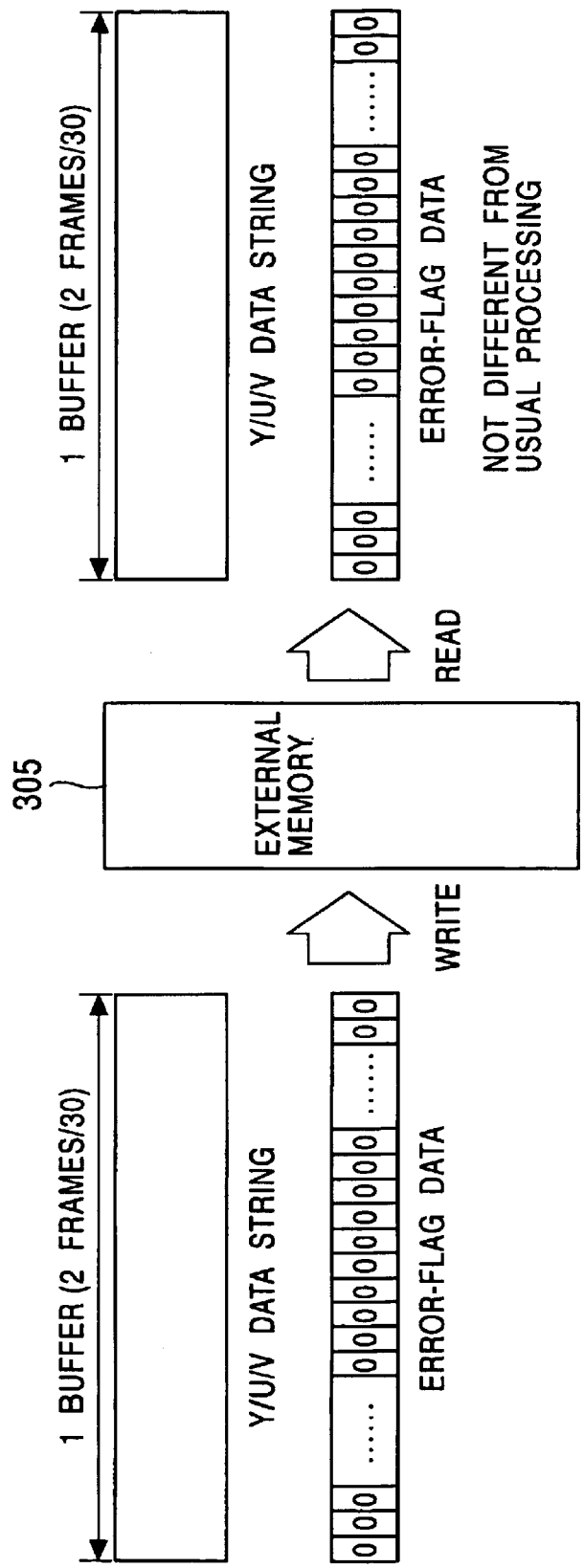
FIG. 43 is a view showing a process corresponding to a recovery-off input, achieved in the block deshuffle circuit 356.
Figure 44:
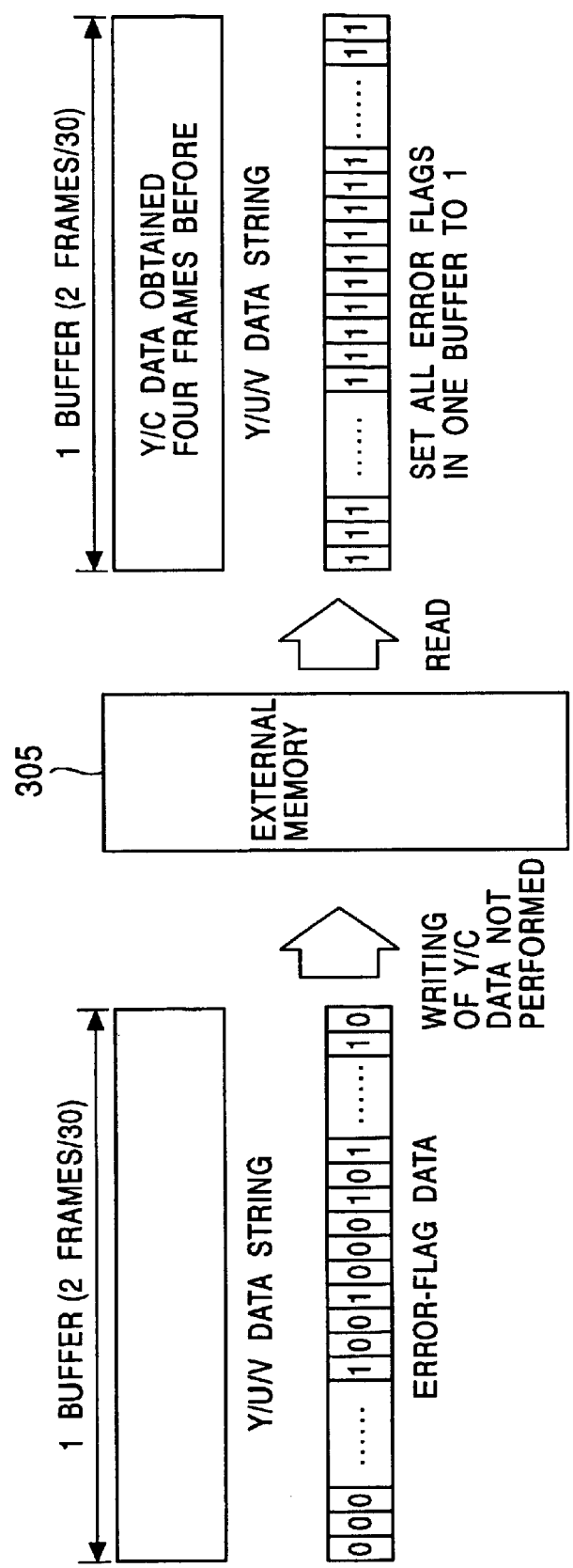
FIG. 44 is a view showing a process corresponding to a recovery-off input, achieved in the block deshuffle circuit 356.

FIG. 43 and FIG. 44 are views showing the process corresponding to a user-selectable recovery-off input (a signal to be input when the user operates a predetermined switch not shown) in the block deshuffle circuit 356. When a recovery-off input of 1 is sent, if the ADRC decoding circuit 355 decodes Y data, U data, and V data without using the q-bit and MF recovery circuit 353, the block deshuffle circuit 356 stores the decoded Y data, U data, and V data in the external memory 305 as shown in FIG. 43. As shown in FIG. 44, if the q-bit and MF recovery circuit 353 recovers "q" and a motion flag, the block deshuffle circuit 356 does not store decoded Y data, U data, or V data in the external memory 305, but sets all the corresponding error flags to 1. The effect of the recovery made by the q-bit and MF recovery circuit 353 is easily confirmed by changing the recovery-off input.

Figure 45:
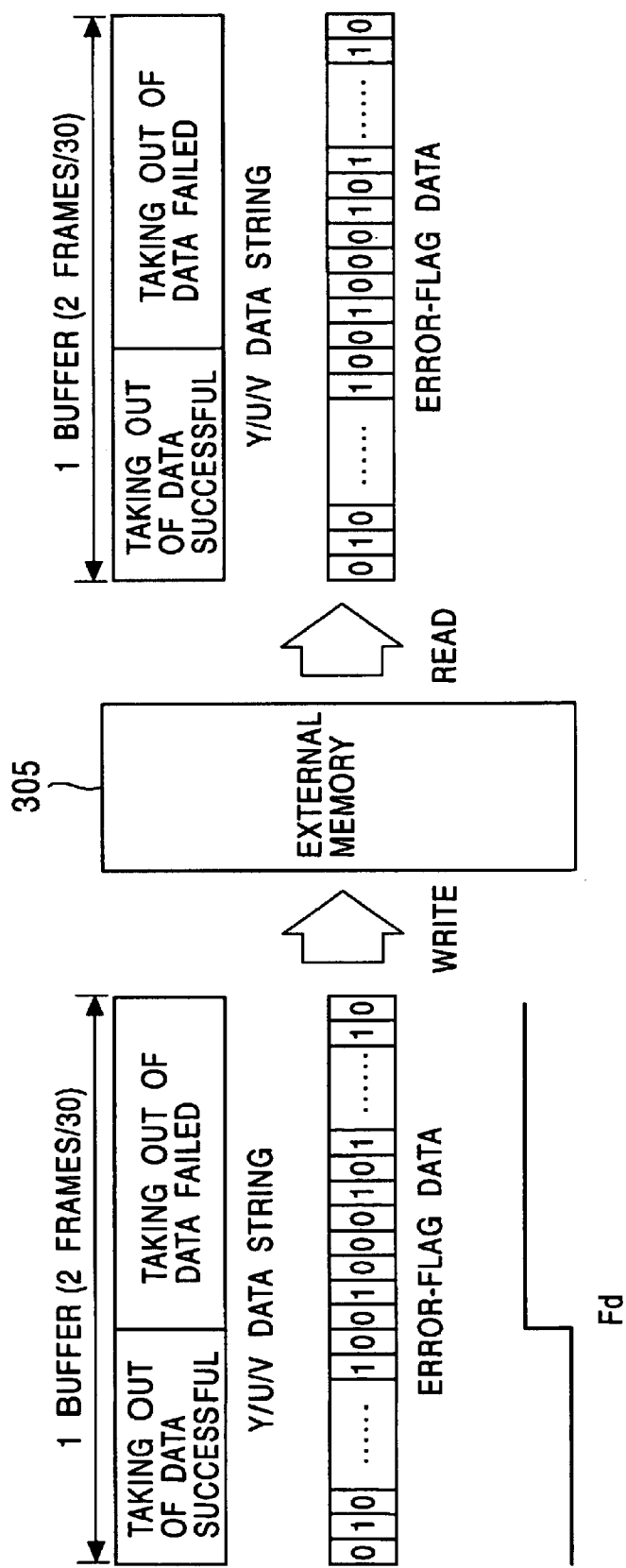
FIG. 45 is a view showing a process corresponding to an escape signal, achieved in the block deshuffle circuit 356.

FIG. 45 is a view showing the process corresponding to an escape signal (a signal input when the user operates a predetermined switch not shown) in the block deshuffle circuit 356. When an escape signal is sent, even if the recovery determination flag Fd is set to 1, the block deshuffle circuit 356 does not forcedly set error flags to be sent afterwards to 1, stores error flags in a memory, and stores decoded Y data, U data, and V data sent afterwards in the memory. The effect of the conceal process of the block deshuffle circuit 356 is easily confirmed by changing the escape signal.

Figure 46:
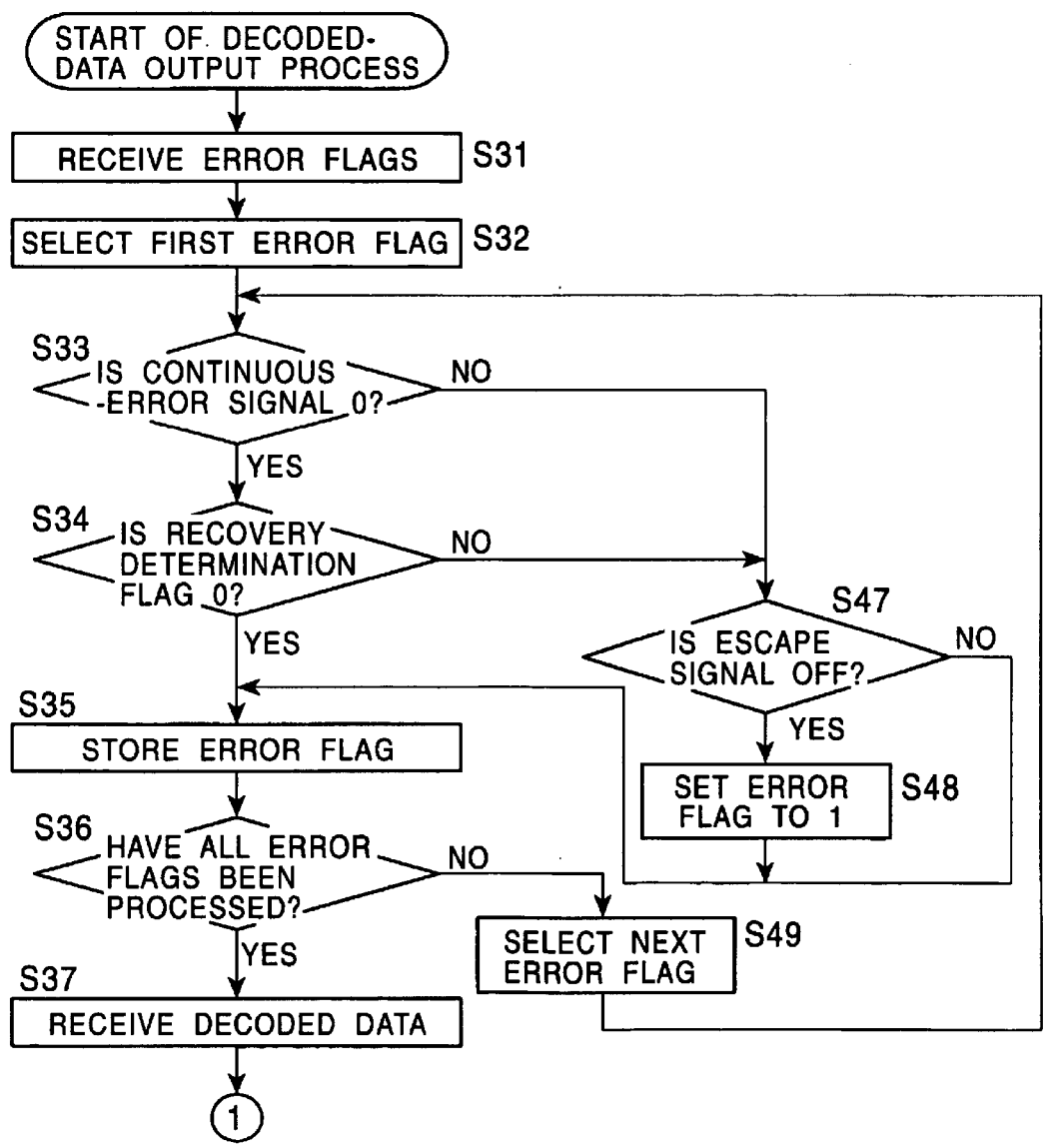
FIG. 46 is a flowchart of a process for outputting decoded data from the block deshuffle circuit 356.
Figure 47:
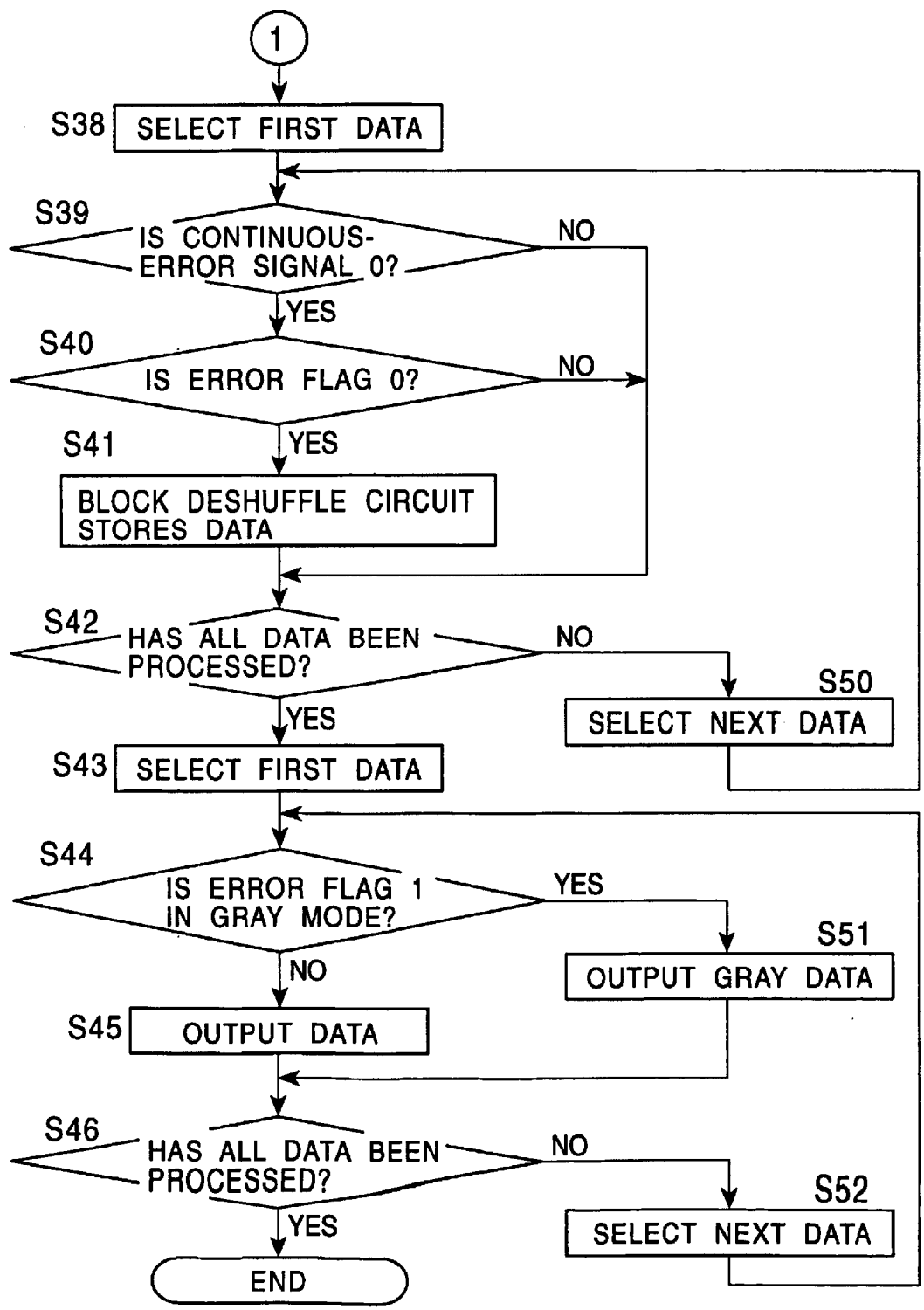
FIG. 47 is a flowchart of the process for outputting decoded data from the block deshuffle circuit 356.

FIG. 46 and FIG. 47 are flowcharts showing a decoded-data output process in the block deshuffle circuit 356. In step S31, the inter-segment deshuffle circuit 352 receives error flags generated by the receiving circuit 301, and sends them to the ADRC decoding circuit 355. The ADRC decoding circuit 355 outputs the error flags sent from the inter-segment deshuffle circuit 352, to the block deshuffle circuit 356. The block deshuffle circuit 356 receives the error flags.

In step S32, the block deshuffle circuit 356 selects a first error flag corresponding to a buffer (predetermined 88 ADRC blocks), sent from the ADRC decoding circuit 355. In step S33, the block deshuffle circuit 356 determines whether the continuous-error signal sent from the inter-segment deshuffle circuit 352 is 0. When it is determined that the continuous-error signal is 0, the process proceeds to step S34, and it is determined whether the recovery determination flag Fd sent from the recovery-error determination circuit 357 is 0. When it is determined in step S34 that the recovery determination flag Fd is 0, the process proceeds to step S35, and the block deshuffle circuit 356 stores the error flag in the external memory 305.

When it is determined in step S33 that the continuous-error signal is 1, or when it is determined in step S34 that the recovery determination flag Fd is 1, since taking out of data failed, the process proceeds to step S47. The block deshuffle circuit determines whether the escape signal is off. When it is determined that the escape signal is off, the process proceeds to step S48, the error flag selected in step S32 is set to 1, the process proceeds to step S35, and the block deshuffle circuit 356 stores the error flag in the external memory 305.

When it is determined in step S47 that the escape signal is on, since the error flag is not set, the process skips step S48 and proceeds to step S35, and the block deshuffle circuit 356 stores the error flag in the external memory 305.

In step S36, the block deshuffle circuit 356 determines whether all the error flags corresponding to the buffer have been handled. When it is determined that all the error flags have been handled, the process proceeds to step S37, and the block deshuffle circuit 356 receives decoded Y data, U data, and V data from the ADRC decoding circuit.

When it is determined in step S36 that all the error flags of the buffer have not yet handled, the process proceeds to step S49, the block deshuffle circuit 356 selects the next error flag, the process returns to step S33, and error-flag setting is repeated.

In step S38, the block deshuffle circuit 356 selects the first decoded data of the buffer, sent from the ADRC decoding circuit 355.

In step S39, the block deshuffle circuit 356 determines whether the continuous-error signal sent from the inter-segment deshuffle circuit 352 is 0. When it is determined that the continuous-error signal is 0, the process proceeds to step S40, and it is determined whether the error flag corresponding to the selected decoded data is 0. When it is determined that the error flag corresponding to the selected decoded data is 0, the process proceeds to step S41, and the block deshuffle circuit 356 stores the selected decoded Y data, U data, and V data in the external memory 305. Then, the process proceeds to step S42.

When it is determined in step S39 that the continuous-error signal is 1, or when it is determined in step S40 that the error flag corresponding to the selected decoded data is 1, since data is lost, the process skips step S41 and proceeds to step S42.

In step S42, the block deshuffle circuit 356 determines whether all the decoded data of the buffer has been processed. When it is determined that all the decoded data of the buffer has been processed, the process proceeds to step S43.

In step S42, when it is determined that all the decoded data of the buffer (88 ADRC blocks) has not yet been processed, the process proceeds to step S50, and the block deshuffle circuit 356 selects the next data. Then, the process returns to step S39, and storing of decoded data is repeated.

In step S43, the block deshuffle circuit 356 selects the first data stored in the external memory 305. In step S44, the block deshuffle circuit 356 determines whether the error flag is 1 and the mode is the gray mode. When it is determined that the error flag is 0 or that the mode is not the gray mode, the process proceeds to step S45, and the selected data is output to the format conversion circuit 306.

In step S44, when it is determined that the error flag is 1 and the mode is the gray mode, the process proceeds to step S51, and the block deshuffle circuit 356 outputs the gray data to the format conversion circuit 306. Then, the process proceeds to step S46.

In step S46, the block deshuffle circuit 356 determines whether all the data stored in the banks of the external memory 305 has been processed. When it is determined that all the data stored in the external memory 305 has been processed, the process is terminated.

In step S46, when it is determined that all the data stored in the external memory 305 has not yet been processed, the process proceeds to step S52, and the block deshuffle circuit 356 selects the next data stored in the banks of the external memory 305. Then, the process returns to step S44, and data output is repeated.

As described above, even if the code Q is lost, the block deshuffle circuit 356 outputs data which gives the least congruous impression.

Figure 48:
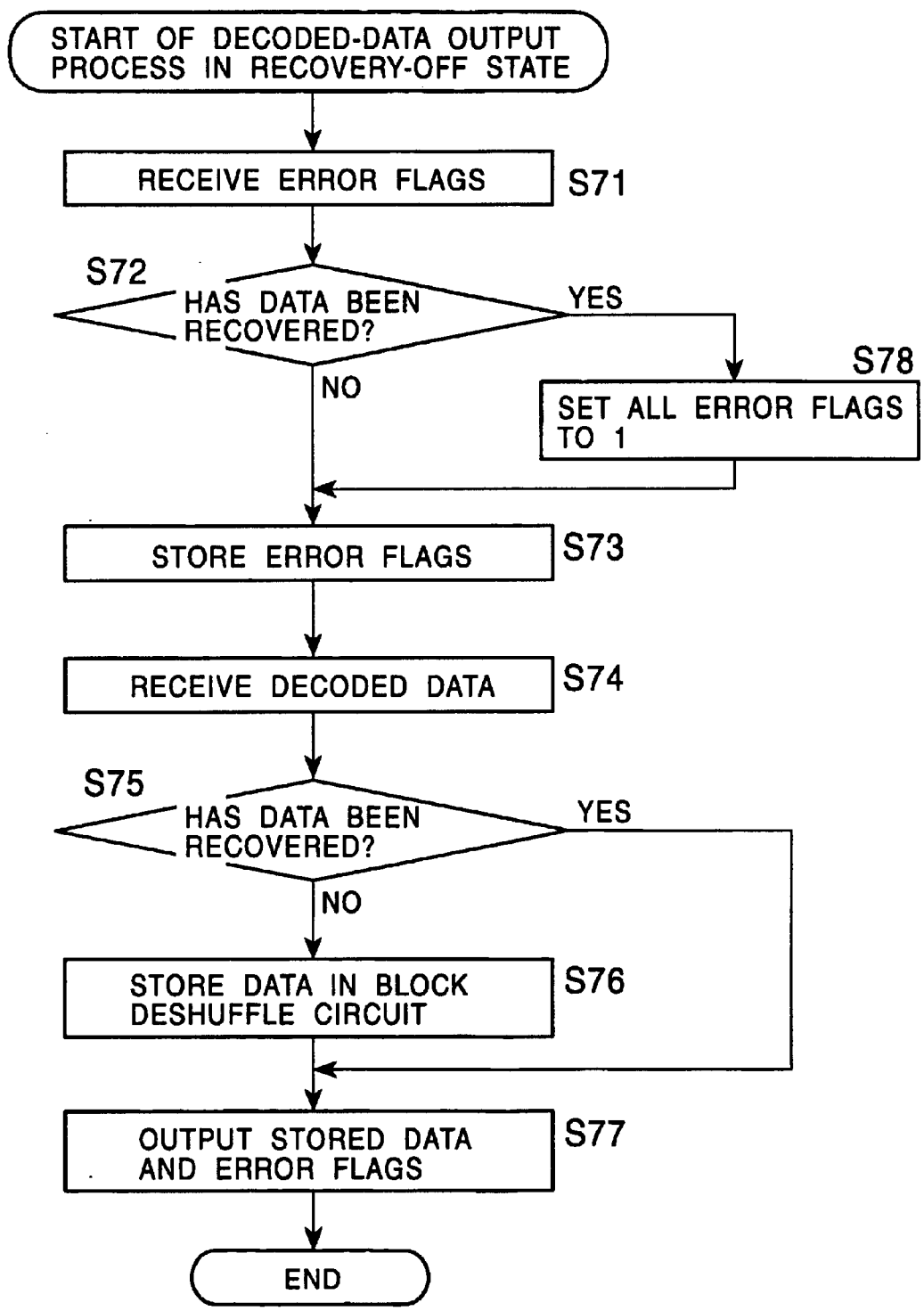
FIG. 48 is a flowchart of a process for outputting data from the block deshuffle circuit 356 when a recovery-off input is 1.

A process for outputting data when the user-selectable recovery-off switch not shown is 0 (off), achieved by the block deshuffle circuit 356 will be described next by referring to a flowchart shown in FIG. 48. In step S71, the inter-segment deshuffle circuit 352 receives error flags generated by the receiving circuit 301, and sends them to the ADRC decoding circuit 355. The ADRC decoding circuit 355 outputs the error flags sent from the inter-segment deshuffle circuit 352, to the block deshuffle circuit 356, and the block deshuffle circuit 356 receives the error flags.

In step S72, the block deshuffle circuit 356 determines whether "q" and the motion flag, and others have been recovered by the q-bit and MF recovery circuit 353 and other circuits. When it is determined that none of "q" and the motion flag MF, and others has been recovered, the process proceeds to step S73, and the error flag is stored in the external memory 305.

In step S72, when it is determined that "q" and the motion flag, and others have been recovered, the process proceeds to step S78, and the block deshuffle circuit 356 sets all received error flags to 1. Then, the process proceeds to step S73.

In step S74, the block deshuffle circuit 356 receives decoded Y data, U data, and V data from the ADRC decoding circuit 355.

In step S75, the block deshuffle circuit 356 determines whether "q" and the motion flag, and others have been recovered by the q-bit and MF recovery circuit 353 and other circuits. When it is determined that none of "q" and the motion flag MF, and others has been recovered, the process proceeds to step S76, and the Y data, U data, and V data received in step S74 are stored.

In step S75, when it is determined that "q" and the motion flag, and others have been recovered, the process skips step S76. The Y data, U data, or V data is not stored, and the process proceeds to step S77.

In step S77, the block deshuffle circuit 356 outputs the Y data, U data, and V data, and the error flags stored in the external memory 305, to the format conversion circuit 306, and the process is terminated.

As described above, when the recovery-off input is 1, the block deshuffle circuit 356 does not output recovered data.

As described above, even if predetermined data required for decoding is lost, since the q-bit and MF recovery circuit 353 and the DR and MIN recovery circuit 354 recover the lost data, the decoding circuit 304 can achieve decoding. In addition, if decoding cannot be achieved, the decoding circuit 304 can output data which gives the least incongruous impression. Furthermore, the effect of the recovery can be easily confirmed by setting the recover-off input to 1.

Figure 49A:
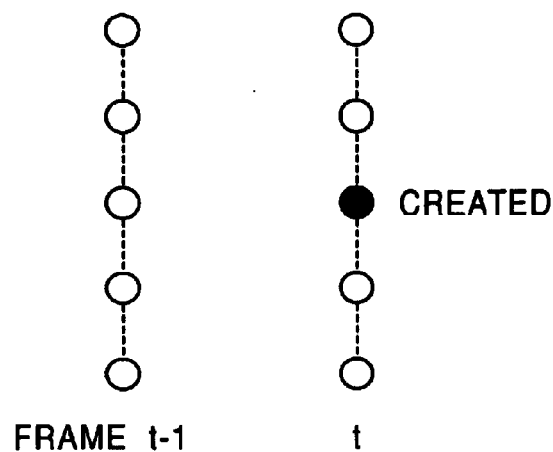
FIGS. 49A and 49B are views showing pixels used in a process of a missing-pixel creation circuit 308.
Figure 49B:
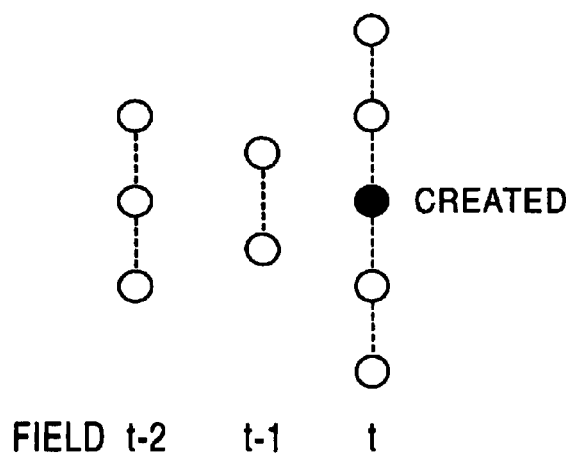

The missing-pixel creation circuit 308 will be described next. When the missing-pixel creation circuit 308 reproduces a progressive-type image, the missing-pixel creation circuit 308 creates the pixel value of a missing pixel and others by class-classification adaptation processing according to the pixel values of pixels disposed surrounding the pixel for which a pixel value is to be created, in the same frame (frame "t") and the pixel values of the pixels in the frame (frame "t-1") one frame before, disposed at the same positions in the horizontal direction and the vertical direction as the pixels disposed surrounding the pixel for which a pixel value is to be created, as shown in FIG. 49A. The missing-pixel creation circuit 308 also creates the pixel value of the missing pixel and others by class-classification adaptation processing according to the pixel values of pixels disposed surrounding the pixel for which a pixel value is to be created, in the same field (field "t"), the pixel values of the pixels in the field (field "t-1") one field before, disposed at the same positions in the horizontal direction and the vertical direction as the pixels disposed surrounding the pixel for which a pixel value is to be created, and the pixel values of the pixels in the field (field "t-2") two fields before, disposed at the same positions in the horizontal direction and the vertical direction as the pixels disposed surrounding the pixel for which a pixel value is to be created, as shown in FIG. 49B.

Figure 50:
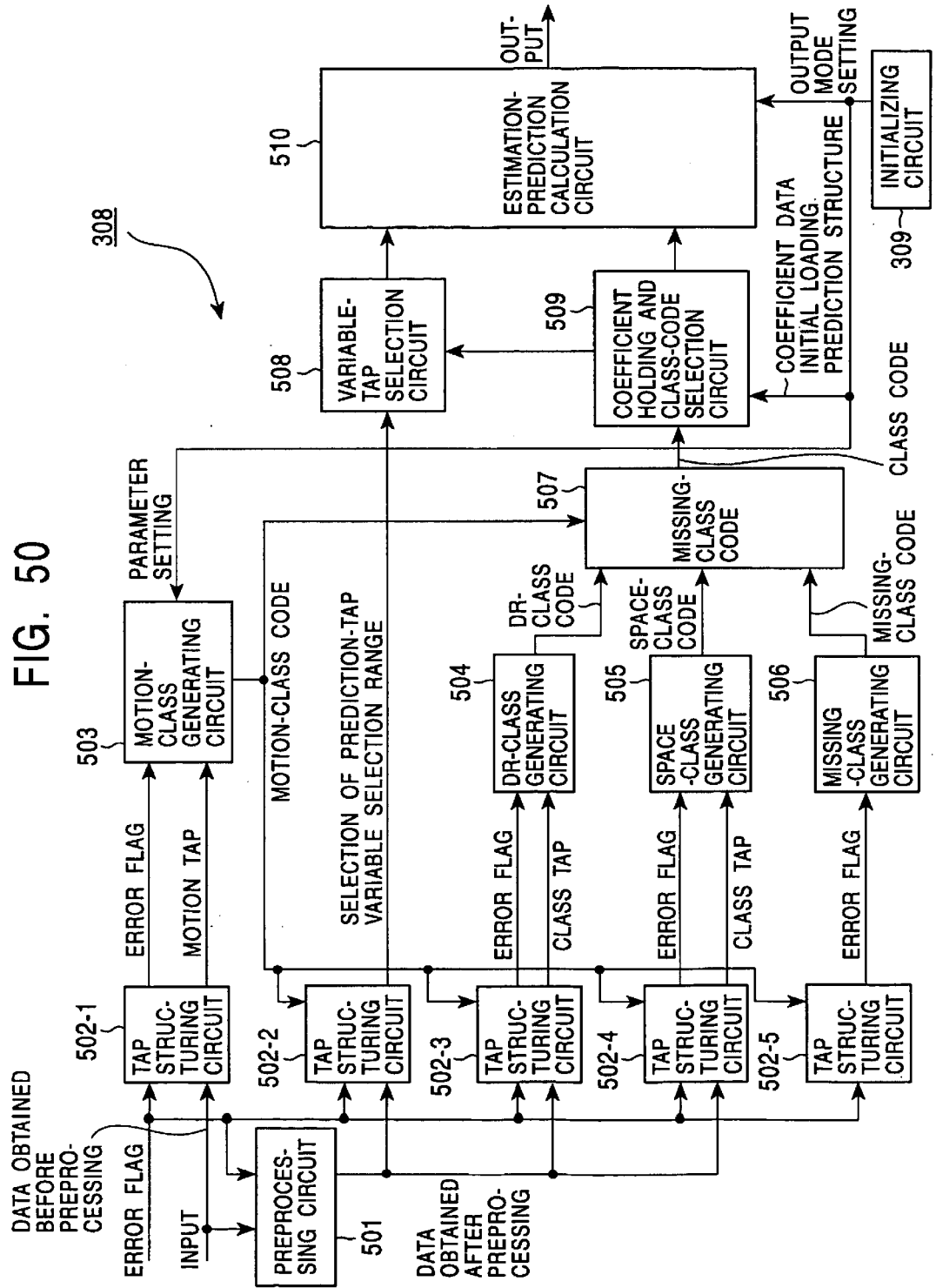
FIG. 50 is a block diagram showing the structure of the missing-pixel creation circuit 308.

FIG. 50 is a block diagram showing the structure of the missing-pixel creation circuit 308. Data input to the missing-pixel creation circuit 308, a pixel value and an error flag indicating that a pixel is missing, is sent to a preprocessing circuit 501 and to a tap structuring circuit 502-1.

The preprocessing circuit 501 generates the value of the missing pixel by a liner interpolation filter according to the input pixel value and the error flag indicating that the pixel is missing, assigns the value to the missing pixel, and sends it to the tap structuring circuits 502-2 to 502-5. A pixel value is also called tap data.

Figure 51:
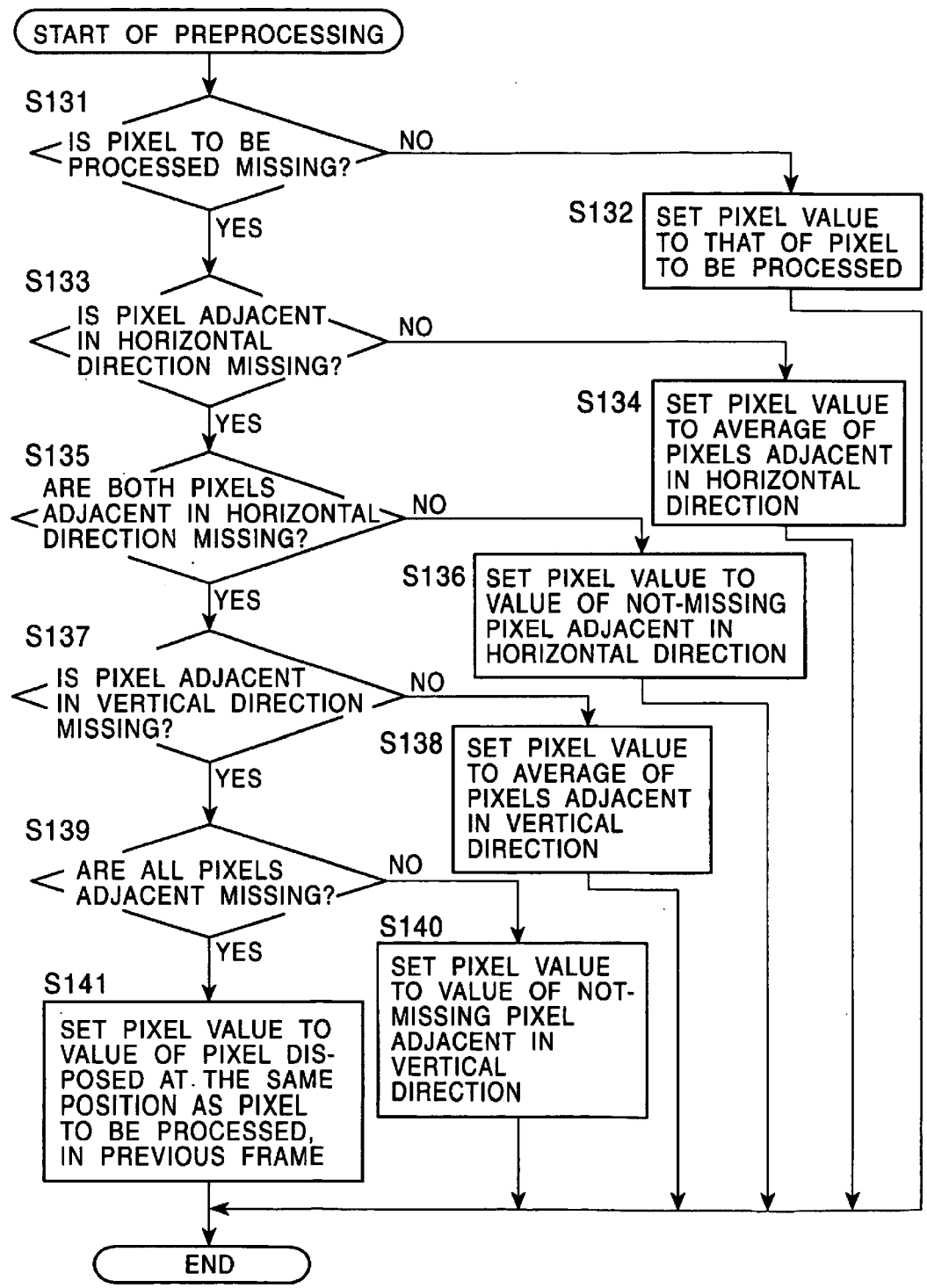
FIG. 51 is a flowchart of a process of a preprocessing circuit 501.

The processing of the preprocessing circuit 501 will be described below by referring to a flowchart shown in FIG. 51. In step S131, the preprocessing circuit 501 determines according to the error flag whether the pixel to be processed is missing. When it is determined that the pixel to be processed is not missing, the processing proceeds to S132, the pixel value of the pixel to be processed is assigned to the pixel to be processed, and the processing is terminated.

When it is determined in step S131 that the pixel to be processed is missing, the processing proceeds to step S133, and the preprocessing circuit 501 determines according to error flags whether any of pixels adjacent to the pixel to be processed in the horizontal direction is missing. When it is determined in step S133 that none of the pixels adjacent to the pixel to be processed in the horizontal direction is missing, the processing proceeds to step S134, the preprocessing circuit 501 sets the pixel value of the pixel to be processed to the average of the pixel values of the two pixels adjacent to the pixel to be processed in the horizontal direction, and the processing is terminated.

In step S133, when it is determined that any of the pixels adjacent to the pixel to be processed in the horizontal direction is missing, the processing proceeds to step S135, and the preprocessing circuit 501 determines whether both of the pixels adjacent to the pixel to be processed in the horizontal direction are missing. In step S135, when it is determined that any of the pixels adjacent to the pixel to be processed in the horizontal direction is not missing, the processing proceeds to step S136 and the preprocessing circuit 501 sets the pixel value of the pixel to be processed to the pixel value of the pixel which is not missing, adjacent to the pixel to be processed in the horizontal direction, and the processing is terminated.

In step S135, when it is determined that both of the pixels adjacent to the pixel to be processed in the horizontal direction are missing, the processing proceeds to step S137, and the preprocessing circuit 501 determines according to error flags whether any of the pixels adjacent to the pixel to be processed in the vertical direction is missing. In step S137, when it is determined that any of the pixels adjacent to the pixel to be processed in the vertical direction is not missing, the processing proceeds to step S138, the preprocessing circuit 501 sets the pixel value of the pixel to be processed to the average of the pixel values of the two pixels adjacent to the pixel to be processed in the vertical direction, and the processing is terminated.

In step S137, when it is determined that any of the pixels adjacent to the pixel to be processed in the vertical direction is missing, the processing proceeds to step S139, and the preprocessing circuit 501 determines whether all pixels adjacent to the pixel to be processed are missing. In step S139, when it is determined that any of the pixels adjacent to the pixel to be processed is not missing, the processing proceeds to step S140, the preprocessing circuit 501 sets the pixel value of the pixel to be processed to the pixel value of the pixel which is not missing, adjacent to the pixel to be processed, and the processing is terminated.

In step S139, when it is determined that all the pixels adjacent to the pixel to be processed are missing, the processing proceeds to step S141, the preprocessing circuit 501 sets the pixel value of the pixel to be processed to the pixel value of the pixel which is disposed at the same position as the pixel to be processed, in a previous frame, and the processing is terminated.

As described above, the preprocessing circuit 501 linearly interpolates the pixel value of the pixel to be processed by using the pixel values of its surrounding pixels. With the interpolation processing achieved by the preprocessing circuit 501, the range of taps which can be used in subsequent processing is extended.

The tap structuring circuits 502-1 to 502-5 send tap data and others to a motion-class generating circuit 503, a DR-class generating circuit 504, a space-class generating circuit 505, and a missing-class generating circuit 506.

The motion-class generating circuit 503 generates a motion-class code and a still/motion flag according to a parameter sent from the initializing circuit 309 and the error flag and the selected tap sent from the tap structuring circuit 502-1, and outputs them to the tap structuring circuits 502-2 to 502-5 and to a class synthesizing circuit 507. The motion-class code has two bits indicating the amount of a motion, and the still/motion flag has one bit indicating whether a motion is provided.

FIG. 52A is a view showing example three by three pixels with its center being placed on the pixel for which a pixel value is to be created, the pixels being used for calculating a time activity in the motion-class generating circuit 503. In FIG. 52A, an "error" indicates a missing pixel. FIG. 52B is a view showing example three by three pixels in the frame one frame before, corresponding to the pixels shown in FIG. 52A. L1 to L3 shown in FIG. 52A and FIG. 52B indicate lines, and the same numerals in this notation indicates the same positions in the vertical direction. H1 to H3 shown in FIG. 52A and FIG. 52B indicate pixel positions in the horizontal direction, and the same numerals in this notation indicates the same positions in the horizontal direction.

In the cases shown in FIG. 52A and FIG. 52B, the time activity is calculated by the expression (12).

$$\text{Time activity} = |(q2)-(p2)|+|(q3)-(p3)|+|(q4)-(p4)|+|(q6)-(p6)|+ |(q7)-(p7)|+|(q9)-(p9)| \quad (12)$$

In the expression (12), ( ) indicates the pixel value of a pixel, and || means a function for obtaining an absolute value.

The motion-class generating circuit 503 calculates a space activity, which is the difference between the maximum value and the minimum value of the three by three pixels with the pixel for which a pixel value is to be created being placed at its center, plus 1.

FIG. 53 is a view showing example three by three pixels with its center being placed on the missing pixel for which a pixel value is to be created, used for calculating a space activity in the motion-class generating circuit 503. The space activity is calculated by the expression (13).

$$\text{Space activity} = \text{Max}(qi) - \text{MIN}(qi) + 1 \quad (13)$$

In the expression (13), Max(qi) indicates the maximum value of the pixel values of pixels q1 to q9, and Min(qi) indicates the minimum value of the pixel values of the pixels q1 to q9.

The motion-class generating circuit 503 selects thresholds having different values, according to the space activity. The motion-class generating circuit 503 specifies a motion-class code according to motion-determination thresholds and the time activity.

Figure 54:
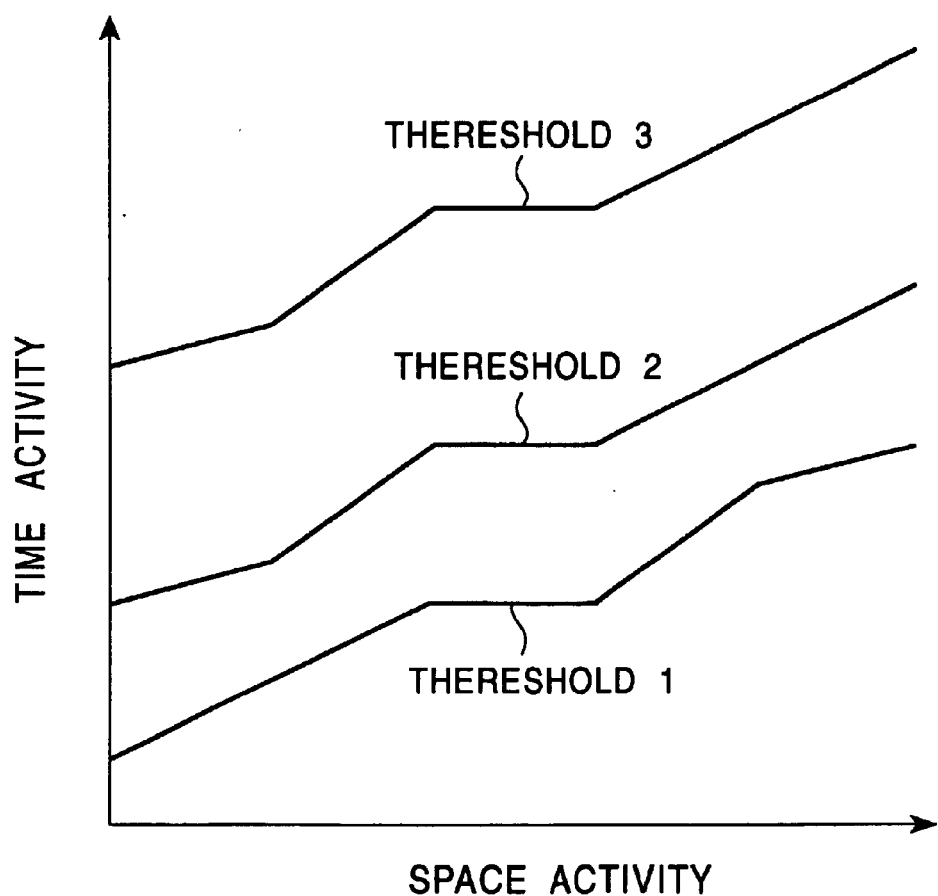
FIG. 54 is a view showing thresholds used in motion determination.

FIG. 54 is a view showing motion-determination thresholds. Different motion-determination thresholds are used according to the value of the space activity. As the space activity becomes large, a large threshold is used. This is because, when the space activity is large, it is taken into account that the time activity becomes large even with a little motion.

In a process for standard-density data, a motion-class code is specified by using a fixed threshold irrespective of the space activity.

Figure 55:
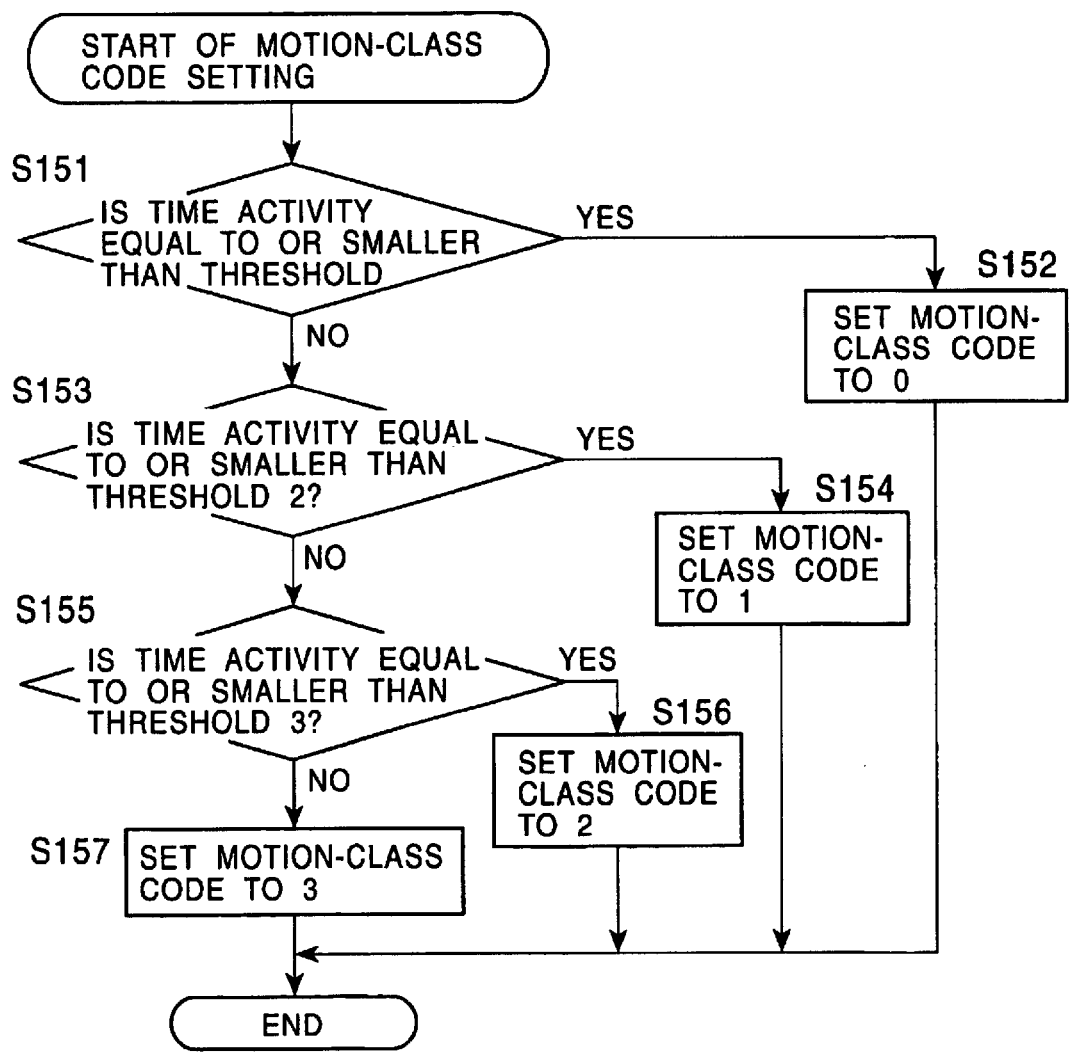
FIG. 55 is a flowchart of a process for setting a motion-class code in a still/motion determination circuit 521.

A process for specifying a motion-class code in the motion-class generating circuit 503 will be described next by referring to a flowchart shown in FIG. 55. In step S151, the motion-class generating circuit 503 determines whether the time activity is equal to or smaller than a threshold 1. When it is determined that the time activity is equal to or smaller than the threshold 1, the process proceeds to step S152, a motion-class code is set to 0, and the process is terminated.

In step S151, when it is determined that the time activity exceeds the threshold 1, the process proceeds to step S153, and the motion-class generating circuit 503 determines whether the time activity is equal to or smaller than a threshold 2. When it is determined that the time activity is equal to or smaller than the threshold 2, the process proceeds to step S154, and the motion-class code is set to 1, and the process is terminated.

In step S153, when it is determined that the time activity exceeds the threshold 2, the process proceeds to step S155, and the motion-class generating circuit 503 determines whether the time activity is equal to or smaller than a threshold 3. When it is determined that the time activity is equal to or smaller than the threshold 3, the process proceeds to step S156, the motion-class code is set to 2, and the process is terminated.

In step S155, when it is determined that the time activity exceeds the threshold 3, the process proceeds to step S157, the motion-class generating circuit 503 sets the motion-class code to 3, and the process is terminated.

As described above, the motion-class generating circuit 503 specifies the motion-class code according to the thresholds and the time activity.

The motion-class generating circuit 503 sets a motion flag again according to the motion-class codes of a plurality of pixels. As shown in FIG. 56, for example, the motion-class generating circuit 503 sets the motion-class code of the pixel to be processed, according to the motion-class codes of the surrounding pixels of the pixel for which a pixel value is to be created.

Figure 57:
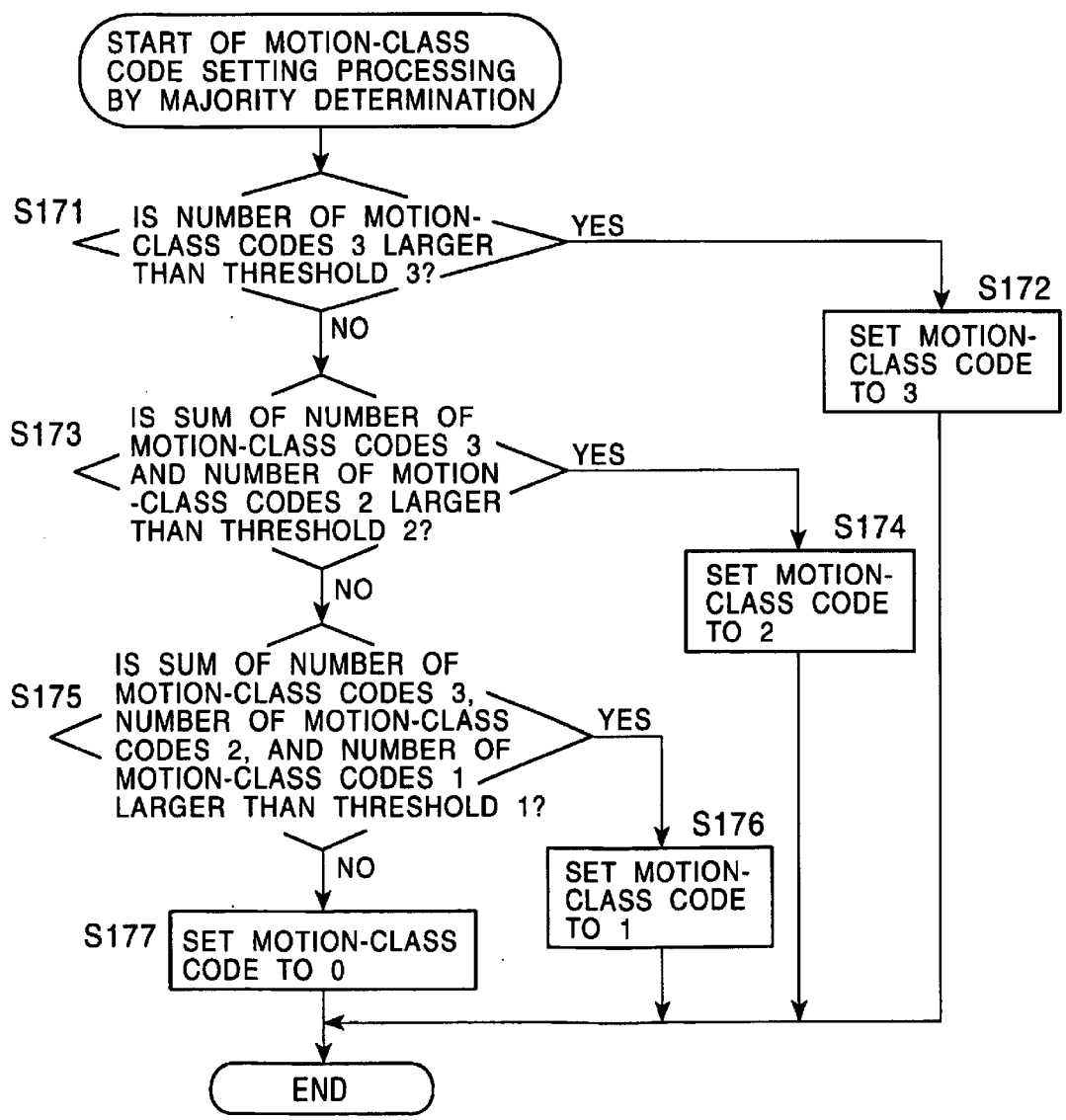
FIG. 57 is a flowchart of a process for setting a motion-class code in a motion-class generating circuit 503.

A process for specifying a motion-class code in the motion-class generating circuit 503 will be described next by referring to a flowchart shown in FIG. 57. In step S171, the motion-class generating circuit 503 determines whether the number of motion-class codes having a value of 3 is larger than the threshold 3 among the class codes of seven pixels. When it is determined that the number of motion-class codes having a value of 3 is larger than the threshold 3, the process proceeds to step S172, the motion-class code is set to 3, and the process is terminated.

In step S171, when it is determined that the number of motion-class codes having a value of 3 is equal to or smaller than the threshold 3, the process proceeds to step S173, and the motion-class generating circuit 503 determines whether the sum of the number of motion-class codes having a value of 3 and the number of motion-class codes having a value of 2 is larger than the threshold 2. When it is determined that the sum of the number of motion-class codes having a value of 3 and the number of motion-class codes having a value of 2 is larger than the threshold 2, the process proceeds to step S174, and the motion-class code is set to 2, and the process is terminated.

In step S173, when it is determined that the sum of the number of motion-class codes having a value of 3 and the number of motion-class codes having a value of 2 is equal to or smaller than the threshold 2, the process proceeds to step S175, and the motion-class generating circuit 503 determines whether the sum of the number of motion-class codes having a value of 3, the number of motion-class codes having a value of 2, and the number of motion-class codes having a value of 1 is larger than the threshold 1. When it is determined that the sum of the number of motion-class codes having a value of 3, the number of motion-class codes having a value of 2, and the number of motion-class codes having a value of 1 is larger than the threshold 1, the process proceeds to step S176, the motion-class code is set to 1, and the process is terminated.

In step S175, when it is determined that the sum of the number of motion-class codes having a value of 3, the number of motion-class codes having a value of 2, and the number of motion-class codes having a value of 1 is equal to or smaller than the threshold 1, the process proceeds to step S177, the motion-class generating circuit 503 sets the motion-class code to 0, and the process is terminated.

As described above, the motion-class generating circuit 503 sets the final motion-class code according to the motion-class codes of a plurality of pixels and the thresholds stored in advance.

As described above, the motion-class generating circuit 503 sets the motion-class code by using the pixel values of a plurality of pixels, and outputs it. The motion-class generating circuit 503 sets a still/motion flag according to the motion-class code, and outputs it. For example, when the motion-class code is 0 or 1, the still/motion flag is set to 0. When the motion-class code is 2 or 3, the still/motion flag is set to 1.

The tap structuring circuit 502-2 selects a tap in a prediction-tap variable selection range which includes prediction taps in all classes, according to the motion-class code and the still/motion flag sent from the motion-class generating circuit 503, and the position of the missing pixel, and sends the selected tap in the prediction-tap variable selection range to a variable-tap selection circuit 508.

The tap structuring circuit 502-3 selects class taps according to the motion-class code and the still/motion flag sent from the motion-class generating circuit 503, and sends the selected class taps to the DR-class generating circuit 504 together with an error flag indicating whether each of the selected taps is missing. The DR-class generating circuit 504 detects a dynamic range only from class taps which are not missing, according to the class taps and the error flags sent from the tap structuring circuit 502-3, generates the DR-class code corresponding to the detected dynamic range, and outputs it to the class synchronizing circuit 507.

The tap structuring circuit 502-4 selects class taps according to the motion-class code and the still/motion flag sent from the motion-class generating circuit 503, and sends the selected class taps to the space-class generating circuit 505 together with an error flag indicating whether each of the selected class taps is missing. The space-class generating circuit 505 generates a space-class code only from class taps which are not missing, according to the class taps and the error flags sent from the tap structuring circuit 502-4, and outputs it to the class synchronizing circuit 507. The space-class generating circuit 505 may generate a space-class code from all class taps.

The tap structuring circuit 502-5 sends the error flag corresponding to a missing pixel and the error flags corresponding to pixels disposed around the missing pixel, according to the motion-class code and the still/motion flag sent from the motion-class generating circuit 503, to the missing-class generating circuit 506. The missing-class generating circuit 506 generates a missing-class code according to the error flag corresponding to the missing pixel and the error flags corresponding to pixels disposed around the missing pixel, sent from the tap structuring circuit 502-5, and outputs it to the class synchronizing circuit 507.

The class synthesizing circuit 507 integrates the motion-class code, the still/motion flag, the DR-class code, the space-class code, and the missing-class code into a class code to generate a final class code, and outputs it to a coefficient holding and class-code selection circuit 509.

The coefficient holding and class-code selection circuit 509 makes the variable-tap selection circuit 508 select a variable tap according to the coefficient set sent from the initializing circuit 309, a prediction structure, and the class code sent from the class synthesizing circuit 507, and outputs a prediction coefficient string to an estimation-prediction calculation circuit 510.

A prediction-tap data string selected by the variable-tap selection circuit 508 will be described below by referring to FIG. 58 to FIG. 61.

Figure 58:
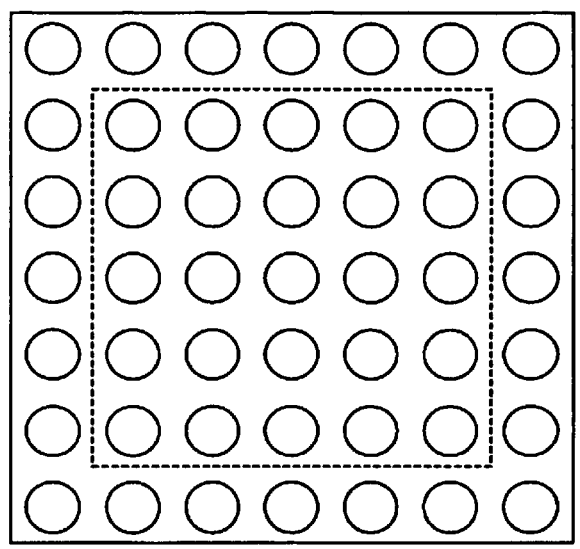
FIG. 58 is a view showing a prediction-tap data string selected by a variable-tap selection circuit 508.

FIG. 58 is a view showing an example prediction-tap variable selection range which the tap structuring circuit 502-2 outputs to the variable-tap selection circuit 508, and an example prediction-tap data string selected by the variable-tap selection circuit 508, when the motion-class code is 0. In FIG. 58, taps surrounded by a solid line indicate a prediction-tap variable selection range output from the tap structuring circuit 502-2, and taps surrounded by a dotted line indicate a prediction-tap data string selected by the variable-tap selection circuit 508. The prediction-tap data string selected by the variable-tap selection circuit 508 is formed of taps included in the prediction-tap variable selection range output from the tap structuring circuit 502-2.

When the motion-class code is 0, for example, the tap structuring circuit 502-2 selects adjacent taps. When the motion-class code is 0, for example, the variable-tap selection circuit 508 selects all adjacent taps.

Figure 59:
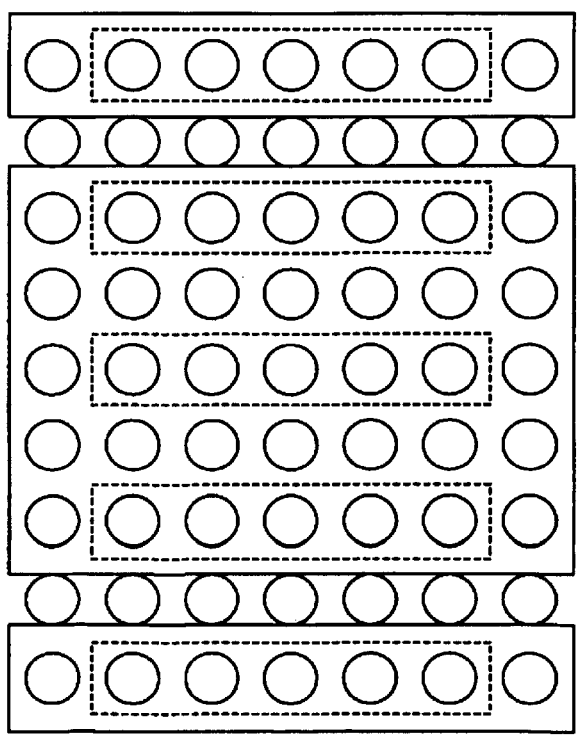
FIG. 59 is a view showing a prediction-tap data string selected by the variable-tap selection circuit 508.

FIG. 59 is a view showing a prediction-tap variable selection range output from the tap structuring circuit 502-2 and a prediction-tap data string selected by the variable-tap selection circuit 508, when the motion-class code is 1. In FIG. 59, taps surrounded by solid lines indicate a prediction-tap variable selection range output from the tap structuring circuit 502-2, and taps surrounded by dotted lines indicate a prediction-tap data string selected by the variable-tap selection circuit 508. The prediction-tap data string selected by the variable-tap selection circuit 508 is formed of taps included in the prediction-tap variable selection range output from the tap structuring circuit 502-2.

When the motion-class code is 1, for example, the tap structuring circuit 502-2 selects horizontally adjacent taps and taps not adjacent to the horizontally adjacent taps. When the motion-class code is 0, for example, the variable-tap selection circuit 508 selects five adjacent taps and other five horizontally adjacent taps separated from the five adjacent taps.

Figure 60:
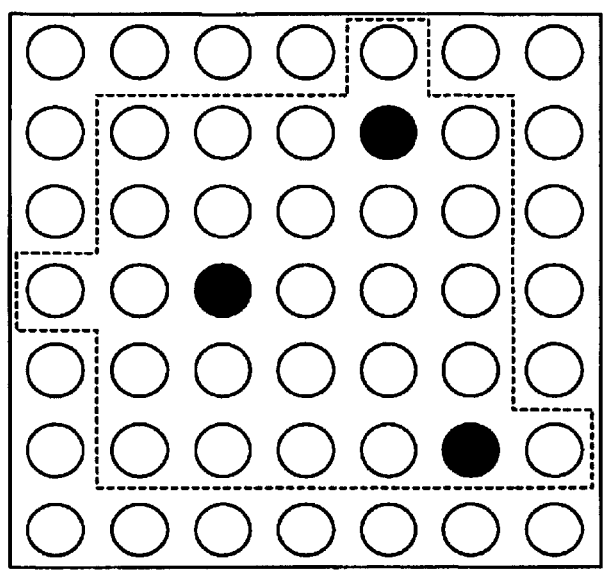
FIG. 60 is a view showing a prediction-tap data string selected by the variable-tap selection circuit 508.

FIG. 60 is a view showing a prediction-tap variable selection range output from the tap structuring circuit 502-2, and a prediction-tap data string selected by the variable-tap selection circuit 508, when a missing tap exists and the motion-class code is 0. Black circles in the figure represent missing taps. In FIG. 60, taps surrounded by a solid line indicate a prediction-tap variable selection range output from the tap structuring circuit 502-2, and taps surrounded by a dotted line indicate a prediction-tap data string selected by the variable-tap selection circuit 508. The prediction-tap data string selected by the variable-tap selection circuit 508 is formed of taps included in the prediction-tap variable selection range output from the tap structuring circuit 502-2.

When a missing tap exists and the motion-class code is 0, for example, the tap structuring circuit 502-2 selects adjacent taps. When a missing tap exists and the motion-class code is 0, for example, the variable-tap selection circuit 508 selects the same number of adjacent taps (such as a tap adjacent to the missing tap or a tap on the same line as the missing tap) as that of adjacent taps selected when the missing tap does not exist.

Figure 61:
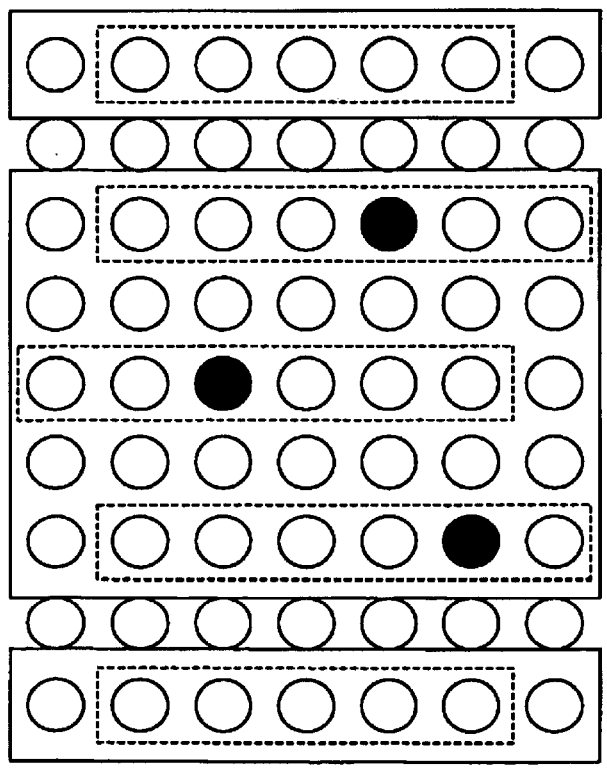
FIG. 61 is a view showing a prediction-tap data string selected by the variable-tap selection circuit 508.

FIG. 61 is a view showing a prediction-tap variable selection range output from the tap structuring circuit 502-2 and a prediction-tap data string selected by the variable-tap selection circuit 508, when a missing tap exists and the motion-class code is 1. Black circles in the figure a represent missing taps. In FIG. 61, taps surrounded by solid lines indicate a prediction-tap variable selection range output from the tap structuring circuit 502-2, and taps surrounded by dotted lines indicate a prediction-tap data string selected by the variable-tap selection circuit 508. The prediction-tap data string selected by the variable-tap selection circuit 508 is formed of taps included in the prediction-tap variable selection range output from the tap structuring circuit 502-2.

When a missing tap exists and the motion-class code is 1, for example, the tap structuring circuit 502-2 selects horizontally adjacent taps and taps not adjacent to the horizontally adjacent taps. When a missing tap exists and the motion-class code is 0, for example, the variable-tap selection circuit 508 selects the same number of horizontally adjacent taps (such as a tap adjacent to the missing tap or a tap on the same line as the missing tap) as that of adjacent taps selected when the missing tap does not exist, and the same number of horizontally adjacent taps separated from the above adjacent taps as that of adjacent taps selected when the missing tap does not exist.

The estimation-prediction calculation circuit 510 uses an estimation equation formed of a liner estimation expression and others to calculate the pixel value of the missing pixel in the output mode specified by the initializing circuit 309 according to the prediction-tap data string sent from the variable-tap selection circuit 508 and the prediction-coefficient string sent from the coefficient holding and class-code selection circuit 509.

As described above the missing-pixel creation circuit 308 calculates the pixel value of a missing pixel according to the pixel values of surrounding pixels of the missing pixel by using class classification caused by changes in dynamic range, in motion, in missing pixel, and in pixel value.

The estimation-prediction calculation circuit 510 can improve the image quality (such as an increase in gray levels (an increase in the number of bits used for Y data, U data, and V data), noise removal, removal of quantization distortion (including removal in the time direction) and creation of quadruple-density resolution) of an input image.

Figure 62A:
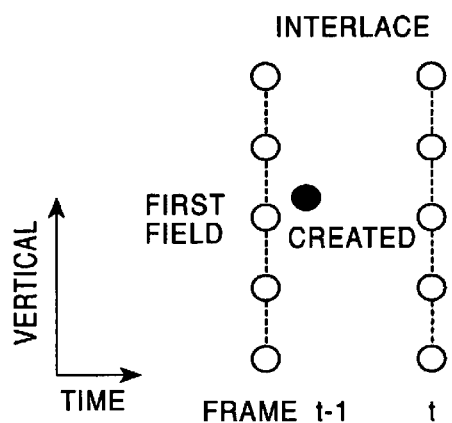
FIGS. 62A, 62B, 62C, and 62D are views showing the positions of pixels used in a process of a quadruple-density-resolution creation circuit 312.

The quadruple-density-resolution creation circuit 312 will be described next. The quadruple-density-resolution creation circuit 312 uses class-classification adaptation processing to arrange pixels created between the foregoing and following two fields at positions shifted by one fourth in the vertical direction from that of pixels in the foregoing and following frames, as shown in FIG. 62A and FIG. 62B, when an interlaced image is output.

Figure 62C:
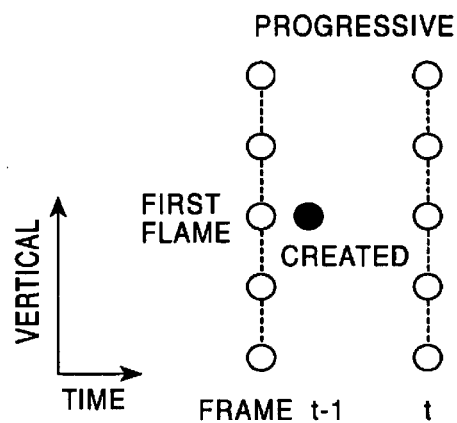
Figure 62B:
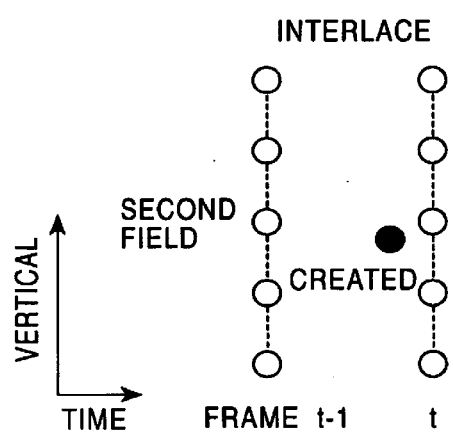
Figure 62D:
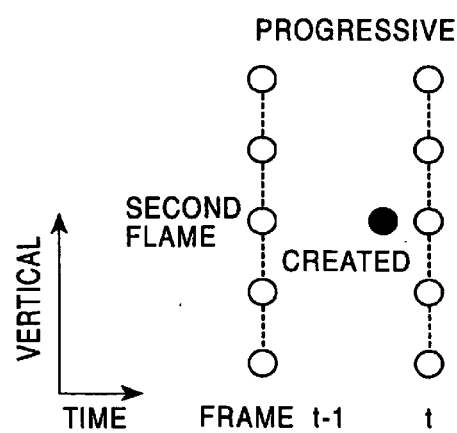

The quadruple-density-resolution creation circuit 312 uses class-classification adaptation processing to arrange pixels created between the foregoing and following two frames at the same position in the vertical direction as that of pixels in the foregoing and following frames, as shown in FIG. 62C and FIG. 62D, when a progressive-type image is output.

Figure 63:
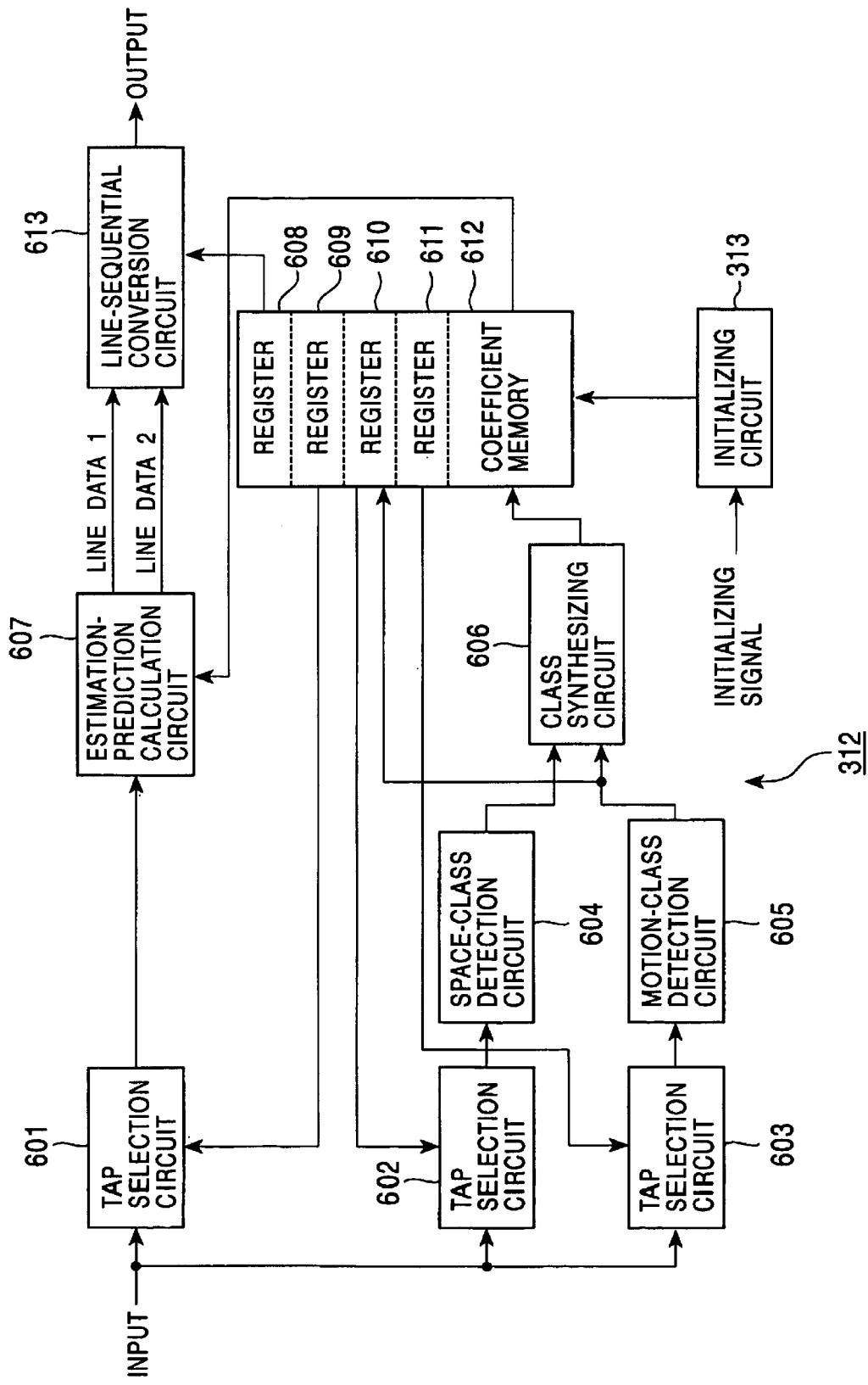
FIG. 63 is a block diagram showing the structure of the quadruple-density-resolution creation circuit 312.

FIG. 63 is a block diagram showing the structure of the quadruple-density-resolution creation circuit 312. The Y data, the U data, and the V data sent from the format conversion circuit 310 are sent to a tap selection circuit 601, a tap selection circuit 602, and a tap selection circuit 603.

The tap selection circuit 601 selects a pixel to be used for calculating the pixel value of a pixel to be created to quadruple the density, by using the positional information of a tap stored in a register 609. The pixel selected by the tap selection circuit 601 is sent to the estimation-prediction calculation circuit 607.

The tap selection circuit 602 selects a pixel to be used for space-class classification among pixels disposed in the vicinity of the pixel to be created, by using the positional information of a tap stored in a register 610. The pixel selected by the tap selection circuit 602 is sent to a space-class detection circuit 604. The space-class detection circuit 604 detects a space class. The detected space class is sent to a class synthesizing circuit 606.

The tap selection circuit 603 selects a pixel to be used for class classification corresponding to a motion according to pixels disposed in the vicinity of the pixel to be created, by using the positional information of a tap stored in a register 611. The pixel selected by the tap selection circuit 603 is sent to a motion-class detection circuit 605. The motion-class detection circuit 605 detects a motion class. The detected motion class is sent to the class synthesizing circuit 606 and to the register 610. The positional information of a tap stored in the register 610 is switched by the motion class sent from the motion-class detection circuit 605.

The class synthesizing circuit 606 integrates the space class and the motion class to generate a final class code.

This class code is sent to a coefficient memory 612 as an address, and the coefficient set corresponding to the class code is read from the coefficient memory 612. The coefficient set is sent to the estimation-prediction calculation circuit 607. The estimation-prediction calculation circuit 607 uses a liner estimation expression to calculate the pixel value of the pixel to be created, according to the pixel value of the pixel sent from the tap selection circuit 601 and the coefficient set sent from the coefficient memory 612. The outputs of the estimation-prediction calculation circuit 607 are sent to a line-sequential conversion circuit 613 as line data L1 and line data L2.

A coefficient set for each class is generated in advance by using Y data having 528 pixels in the horizontal direction and 240 pixels in the vertical direction per field and U data and V data each having 176 pixels in the horizontal direction and 120 pixels in the vertical direction per field, all of which serve as master signals, and is stored in the initializing circuit 313.

The line-sequential conversion circuit 613 has a line memory, and line-sequentially outputs the line data L1 and the line data L2 output from the estimation-prediction calculation circuit 607 according to the data of output timing stored in a register 608. The line-sequential conversion circuit 613 outputs image data having a density four times as large as that of the sent image data.

When an initializing signal is sent to the initializing circuit 313, the register 608, the register 609, the register 610, the register 611, and the coefficient memory 612 store the coefficient set and others sent from the initializing circuit 313.

Figure 64:
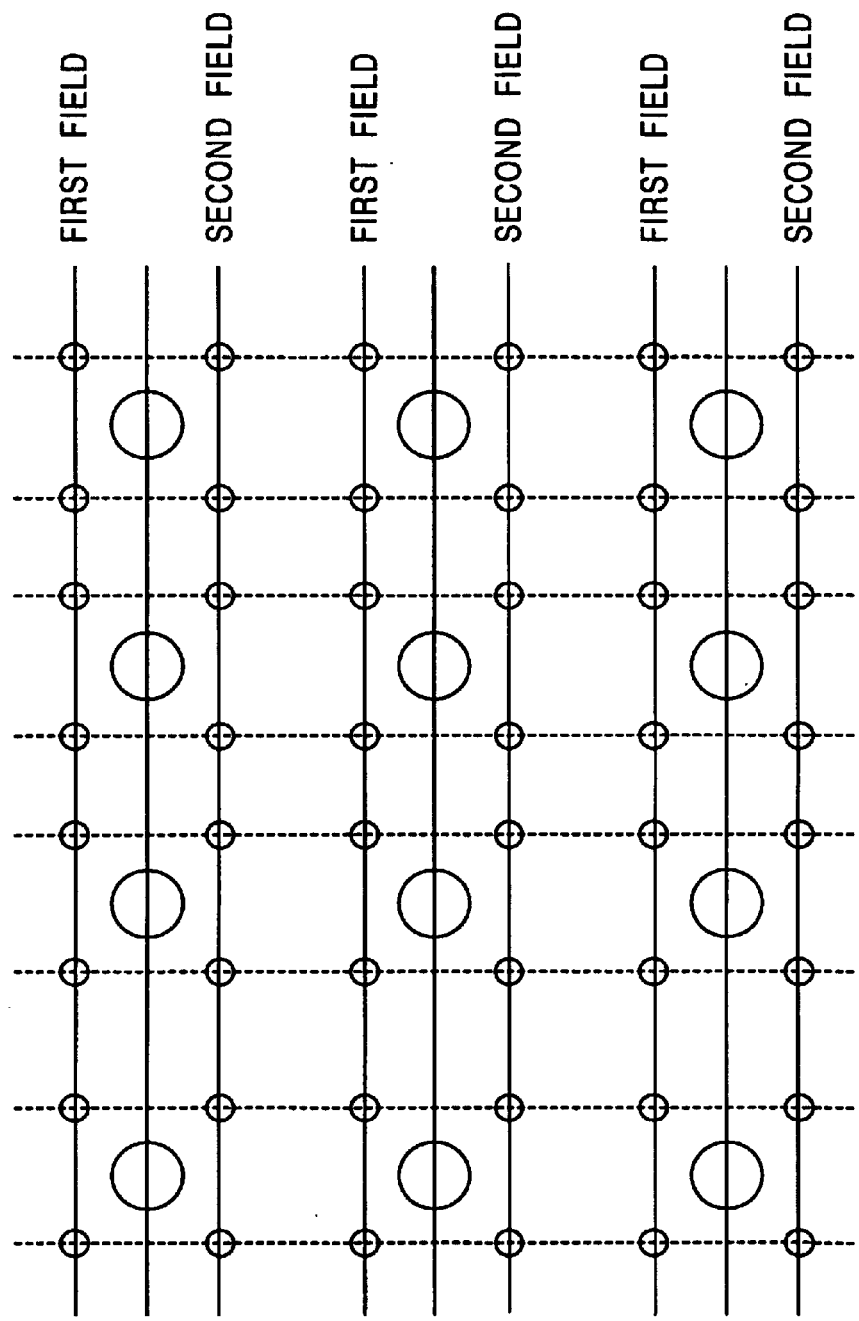
FIG. 64 is a view showing the positions of pixels input to the quadruple-density-resolution creation circuit 312 and the positions of pixels output from the quadruple-density-resolution creation circuit 312 in a case in which the quadruple-density-resolution creation circuit 312 outputs data in the interlace method.

FIG. 64 is a view showing the positions of pixels (indicated by large circles in the figure) input to the quadruple-density-resolution creation circuit 312 and the positions of pixels (indicated by small circles) output from the quadruple-density-resolution creation circuit 312 in a case in which the quadruple-density-resolution creation circuit 312 generates and outputs quadruple-density-resolution pixels in the interlace method. Frames input to the quadruple-density-resolution creation circuit 312 have a frequency of 30 Hz, and frames output from the quadruple-density-resolution creation circuit 312 have a frequency of 60 Hz. Output pixels in the first field are shifted from input pixels in the upper direction by one line in the vertical direction on an output screen and are doubled in the number of pixels per line. Output pixels in the second field are shifted from input pixels in the lower direction by one line in the vertical direction on the output screen and are doubled in the number of pixels per line.

Figure 65:
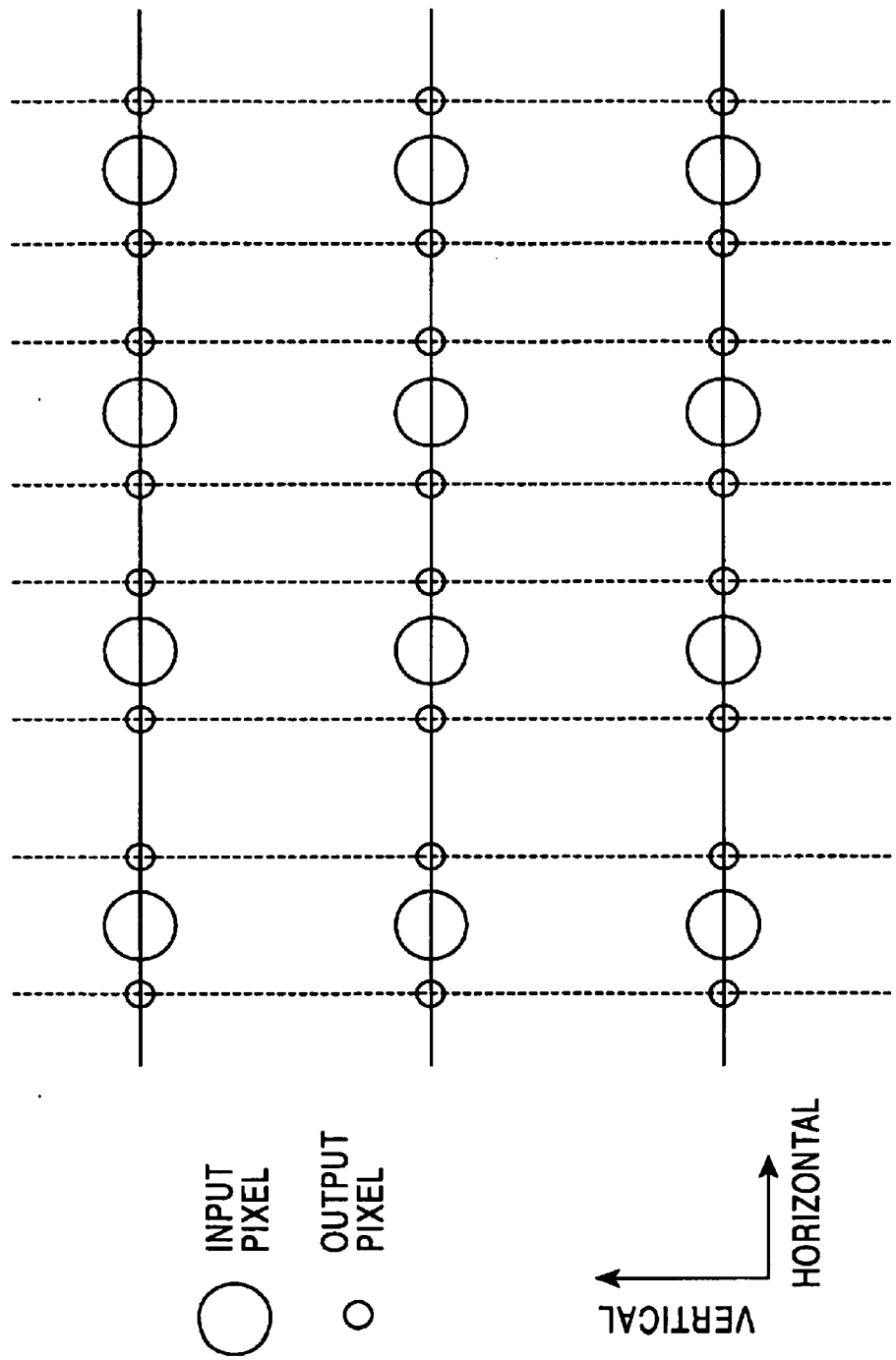
FIG. 65 is a view showing the positions of pixels input to the quadruple-density-resolution creation circuit 312 and the positions of pixels output from the quadruple-density-resolution creation circuit 312 in a case in which the quadruple-density-resolution creation circuit 312 outputs data in the progressive method.

FIG. 65 is a view showing the positions of pixels (indicated by large circles in the figure) input to the quadruple-density-resolution creation circuit 312 and the positions of pixels (indicated by small circles) output from the quadruple-density-resolution creation circuit 312 in a case in which the quadruple-density-resolution creation circuit 312 generates and outputs quadruple-density-resolution pixels in the progressive method. Frames input to the quadruple-density-resolution creation circuit 312 have a frequency of 30 Hz, and frames output from the quadruple-density-resolution creation circuit 312 have a frequency of 60 Hz. Output pixels in a frame are disposed in the same lines as input pixels and are doubled in the number of pixels per line.

As described above, the quadruple-density-resolution creation circuit 312 creates and outputs pixels doubled in the number of pixels per line at the doubled frame frequency or the doubled field frequency, from input pixels.

Figure 66:
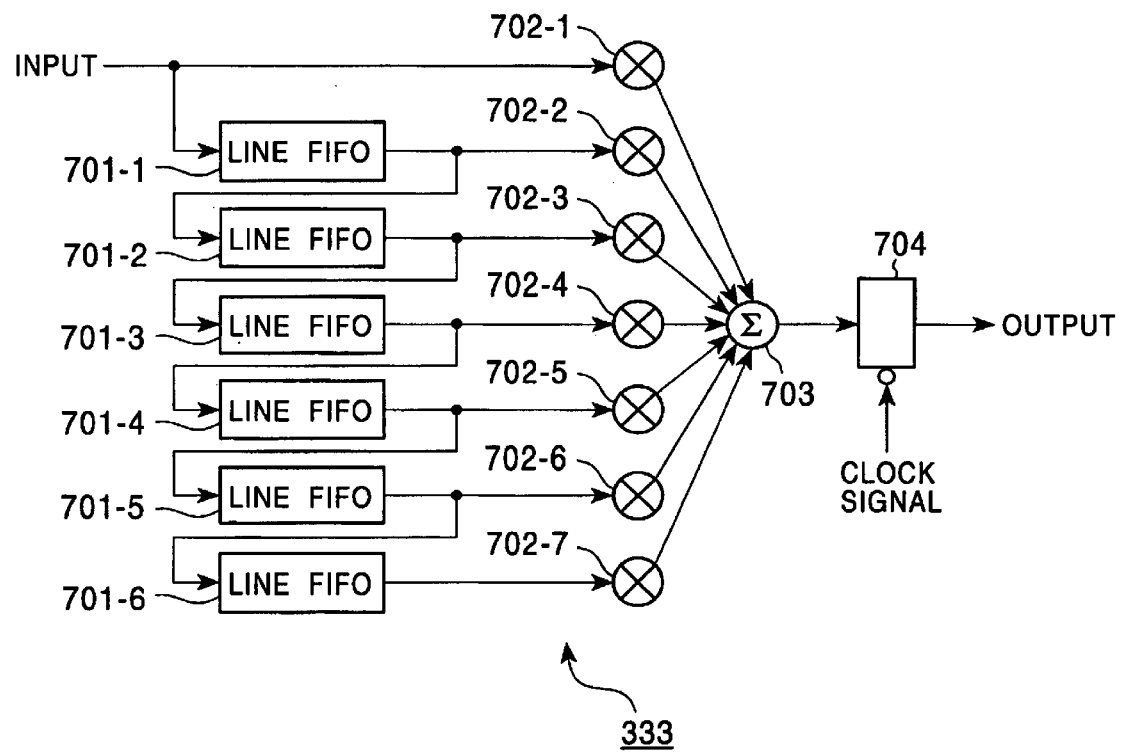
FIG. 66 is a block diagram showing the structure of a UV vertical doubling circuit 333.

The UV vertical doubling circuit 333 will be described next. FIG. 66 is a block diagram showing the structure of the UV vertical doubling circuit 333. The UV vertical doubling circuit 333 receives U data and V data having an increased number of pixels processed by the quadruple-density-resolution creation circuit 312. Input data is delayed by one line by each of line FIFOs 701-1 to 701-6 and sequentially output to subsequent stages.

A multiplication circuit 702-1 multiplies input data by a coefficient, and outputs the product to an adder 703.

Multiplication circuits 702-2 to 702-7 multiply input data by coefficients, and outputs the products to the adder 703.

The adder 703 adds the data sent from the multiplication circuits 702-1 to 702-7, and sends the sum to a latch circuit 704. The latch circuit 704 latches the input data when a clock signal is input.

Figure 67:
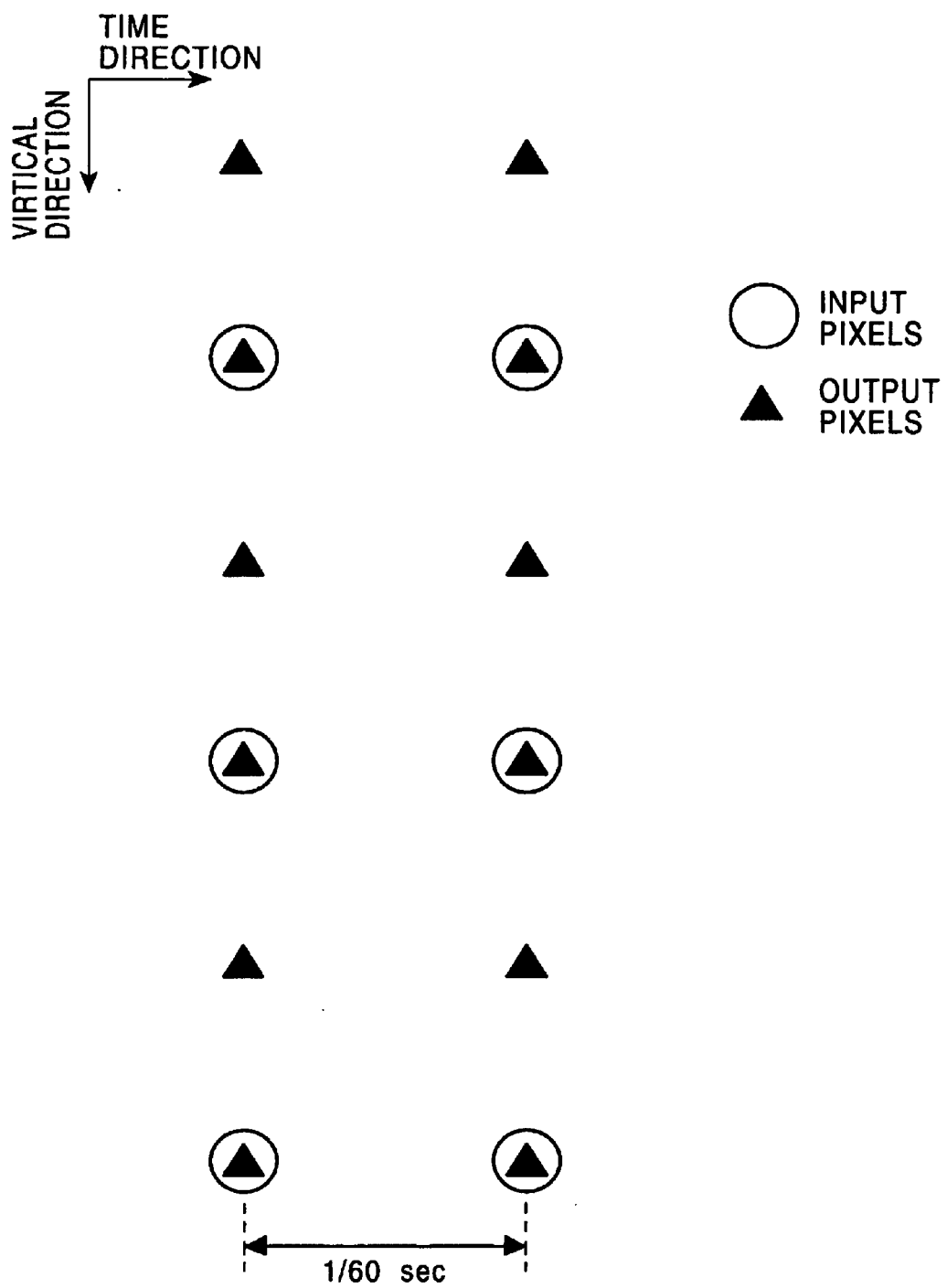
FIG. 67 is a view showing outputs of a latch circuit 704.

The operation of the UV vertical doubling circuit 333 will be described below by referring to FIG. 67. The line FIFOs 701-1 to 701-6 output the data of pixels (indicated by circles in FIG. 67) disposed at the same positions in the horizontal direction of the screen on six consecutive lines starting from the input line. The multiplication circuits 702-1 to 702-7 multiply the input data by coefficients and output the products to the adder 703. The adder 703 adds the output data, and outputs the sum to the latch circuit 704. The latch circuit 704 receives clock signals at timing (indicated by black triangles in FIG. 67) at which the doubled number of lines is obtained. Therefore, the UV vertical doubling circuit 333 achieves interpolation with the doubled number of lines for the input U data and V data, and outputs data.

Figure 68:
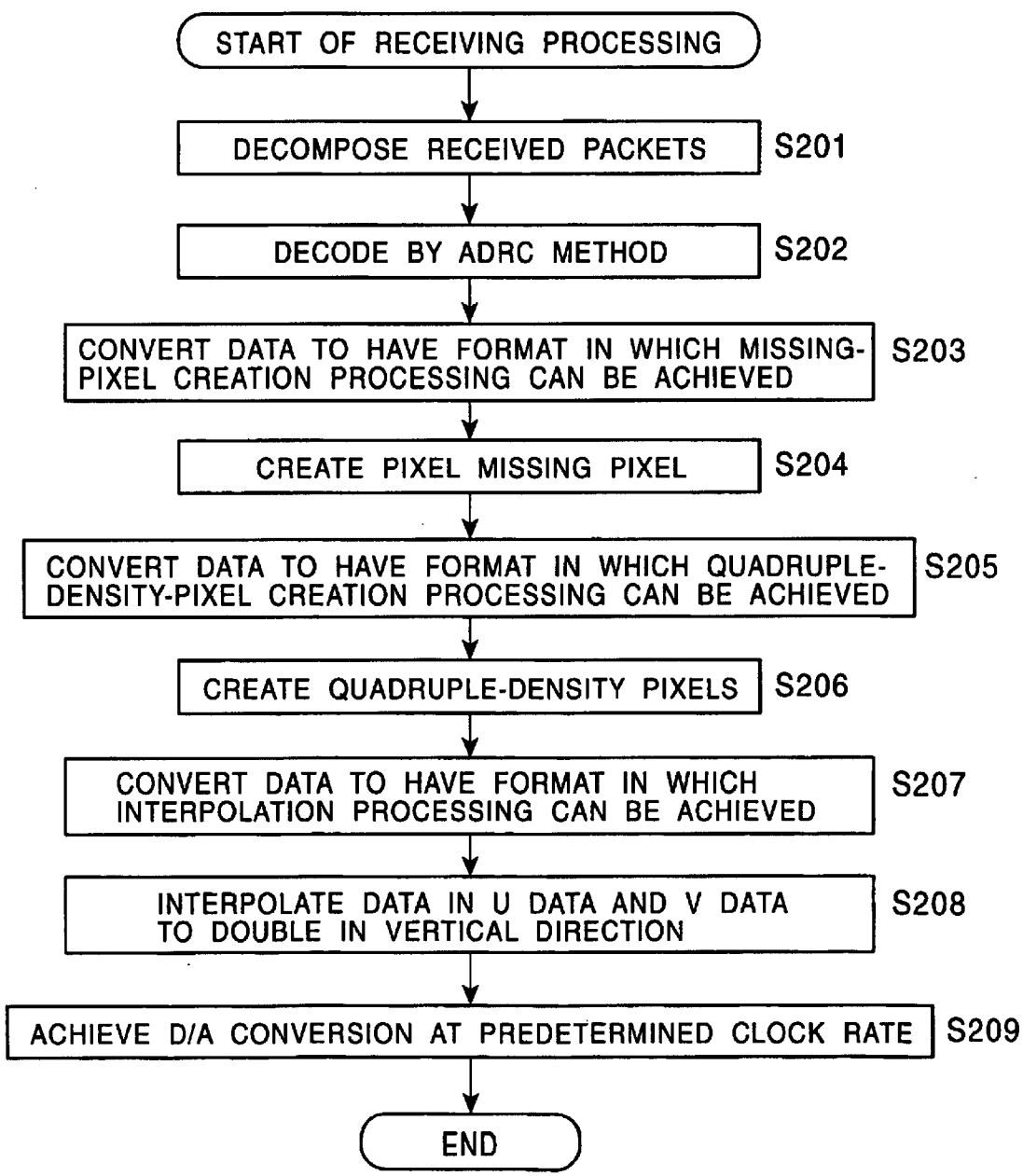
FIG. 68 is a flowchart of the receiving processing of the receiving apparatus 2.

The receiving processing of the receiving apparatus 2 will be described next by referring to a flowchart shown in FIG. 68. In step S201, the packet decomposition circuit 302 decomposes packets received by the receiving circuit 301, and sends data to the decoding circuit 304. In step S202, the decoding circuit 304 decodes the data input from the packet decomposition circuit 302 by the ADRC method. When data is lost during transmission, "q," a motion flag MF, a dynamic range DR, or the minimum value MIN of pixel values is recovered during decoding in the decoding circuit 304, and Y data, U data, and V data are decoded.

In step S203, the format conversion circuit 306 converts the Y data, the U data, and the V data sent from the decoding circuit 304 to have a predetermined format which the missing-pixel creation circuit 308 can handle. In step S204, the missing-pixel creation circuit 308 creates a pixel which cannot be decoded by the decoding circuit 304 among missing pixels by class classification processing.

In step S205, the format conversion circuit 310 converts the Y data, the U data, and the V data sent from the missing-pixel creation circuit 308 to have a predetermined format which the quadruple-density-resolution creation circuit 312 can handle. In step S206, the quadruple-density-resolution creation circuit 312 creates pixels by class classification processing according to the input Y data, U data, and V data to make the density of pixels quadruple, and outputs data to the interpolation section 314.

In step S207, the format conversion circuit 331 converts the data type of the Y data, U data, and V data sent from the quadruple-density-resolution creation circuit 312 so that predetermined interpolation processing is achieved. In step S208, the UV vertical doubling circuit 333 interpolates pixels in the vertical direction for the U data and the V data so as to double the number of lines. In step S209, the D/A conversion circuit 335 achieves digital-to-analog conversion at a predetermined clock rate to output an analog Y signal, an analog U signal, and an analog V signal, and the processing is terminated.

As described above, if a pixel is lost, the receiving apparatus 2 creates a pixel for the missing pixel. When a pixel is not lost, the receiving apparatus 2 creates a higher-quality pixel, such as that with noise removed or that having a higher resolution, and outputs it.

The generation of prediction coefficients used in the missing-pixel creation circuit 308 will be described next.

Figure 69:
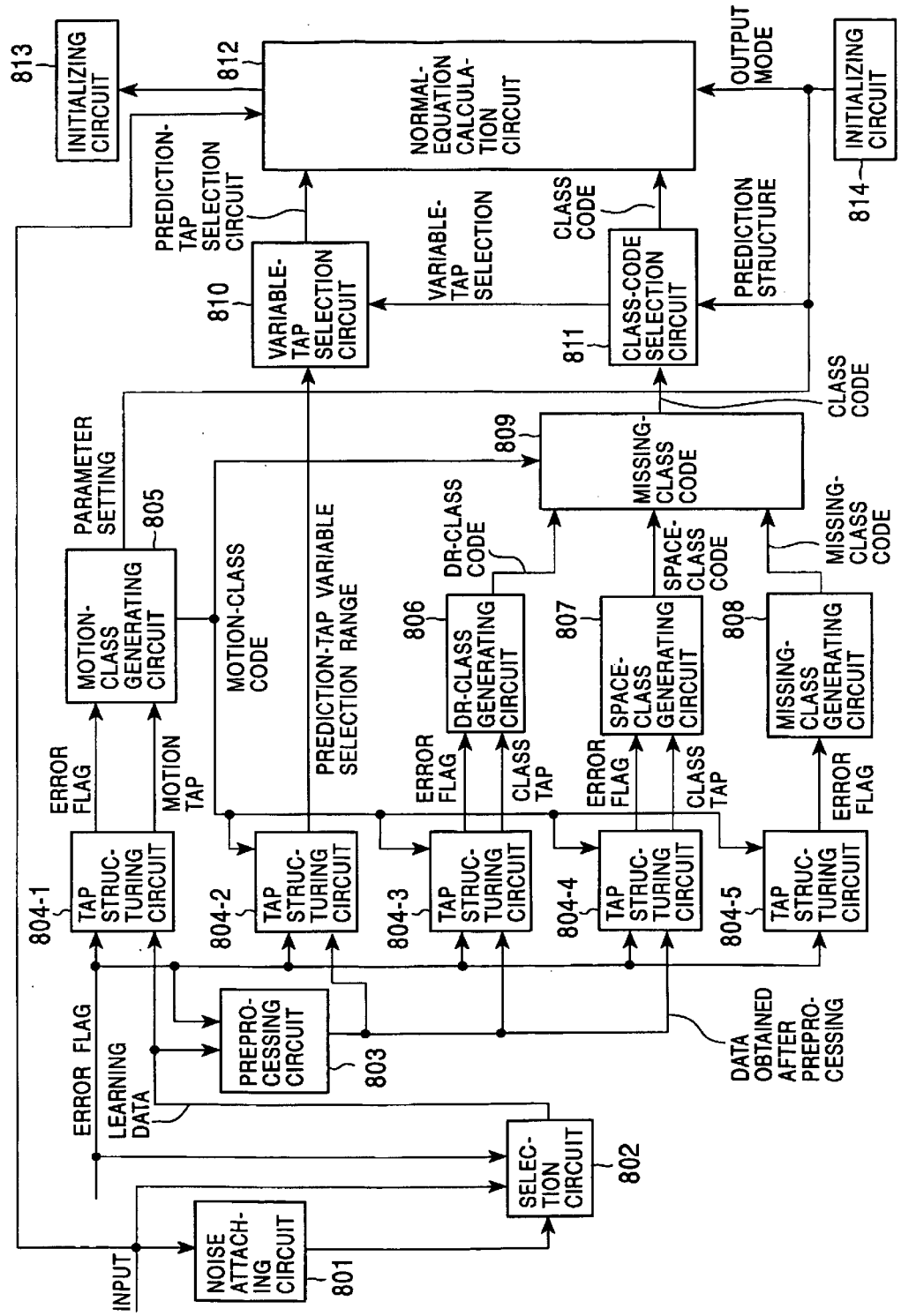
FIG. 69 is a block diagram of a learning apparatus.

FIG. 69 is a block diagram of a learning apparatus for generating prediction coefficients used in the missing-pixel creation circuit 308. An image input to the learning apparatus is sent to a noise attaching circuit 801, to a selection circuit 802, and to a normal-equation calculation circuit 812. Error flags are input to the selection circuit 802, to a preprocessing circuit 803, and to tap structuring circuits 804-1 to 804-5. Error flags indicate missing pixels, as required, in response to the learning content of the learning apparatus.

The noise attaching circuit 801 attaches noise to pixels of the input image, and sends them to the selection circuit 802. The selection circuit 802 selects a pixel input to the learning apparatus or a pixel to which noise has been attached, sent from the noise attaching circuit 801, according to the corresponding error flag, and sends the selected pixel to the preprocessing circuit 803 and to the tap structuring circuit 804-1. When the error flag indicates a missing pixel, for example, the selection circuit 802 selects a pixel input to the learning apparatus, and sends the selected pixel to the preprocessing circuit 803 and to the tap structuring circuit 804-1. When the error flag indicates no missing pixel, the selection circuit 802 selects a pixel to which noise has been attached, and sends the selected pixel to the preprocessing circuit 803 and to the tap structuring circuit 804-1.

The preprocessing circuit 803 generates the value of the missing pixel by a linear interpolation filter according to the input pixel value and the input error flag indicating the missing pixel, assigns the value to the missing pixel, and sends it to the tap structuring circuits 804-2 to 804-5. Since the preprocessing circuit 803 executes the same processing as the preprocessing circuit 501, a detailed description thereof will be omitted.

The tap structuring circuits 804-1 to 804-5 send tap data and others to a motion-class generating circuit 805, a DR-class generating circuit 806, a space-class generating circuit 807, and a missing-class generating circuit 808.

The motion-class generating circuit 805 generates a motion-class code and a still/motion flag according to a parameter sent from an initializing circuit 814 and according to the error flag and the selected tap sent from the tap structuring circuit 804-1, and outputs them to the tap structuring circuits 804-2 to 804-5 and to a class synthesizing circuit 809. Since the motion-class generating circuit 805 executes the same processing as the motion-class generating circuit 503, a detailed description of the processing will be omitted.

The tap structuring circuit 804-2 selects a tap in a prediction-tap variable selection range which includes prediction taps in all classes, according to the motion-class code and the still/motion flag sent from the motion-class generating circuit 805 and according to the position of a missing pixel, and sends the selected tap in the prediction-tap variable selection range to a variable-tap selection circuit 810.

The tap structuring circuit 804-3 selects class taps according to the motion-class code and the still/motion flag sent from the motion-class generating circuit 805, and sends the selected class taps to the DR-class generating circuit 806 together with an error flag indicating whether each of the selected taps is missing. The DR-class generating circuit 806 detects a dynamic range only from class taps which are not missing, according to the class taps and the error flags sent from the tap structuring circuit 804-3, generates the DR-class code corresponding to the detected dynamic range, and outputs it to the class synchronizing circuit 809.

The tap structuring circuit 804-4 selects class taps according to the motion-class code and the still/motion flag sent from the motion-class generating circuit 805, and sends the selected class taps to the space-class generating circuit 807 together with an error flag indicating whether each of the selected class taps is missing. The space-class generating circuit 807 generates a space-class code only from class taps which are not missing, according to the class taps and the error flags sent from the tap structuring circuit 804-4, and outputs it to the class synchronizing circuit 809.

The tap structuring circuit 804-5 sends the error flag corresponding to a missing pixel and the error flags corresponding to pixels disposed around the missing pixel, according to the motion-class code and the still/motion flag sent from the motion-class generating circuit 805, to the missing-class generating circuit 808. The missing-class generating circuit 808 generates a missing-class code according to the error flag corresponding to the missing pixel and the error flags corresponding to pixels disposed around the missing pixel, sent from the tap structuring circuit 804-5, and outputs it to the class synchronizing circuit 809.

The class synthesizing circuit 809 integrates the motion-class code, the still/motion flag, the DR-class code, the space-class code, and the missing-class code into a class code to generate a final class code, and outputs it to a class-code selection circuit 811.

The class-code selection circuit 811 makes the variable-tap selection circuit 810 select a variable tap according to the prediction structure sent from the initializing circuit 309 and the class code sent from the class synthesizing circuit 809, and outputs the class code to a normal-equation calculation circuit 812.

When the normal-equation calculation circuit 812 receives the image, serving as master data, input to the learning apparatus and a prediction-tap data string, serving as learning data, from the variable-tap selection circuit 810, the normal-equation calculation circuit 812 uses them to calculate prediction coefficients W which minimize an error, by the least squares method according to an output mode specified by the initializing circuit 814.

The prediction coefficients W calculated by the normal-equation calculation circuit 812 will be briefly described below.

It is assumed that the prediction value E[y] of the pixel value "y" of a pixel in the input original image, serving as master data, is obtained by a linear first-order coupling model defined by linear coupling of the pixel values $x_1$, $x_2$, ... of the prediction-tap data string, serving as learning data, and predetermined prediction coefficients $w_1$, $w_2$, .... In this case, the prediction value E[y] can be expressed by the following expression.

$$E[y] = w_1 x_1 + w_2 x_2 + \quad (14)$$

To generalize the expression (14), when a matrix "W" formed of a set of prediction coefficients "w," a matrix "X" formed of a set of learning data, and a matrix "Y'" formed of a set of prediction values E[y] are defined in the following expressions, $$X = \begin{bmatrix} x_{11} & x_{12} & \cdots & x_{1n} \\ x_{21} & x_{22} & \cdots & x_{2n} \\ \cdots & \cdots & \cdots & \cdots \\ x_{m1} & x_{m2} & \cdots & x_{mn} \end{bmatrix}$$

$$W = \begin{bmatrix} W_1 \\ W_2 \\ \cdots \\ W_n \end{bmatrix}, Y' = \begin{bmatrix} E[y_1] \\ E[y_2] \\ \cdots \\ E[y_m] \end{bmatrix}$$

the following observation equation is satisfied.

$$XW = Y' \quad (15)$$

The least squares method is applied to this observation equation to obtain a prediction value E[y] close to the pixel value "y" in the original image. In this case, when a matrix "Y" formed of a set of the pixel values "y" of the original image and a matrix "E" formed of a set of the remainders "e" of the prediction values E[y] against the pixel values "y" in the original image are defined in the following way, $$E = \begin{bmatrix} e_1 \\ e_2 \\ \cdots \\ e_m \end{bmatrix}, Y = \begin{bmatrix} y_1 \\ y_2 \\ \cdots \\ y_m \end{bmatrix}$$

the following remainder equation is satisfied from the expression (15).

$$XW = Y + E \quad (16)$$

In this case, prediction coefficients $w_i$ used to obtain a prediction value E[y] close to the pixel value "y" in the original image are obtained when the following error square is made minimum.

$$\sum_{i=1}^{m} e_i^2$$

Therefore, when the result obtained by differentiating the above error square by the prediction coefficient $w_i$ is zero, in other words, the prediction coefficient $w_i$ which satisfies the following expression is the most appropriate value for obtaining a prediction value E[y] close to the pixel value "y" in the original image.

$$e_1 \frac{\partial e_1}{\partial w_i} + e_2 \frac{\partial e_2}{\partial w_i} + \cdots + e_m \frac{\partial e_m}{\partial w_i} = 0 (i = 1, 2, \cdots, n) \quad (17)$$

When the expression (16) is differentiated by the prediction coefficient $w_i$, the following expression is satisfied.

$$\frac{\partial e_i}{\partial w_i} = x_{i1}, \frac{\partial e_i}{\partial w_2} = x_{i2}, \cdots, \frac{\partial e_1}{\partial w_n} = x_{in}, (i = 1, 2, \cdots, m) \quad (18)$$

From the expressions (17) and (18), the expression (19) is obtained.

$$\sum_{i=1}^{m} e_i x_{i1} = 0, \sum_{i=1}^{m} e_i x_{i2} = 0, \cdots \sum_{i=1}^{m} e_i x_{in} = 0 \quad (19)$$

In addition, when the relationships among the learning data "x," the prediction coefficients "w," the master data "y," and the remainders "e" in the remainder equation (16) are taken into account, the following normal equations are obtained from the expression (19).

$$\begin{cases} \left(\sum_{i=1}^{m} x_{i1} x_{i1}\right) w_1 + \left(\sum_{i=1}^{m} x_{i1} x_{i2}\right) w_2 + \cdots + \left(\sum_{i=1}^{m} x_{i1} x_{in}\right) w_n = \left(\sum_{i=1}^{m} x_{i1} y_i\right) \\ \left(\sum_{i=1}^{m} x_{i2} x_{i1}\right) w_1 + \left(\sum_{i=1}^{m} x_{i2} x_{i2}\right) w_2 + \cdots + \left(\sum_{i=1}^{m} x_{i2} x_{in}\right) w_n = \left(\sum_{i=1}^{m} x_{i2} y_i\right) \\ \cdots \\ \left(\sum_{i=1}^{m} x_{in} x_{i1}\right) w_1 + \left(\sum_{i=1}^{m} x_{in} x_{i2}\right) w_2 + \cdots + \left(\sum_{i=1}^{m} x_{in} x_{in}\right) w_n = \left(\sum_{i=1}^{m} x_{in} y_i\right) \end{cases} \quad (20)$$

The same number of the normal equations (20) as that of the prediction coefficients "w" to be obtained can be formulated. Therefore, by solving the equations (20), the most appropriate prediction coefficients "W" is obtained. It is possible to use, for example, a sweep off method (Gauss-Jordan deletion method) to solve the equations (20).

To obtain the pixel value "y" of a pixel serving as master data by a linear first-order coupling model of the pixel values $x_1$, $x_2$, $x_3$, ... of the prediction-tap data string, serving as learning data, and the prediction coefficients $w_1$, $w_2$, $w_3$, ... to be obtained, the prediction coefficients $w_1$, $w_2$, $w_3$, ... need to satisfy the following expression.

$$y = w_1 x_1 + w_2 x_2 + w_3 x_3 +$$

Therefore, the normal-equation calculation circuit 812 formulates and solves the normal equations (20) shown above to obtain the prediction coefficients $w_1$, $w_2$, $w_3$, ... which make the square error of the prediction value $w_1 x_1 + w_2 x_2 + w_3 x_3 + \ldots$ against the true value "y" from prediction taps in the same class and pixels of the corresponding master data.

Consequently, prediction coefficients W are generated for each class by executing this processing for each class.

The prediction coefficients for each class obtained by the normal-equation calculation circuit 812 are sent to a coefficient memory 813 together with the class code. In the coefficient memory 813, the prediction coefficients W sent from the normal-equation calculation circuit 812 are stored at the address corresponding to the class indicated by the class code.

As described above, the learning apparatus can generate the coefficients used by the missing-pixel creation circuit 308.

Figure 70:
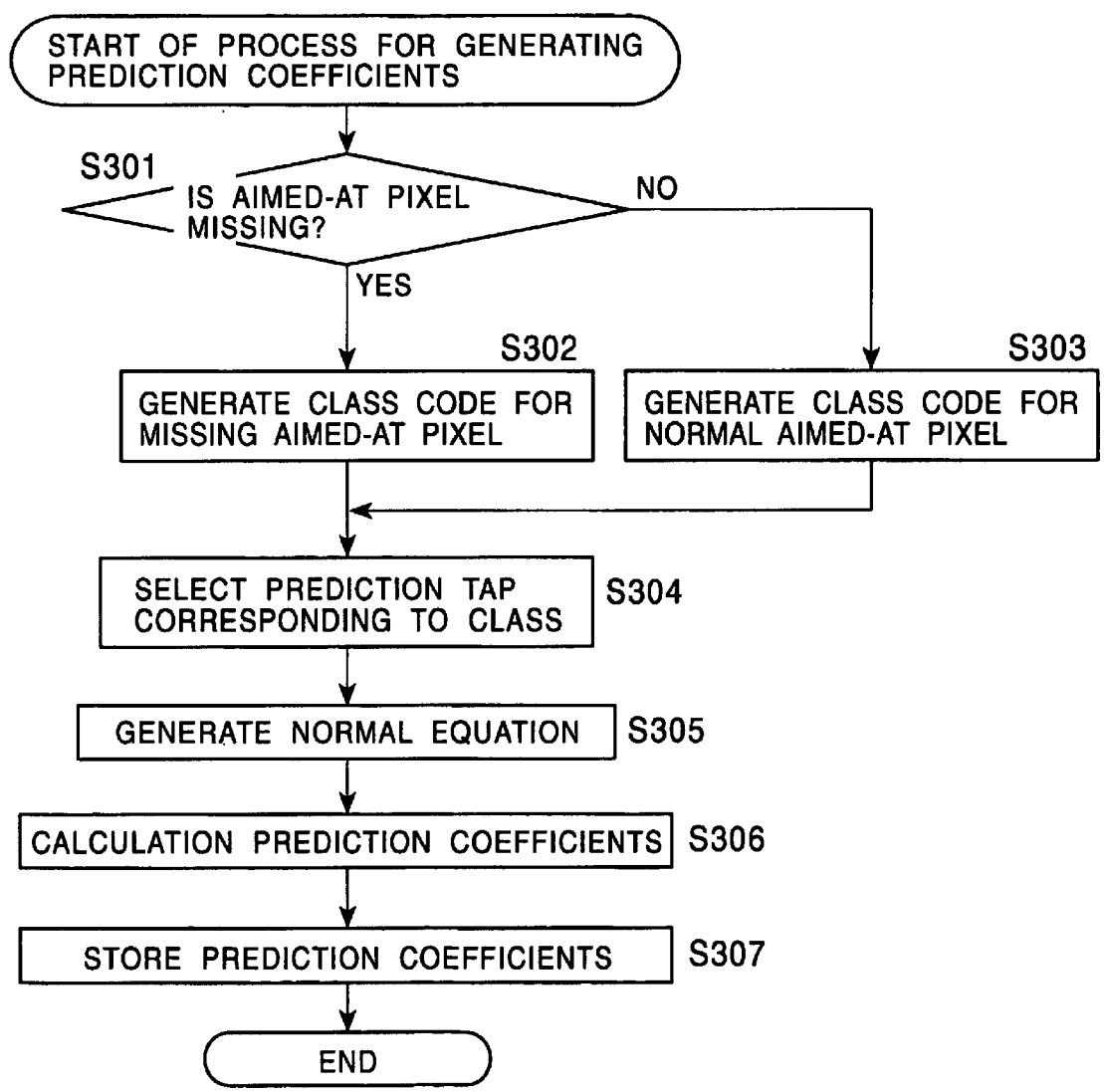
FIG. 70 is a flowchart of a coefficient generating processing.

The processing for generating the prediction coefficients W in the learning apparatus will be described further by referring to a flowchart shown in FIG. 70. In step S301, the missing-class generating circuit 808 of the learning apparatus determines whether an aimed-at pixel is missing, according to the corresponding error flag. When it is determined that the aimed-at pixel is missing, the processing proceeds to step S302, and the class synthesizing circuit 809 generates the class code corresponding to the missing aimed-at pixel according to a motion-class code sent from the motion-class generating circuit 805, a DR-class code sent from the DR-class generating circuit 806, a space-class code sent from the space-class generating circuit 807, and a missing-class code sent from the missing-class generating circuit 808. Then, the processing proceeds to step S304.

When it is determined in step S301 that the aimed-at pixel is not missing, the processing proceeds to step S303, and the class synthesizing circuit 809 generates the class code corresponding to the normal aimed-at pixel according to the motion-class code sent from the motion-class generating circuit 805, the DR-class code sent from the DR-class generating circuit 806, the space-class code sent from the space-class generating circuit 807, and the missing-class code sent from the missing-class generating circuit 808. Then, the processing proceeds to step S304.

In step S304, the variable-tap selection circuit 810 selects a prediction tap corresponding to the class indicated by the class code.

In step S305, the normal-equation calculation circuit 812 generates normal equations corresponding to the class code. In step S306, the normal-equation calculation circuit 812 specifies input original pixels, serving as master data, and a prediction tap, serving as learning data, in the generated normal equations to solve the normal equations to obtain the prediction coefficients W.

In step S307, the normal-equation calculation circuit 812 makes the coefficient memory 813 store the prediction coefficients W corresponding to the class code, and the processing is terminated.

The prediction coefficients W stored in the coefficient memory 813 are stored in the initializing circuit 309 of the missing-pixel creation circuit 308. The prediction coefficients are, for example, loaded to the coefficient holding and class-code selection circuit 509 when the receiving apparatus 2 is activated.

As described above, by using the prediction coefficients W generated by the learning apparatus, if a pixel is lost, the receiving apparatus 2 creates a pixel for the missing pixel; and when a pixel is not lost, the receiving apparatus 2 creates a higher-quality pixel, such as that with noise removed or that having a higher resolution, and outputs it.

In the foregoing descriptions, the image communication system transmits and receives images. Data to be transferred is not limited to images. Data such as sound may be transferred.

The series of above-described processing can be executed not only by hardware but also by software. When the series of processing is executed by software, a program constituting the software is installed from a recording medium to a computer built in special hardware or to a general-purpose personal computer which executes various functions when various programs are installed.

Figure 71:
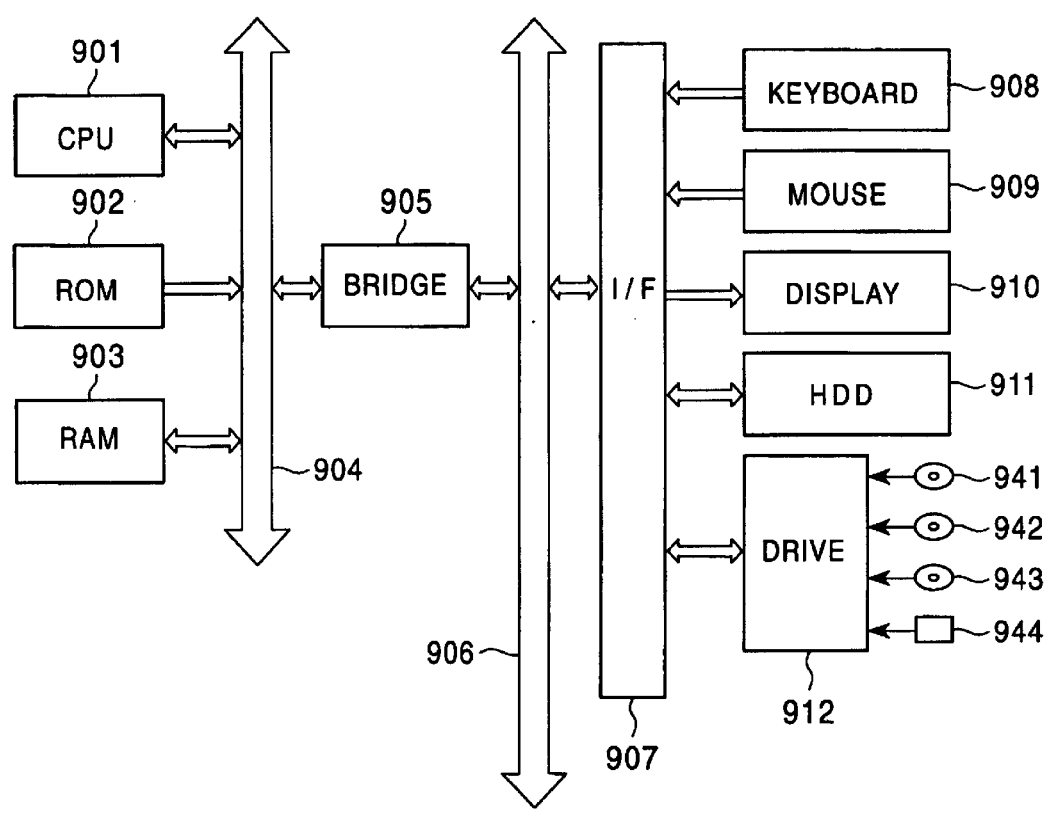
FIG. 71 is a view showing example recording media and an example computer.

FIG. 71 is a view showing example recording media and an example computer. A central processing unit (CPU) 901 actually executes various application programs and an operating system (OS). A read-only memory (ROM) 902 generally stores basically fixed data used in the programs and calculation parameters which the CPU 901 uses. A random-access memory (RAM) 903 stores programs used by the CPU 901 and parameters which change as required during the execution of the programs. The above devices are connected to each other by a host bus 904 formed of a CPU bus and others.

The host bus 904 is connected to an external bus 906, such as a peripheral component interconnect/interface (PCI) bus, through a bridge 905.

A keyboard 908 is operated by the user to input various instructions to the CPU 901. A mouse 909 is used by the user to specify a point on the screen of a display 910 or to achieve a selection. The display 910 is formed of a liquid-crystal display apparatus or a cathode ray tube (CRT), and displays various types of information by a text or an image. A hard disk drive (HDD) 911 drives hard disks, and records or reproduces a program to be executed by the CPU 901 and information into or from the hard disks.

A drive 912 reads data or a program stored in a magnetic disk 941, an optical disk 942, a magneto-optical disk 943, or a semiconductor memory 944, all of which are mounted to the drive 912, and sends the data or the program to the connected RAM 903 through an interface 907, the external bus 906, the bridge 905, and the host bus 904.

The keyboard 908, the mouse 909, the display 910, the HDD 911, and the drive 912 are connected to the interface 907. The interface 907 is connected to the CPU 901 through the external bus 906, the bridge 905, and the host bus 904.

As shown in FIG. 71, the recording media includes not only package media which are distributed separately from the computer to the users for providing programs and which store the programs, such as the magnetic disk 941 (including a floppy disk), the optical disk 942 (including a compact disc-read only memory (CD-ROM) and a digital versatile disk (DVD)), the magneto-optical disk 943 (including a Mini disk (MD)) and the semiconductor memory 944, but also the ROM 902 and the HDD 911, which are built in the computer in advance and provided for the users and which store the programs.

In the present specification, steps describing the programs stored in a recording medium include not only those executed in a time-sequential manner in the described order, but also those not necessarily executed in a time-sequential manner but executed in parallel or independently.

In the present specification, a system refers to the entire gear formed of a plurality of apparatuses.

According to the present invention, an aimed-at data item is classified into one of a plurality of classes specified in advance, according to a plurality of data items disposed around the aimed-at data item; conversion information for the aimed-at data item for each class is stored; the aimed-at data item is converted to a data item having a higher quality, according to the conversion information; and the aimed-at data item is classified into a different class according to whether the aimed-at data item is missing. Therefore, a higher-quality data item can be generated irrespective of whether the aimed-at data item is missing.

Also according to the present invention, an aimed-at data item is classified into one of a plurality of classes specified in advance, according to a plurality of data items disposed around the aimed-at data item; conversion information used for converting the aimed-at data item to a data item having a higher quality is generated for a class; and the aimed-at data item is classified into a different class according to whether the aimed-at data item is missing. Therefore, a higher-quality data item can be generated by using the generated conversion information irrespective of whether the aimed-at data item is missing.

What is claimed is:

1. An information processing apparatus comprising:
    a class classifier for classifying an aimed-at data item into one of a plurality of classes specified in advance, according to a plurality of data items disposed around the aimed-at data item;
    a memory for storing conversion information for the aimed-at data item for each class; and
    a converter for converting the aimed-at data item to a data item having a higher quality, according to the conversion information,
    wherein the class classifier classifies the aimed-at data item into a different class according to a missing condition of the aimed-at data item and/or one or more data items disposed around the aimed-at data item.

2. An information processing apparatus according to claim 1, wherein the conversion information is information used for generating the aimed-at data item according to the plurality of data items disposed around the aimed-at data item, for a missing class in which the aimed-at data item is missing, and the conversion information is information used for converting the aimed-at data item to a data item having a higher quality, for a non-missing class in which the aimed-at data item is not missing.

3. An information processing apparatus according to claim 2, wherein the conversion information is information used for converting the aimed-at data item to a data item having reduced noise, for the non-missing class.

4. An information processing apparatus according to claim 1, wherein the conversion information is information obtained by learning achieved in advance.

5. An information processing apparatus according to claim 1, wherein the conversion information is prediction coefficients used for a linear or non-linear, or a first-order or high-order estimation equation.

6. An information processing apparatus according to claim 1, wherein the class classifier classifies the aimed-at data item into one of the plurality of classes specified in advance, according to a class tap which includes the plurality of data items disposed around the aimed-at data item.

7. An information processing apparatus according to claim 1, wherein the converter converts the aimed-at data item to a data item having a higher quality, according to a prediction tap corresponding to the class into which the aimed-at data item has been classified.

8. An information processing apparatus according to claim 1, wherein the class classifier classifies the aimed-at data item into one of the plurality of classes specified in advance, according to a plurality of data items disposed spatially around the aimed-at data item.

9. An information processing apparatus according to claim 1, wherein the class classifier classifies the aimed-at data item into one of the plurality of classes specified in advance, according to a plurality of data items disposed along the time axis around the aimed-at data item.

10. An information processing apparatus according to claim 1, wherein the aimed-at data item is image data.

11. An information processing method comprising the steps of:
    classifying an aimed-at data item into one of a plurality of classes specified in advance, according to a plurality of data items disposed around the aimed-at data item;
    selecting conversion information corresponding to the class into which the aimed-at data item has been classified; and
    converting the aimed-at data item to a data item having a higher quality, according to the conversion information,
    wherein the aimed-at data item is classified into a different class according to a missing condition of the aimed-at data item and/or or more data items disposed around the aimed-at data item, in the step of classifying the aimed-at data item.

12. An information processing method according to claim 11, wherein the conversion information is information used for generating the aimed-at data item according to the plurality of data items disposed around the aimed-at data item, for a missing class in which the aimed-at data item is missing, and the conversion information is information used for converting the aimed-at data item to a data item having a higher quality, for a non-missing class in which the aimed-at data item is not missing.

13. An information processing method according to claim 12, wherein the conversion information is information used for converting the aimed-at data item to a data item having reduced noise, for the non-missing class.

14. An information processing method according to claim 11, wherein the conversion information is information obtained by learning achieved in advance.

15. An information processing method according to claim 11, wherein the conversion information is prediction coefficients used for a linear or non-linear, or a first-order or high-order estimation equation.

16. An information processing method according to claim 11, wherein the aimed-at data item is classified into one of the plurality of classes specified in advance, according to a class tap which includes the plurality of data items disposed around the aimed-at data item, in the step of classifying the aimed-at data item.

17. An information processing method according to claim 11, wherein the aimed-at data item is converted to a data item having a higher quality in the step of converting the aimed-at data item, according to a prediction tap corresponding to the class into which the aimed-at data item has been classified.

18. An information processing method according to claim 11, wherein the aimed-at data item is classified into one of the plurality of classes specified in advance in the step of classifying the aimed-at data item, according to a plurality of data items disposed spatially around the aimed-at data item.

19. An information processing method according to claim 11, wherein the aimed-at data item is classified into one of the plurality of classes specified in advance in the step of classifying the aimed-at data item, according to a plurality of data items disposed along the time axis around the aimed-at data item.

20. An information processing method according to claim 11, wherein the aimed-at data item is image data.

21. A recording medium storing a computer-readable program, the program comprising the steps of:
    classifying an aimed-at data item into one of a plurality of classes specified in advance, according to a plurality of data items disposed around the aimed-at data item;

selecting conversion information corresponding to the class into which the aimed-at data item has been classified; and converting the aimed-at data item to a data item having a higher quality, according to the conversion information, wherein the aimed-at data item is classified into a different class according to at least one of a missing condition of the aimed-at data item and one or more data items disposed around the aimed-at data item, in the step of classifying the aimed-at data item.

22. A learning apparatus comprising: a class classifier for classifying an aimed-at data item into one of a plurality of classes specified in advance, according to a plurality of data items disposed around the aimed-at data item; and a conversion-information generator for generating conversion information used for converting the aimed-at data item to a data item having a higher quality, for the class, wherein the class classifier classifies the aimed-at data item into a different class according to a missing condition of the aimed-at data item and one or more data items disposed around the aimed-at data item.

23. A learning method comprising the steps of:

classifying an aimed-at data item into one of a plurality of classes specified in advance, according to a plurality of data items disposed around the aimed-at data item; and generating conversion information used for converting the aimed-at data item to a data item having a higher quality, for the class, wherein the aimed-at data item is classified into a different class in the step of classifying the aimed-at data item, according to a missing condition of the aimed-at data item and/or one or more data items disposed around the aimed-at data item.

24. An information processing apparatus according to claim 1, wherein the class classifier classifies the aimed-at data item into a different class according to preprocessed missing data among said one or more data items disposed around the aimed-at data item.

* * * * *